United States Patent
McCauley et al.

(10) Patent No.: US 10,204,349 B2
(45) Date of Patent: Feb. 12, 2019

(54) ANALYZING CUSTOMER SEGMENTS

(75) Inventors: Sean McCauley, Minneapolis, MN (US); Paul Algren, Prior Lake, MN (US); Paritosh Desai, Santa Clara, CA (US); Steve Colten, Reno, NV (US); Rob Parkin, San Francisco, CA (US); Suzanne Valentine, Atlanta, GA (US); Craig Silverman, San Francisco, CA (US)

(73) Assignee: International Business Machines Corporation, Armonk, NY (US)

( * ) Notice: Subject to any disclaimer, the term of this patent is extended or adjusted under 35 U.S.C. 154(b) by 703 days.

(21) Appl. No.: 12/567,731

(22) Filed: Sep. 25, 2009

(65) Prior Publication Data

US 2010/0145772 A1    Jun. 10, 2010

(51) Int. Cl.
  *G06Q 30/06* (2012.01)
  *G06Q 30/02* (2012.01)

(52) U.S. Cl.
  CPC ......... *G06Q 30/02* (2013.01); *G06Q 30/0204* (2013.01)

(58) Field of Classification Search
  USPC ........ 705/7.11, 7.29, 7.31, 7.34, 7.35, 14.43, 705/14.65; 726/16; 709/223; 713/176
  See application file for complete search history.

(56) References Cited

U.S. PATENT DOCUMENTS 3,017,610 A    1/1962  Auerbach et al.
4,744,026 A    5/1988  Vanderbei
(Continued)

FOREIGN PATENT DOCUMENTS

JP    2006146696 A    6/2006
KR    1020070115080    12/2007
(Continued)

OTHER PUBLICATIONS

Byung-Do Kim et al., "Modeling the Distribution of Price Sensitivity and Implications for Optimal Retail Pricing", Journal of Business & Economic Statistics, Jul. 1995, vol. 13, No. 3.
(Continued)

*Primary Examiner* — Akiba K Allen
(74) *Attorney, Agent, or Firm* — L. Jeffrey Kelly; Edell, Shapiro & Finnan, LLC

(57) ABSTRACT

The present invention relates to a system and method for customer segment analysis. The system receives customer transaction data for the generation of segments, including point of sales data and customer identification information. Errors in the data may be resolved. Then, individual customers may be segmented by statistically relevant groups. The segmentation of consumers may be accomplished by comparing data of known customers to known segments. Unknown customers, new customers and point of sales data which is missing customer data may also be segmented via statistical similarity to known segments. Using the customer segments, segment wide point of sale data may be generated. This data may then be aggregated by consumer groups. Consumer groups may include by household or other communal purchasing entity. The aggregated segment data may be validated and transformed for outputting to the optimization system. The price optimization system may the use the segment data for generation of preferred prices. Feedback from the optimization engine may be utilized by the customer segmentation system to generate customer segment specific promotional activity.

21 Claims, 39 Drawing Sheets

(56) References Cited

U.S. PATENT DOCUMENTS

| | | | |
|---|---|---|---|
| 4,862,357 A | 8/1989 | Ahlstrom et al. |
| 4,907,170 A | 3/1990 | Bhattacharya |
| 5,063,506 A | 11/1991 | Brockwell et al. |
| 5,117,354 A | 5/1992 | Long et al. |
| 5,189,606 A | 2/1993 | Burns et al. |
| 5,212,791 A | 5/1993 | Damian et al. |
| 5,249,120 A | 9/1993 | Foley |
| 5,299,115 A | 3/1994 | Fields et al. |
| 5,377,095 A | 12/1994 | Maeda et al. |
| 5,459,656 A | 10/1995 | Fields et al. |
| 5,521,813 A | 5/1996 | Fox et al. |
| 5,615,109 A * | 3/1997 | Eder ............................ 705/7.12 |
| 5,694,551 A | 12/1997 | Doyle et al. |
| 5,712,985 A | 1/1998 | Lee et al. |
| 5,732,401 A | 3/1998 | Conway |
| 5,765,143 A | 6/1998 | Sheldon et al. |
| 5,774,868 A | 6/1998 | Cragun et al. |
| 5,790,643 A | 8/1998 | Gordon et al. |
| 5,799,286 A | 8/1998 | Morgan et al. |
| 5,822,736 A | 10/1998 | Hartman et al. |
| 5,832,456 A | 11/1998 | Fox et al. |
| 5,832,458 A | 11/1998 | Jones |
| 5,873,069 A | 2/1999 | Reuhl et al. |
| 5,878,400 A | 3/1999 | Carter, III |
| 5,918,209 A | 6/1999 | Campbell et al. |
| 5,933,813 A | 8/1999 | Teicher et al. |
| 5,987,425 A | 11/1999 | Hartman et al. |
| 6,009,407 A | 12/1999 | Garg |
| 6,029,139 A | 2/2000 | Cunningham et al. |
| 6,032,123 A | 2/2000 | Jameson |
| 6,032,125 A | 2/2000 | Ando |
| 6,044,357 A | 3/2000 | Garg |
| 6,052,686 A | 4/2000 | Fernandez et al. |
| 6,078,893 A | 6/2000 | Ouimet et al. |
| 6,094,641 A | 7/2000 | Ouimet et al. |
| 6,125,355 A | 9/2000 | Bekaert et al. |
| 6,134,534 A | 10/2000 | Walker et al. |
| 6,173,345 B1 | 1/2001 | Stevens |
| 6,202,070 B1 | 3/2001 | Nguyen et al. |
| 6,205,431 B1 | 3/2001 | Willemain et al. |
| 6,219,649 B1 | 4/2001 | Jameson |
| 6,308,162 B1 | 10/2001 | Ouimet et al. |
| 6,321,207 B1 | 11/2001 | Ye |
| 6,341,268 B2 | 1/2002 | Walker et al. |
| 6,341,269 B1 | 1/2002 | Dulaney et al. |
| 6,397,193 B1 | 5/2002 | Walker et al. |
| 6,405,175 B1 | 6/2002 | Ng |
| 6,430,539 B1 | 8/2002 | Lazarus et al. |
| 6,456,986 B1 | 9/2002 | Boardman et al. |
| 6,536,935 B2 | 3/2003 | Parunak et al. |
| 6,546,387 B1 | 4/2003 | Triggs |
| 6,553,352 B2 | 4/2003 | Delurgio et al. |
| 6,567,824 B2 | 5/2003 | Fox |
| 6,609,101 B1 | 8/2003 | Landvater et al. |
| 6,684,193 B1 | 1/2004 | Chavez et al. |
| 6,697,824 B1 | 2/2004 | Bowman-Amuah |
| 6,725,208 B1 | 4/2004 | Hartman et al. |
| 6,731,998 B2 | 5/2004 | Walser et al. |
| 6,735,572 B2 | 5/2004 | Landesmann |
| 6,745,184 B1 | 6/2004 | Choi et al. |
| 6,826,538 B1 | 11/2004 | Kalyan et al. |
| 6,910,017 B1 | 6/2005 | Woo et al. |
| 6,934,931 B2 | 8/2005 | Plumer et al. |
| 6,965,867 B1 | 11/2005 | Jameson |
| 6,988,076 B2 | 1/2006 | Ouimet |
| 7,058,617 B1 | 6/2006 | Hartman et al. |
| 7,062,447 B1 | 6/2006 | Valentine et al. |
| 7,072,848 B2 | 7/2006 | Boyd et al. |
| 7,092,929 B1 | 8/2006 | Dvorak et al. |
| 7,155,402 B1 | 12/2006 | Dvorak |
| 7,302,410 B1 | 11/2007 | Venkatraman et al. |
| 7,437,308 B2 | 10/2008 | Kumar et al. |
| 7,523,047 B1 | 4/2009 | Neal et al. |
| 7,657,470 B1 | 2/2010 | Delurgio et al. |
| 7,899,691 B1 | 3/2011 | Lee et al. |
| 7,958,020 B2 | 6/2011 | Inoue |
| 8,027,865 B2 | 9/2011 | Gilbert |
| 8,055,592 B2 | 11/2011 | Boyle et al. |
| 8,200,590 B2 | 6/2012 | Triantafillidis |
| 2001/0014868 A1 | 8/2001 | Herz et al. |
| 2002/0023001 A1 | 2/2002 | McFarlin et al. |
| 2002/0042739 A1 | 4/2002 | Srinivasan et al. |
| 2002/0042755 A1 | 4/2002 | Kumar et al. |
| 2002/0107819 A1 | 8/2002 | Ouimet |
| 2002/0116348 A1 | 8/2002 | Phillips et al. |
| 2002/0123930 A1 | 9/2002 | Boyd et al. |
| 2002/0169657 A1 | 11/2002 | Singh et al. |
| 2002/0198794 A1 | 12/2002 | Williams et al. |
| 2003/0028437 A1 | 2/2003 | Grant et al. |
| 2003/0177103 A1 | 9/2003 | Ivanov et al. |
| 2003/0200185 A1 | 10/2003 | Huerta et al. |
| 2003/0220830 A1 | 11/2003 | Myr |
| 2004/0111358 A1 | 6/2004 | Lange et al. |
| 2004/0243432 A1 | 12/2004 | Kelly et al. |
| 2005/0055275 A1 * | 3/2005 | Newman et al. ............. 705/14 |
| 2005/0096963 A1 | 5/2005 | Myr et al. |
| 2005/0108070 A1 | 5/2005 | Kelly et al. |
| 2005/0273377 A1 | 12/2005 | Ouimet et al. |
| 2006/0161504 A1 | 7/2006 | Walser et al. |
| 2006/0224534 A1 | 10/2006 | Hartman et al. |
| 2008/0077572 A1 | 3/2008 | Boyle et al. |
| 2008/0086429 A1 | 4/2008 | Venkatraman et al. |
| 2008/0249870 A1 | 10/2008 | Angell et al. |
| 2009/0018996 A1 * | 1/2009 | Hunt et al. ..................... 707/2 |
| 2009/0216576 A1 | 8/2009 | Saeed et al. |
| 2009/0271245 A1 | 10/2009 | Joshi et al. |
| 2010/0145772 A1 | 6/2010 | McCauley et al. |
| 2010/0145773 A1 | 6/2010 | Desai et al. |
| 2010/0228604 A1 | 9/2010 | Desai et al. |
| 2011/0208569 A1 | 8/2011 | Fano et al. |
| 2011/0320248 A1 * | 12/2011 | Gorelik .............. G06Q 30/0211 705/14.13 |
| 2016/0232505 A9 * | 8/2016 | Singhal .............. G06K 19/0723 |

FOREIGN PATENT DOCUMENTS

| | | |
|---|---|---|
| WO | WO 97/46950 | 12/1997 |
| WO | WO 98/53415 | 11/1998 |
| WO | 2000070560 A1 | 11/2000 |
| WO | WO 00/70519 | 11/2000 |
| WO | WO 00/70556 | 11/2000 |

OTHER PUBLICATIONS

PCT International Search Report and Written Opinion, Application No. PCT/US2010/058107, dated Mar. 21, 2011, 9 pages.

PCT International Preliminary Report on Patentability WIPO, Application No. PCT/US2010/058107, dated Apr. 5, 2012, 6 pages.

U.S. Appl. No. 09/741,956, filed Dec. 20, 2000, "Econometric Engine", 150 pages.

Diebold, Francis X., "The Past, Present, and Future of Macroeconomic Forecasting" Economic Perspectives (IJEP), vol. 12, No. 2, pp. 175-192, Spring 1998.

Montgomery: "The Impact of Micro-Marketing on Pricing Strategies", 1994 The University of Chicago vol. 55/12-A of Dissertation of Abstracts International, p. 3922 (Abstract Only).

Busch: "Cost Modeling as a Technical Management Tool", Research-Technology Management, Nov./Dec. 1994, vol. 37, No. 6, pp. 50-56.

Deighton, John, et al., "The Effects of Advertising on Brand Switching and Repeat Purchasing", Journal of Marketing Research, vol. XXXI, Feb. 1994, pp. 28-43.

Kadiyali et al., "Manufacturer-retailer Channel Interactions and Implications for channel Power: An Investigation of Pricing in Local Market", Marketing Science, Spring 2000, V. 19, Issue 2.

Andrew B. Gelman et al., "Bayesian Data Analysis", pp. 439-455, Chapman & Hall/CRC, First Edition 1995, Reprinted 2000.

Hillier, Frederick S., et al., "Introduction to Operations Research", McGraw-Hill, Inc., 1995, Sixth Edition, pp. 1-14.

"KhiMetrics Helps Retailers Increase Margins with Two New Tools for Their Retail Revenue Management Application Suite." PR Newswire, Mar. 1, 2001.

(56) References Cited

OTHER PUBLICATIONS

"KhiMetrics and Retek Form Marketing Alliance for Comprehensive Retail Pricing Solution." PR Newswire, Feb. 19, 2001.
Barth, Brad. "ShopKo Holds the Price Line." Daily News Record, p. 10, Oct. 4, 2000.
"Manugistics Agrees to Acquire Talus Solutions." PR Newswire, Sep. 21, 2000.
"Goodyear Implements Trilogy's MultiChannel Pricing Solution as Its Enterprise-Wide E-Pricer Platform." Business Wire, p. 2286, Jun. 27, 2000.
"IMRglobal Signs New Product Implementation Agreement with Retek to Improve Retail Pricing and Markdown Process." Business Wire, p. 1590, Jun. 7, 2000.
"New Tools for Modeling Elasticity, Optimizing Prices and Collecting Live Pricing from the Web to Debut at Retail Systems 2000 in Chicago." Business Wire, p. 1484, Apr. 18, 2000.
Smith et al., "A Discrete Optimization Model for Seasonal Merchandise Planning." Journal of Retailing, vol. 74, No. 2, p. 193(29), Summer 1998.
Barth, Brad, "Shopko Tests Automated Markdowns", WWD Oct. 4, 2000, pp. 1-3.
Cook, Martie, "Optimizing Space and Sales with Markdown Software", Office.com, May 31, 2000, p. 1.
"Essentus and Spotlight Solutions Partnership Delivers Precise Markdown Decisions", Business Wire, Apr. 17, 2000, 3 pages.
Melcer, Rachel, "Local Tech Firm Creates Retail Markdown Tool", Business Courier online, Mar. 24, 2000, pp. 1-4.
Technology Strategy Incorporated, www.grossprofit.com, Mar. 2, 2000, pp. 1-20.
Flanagan, David, "Javascript: The Definitive Guide, $3^{rd}$ Edition," published by O'Reilly in Jun. 1998 (ISBN 1-56592-392-8) section 14.8.
Berners-Lee, T., "Hypertext Markup Language 2.0 Working Paper," Nov. 1995 (pp. 1-3).
Tellis, Gerard J., and Fred S. Zufryden, "Tackling the Retailer Decision Maze: Which Brands to Discount, How Much, When and Why," Marketing Science, vol. 1, No. 34, 1995 (pp. 271-299).
Abraham, Magid M. and Leonard M. Lodish, "Promoter: An Automated Promotion Evaluation System," Marketing Science, vol. 6, No. 2, 1987 (p. 101-123).
Little, John D. C., "Brandaid: A Marketing-Mix Model, Part 1: Structure," Operations Research, vol. 23, No. 4, Jul.-Aug. 1975 (p. 628-655).
Cerf, Vinton G. and Robert E. Kahn, "A Protocol for Packet Network Interconnection," IEEE Transactions on Communications COM-22, May 1974, (p. 637-648).
Scherage, Dan, "You Do the Math", Chain Store Age, v76, n7, Jul. 2000.
"Gymboree Enhances Price Management", Retail Systems Alert, vol. 13, No. 6, Jun. 2000.
Binkley, James K., and John M. Connor, "Grocery Market Pricing and the New Competitive Environment." Journal of Retailing, v74, n2, Summer 1998.
"Merriam Webster's Collegiate Dictionary", $10^{th}$ edition, p. 585, Merriam-Webster Incorporated, 1999.
Hernandez, Mauricio A., and Salvatore J. Stolfo, "Real-world Data is Dirty: Data Cleansing and the Merge/Purge Problem", Data Mining and Knowledge Discovery, vol. 2, Issue 1, Jan. 1998.
A.F.M. Smith, "A General Bayesian Linear Model," University of Oxford, Apr. 1972.
Alan L. Montgomery and Peter R. Rossi, "Estimating Price Elasticities with Theory-Based Priors," Journal of Marketing Research vol. XXXVI, Nov. 1999 (pp. 413-423).
Boatwright, Peter et al., "Account-Level Modeling for Trade Promotion: An Application of a Constrained Parameter Hierarchical Model," Journal of the American Statistical Association, vol. 94, No. 448, Dec. 1999 (pp. 1063-1073).
Alan L. Montgomery, "Creating Micro-Marketing Pricing Strategies Using Supermarket Scanner Data," Marketing Science, vol. 16, No. 4, 1997 (pp. 315-337).
Robert C. Blattberg and Edward I. George, "Shrinkage Estimation of Price and Promotional Elasticities: Seemingly Unrelated Equations," Journal of the American Statistical Association, vol. 86, No. 414, Jun. 1991 (pp. 304-315).
Arnold Zellner, "On Assessing Prior Distributions and Bayesian Regression Analysis With G-Prior Distributions," Elsevier Science Publishers, 1986 (pp. 233-243).
D. V. Lindley and A.F.M. Smith, "Bayes Estimates for the Linear Model," University College, Dec. 1971.
George C. Tiao and Arnold Zellner, "On the Bayesian Estimation of Multivariate Regression," University of Wisconsin, Jan. 1964.
Arnold Zellner, "An Efficient Method of Estimating Seemingly Unrelated Regressions and Tests for Aggregation Bias," University of Wisconsin, Jun. 1962.
"PCT International Search Report", Application No. PCT/US03/30488, dated Jan. 28, 2004.
"PCT International Search Report", Application No. PCT/US02/14977, dated May 5, 2003.
Dyer, Robert F., et al., "Case Studies in Marketing Decisions Using Expert Choice" Decision Support Software, 1988, pp. 2-7, 73-108.
"PCT International Search Report", Application No. PCT/US02/36710, dated Jul. 21, 2003.
Yoeman, John Cornelius, Jr. "The Optimal Offering Price for Underwritten Securities", vol. 55/01-A of Dissertation Abstracts International, p. 4743; 1993 (Abstract only).
"Pacificorp IRP: Renewables Costs Must Drop 65% to Be Competitive with Gas" McGraw-Hill Publications, Dec. 8, 1995.
"Report of Novelty Search" by Patentec, dated Feb. 9, 2001.
Rossi, Delurgio, & Kantor; "Making Sense of Scanner Data;" Harvard Business Review, Reprint F00205, 2000.
Bucklin & Gupta, "Brand Choice, Purchase Incidence, and Segmentation: An Integrated Modeling Approach," Journal of Marketing Research, May 1992, pp. 201-215, vol. XXIX.
Smith, Mathur, & Kohn; "Bayesian Semiparametric Regression: An Exposition and Application to Print Advertising;" Jan. 3, 1997; Australian Graduate School of Management, University of New South Wales, Sydney 2052, Australia.
Blattberg and Deighton, "Manage Marketing by the Customer Equity;" Harvard Business Review, Jul.-Aug. 1996, pp. 136-144.
Christen, Gupta, Porter, Staelin & Wittink; "Using Market-Level Data to Understand the Effectiveness of Promotional Activities;" Dec. 22, 1995.
Link, Ross; "Are Aggregate Scanner Data Models Biased?" Journal of Advertising Research, Sep./Oct. 1995, pp. RC8-RC12, ARF.
Russell & Kamakura, "Understanding Brand Competition Using Micro and Macro Scanner Data," Journal of Marketing Research, vol. XXXI (May 1994), pp. 289-303.
Jones, John Philip, "The Double Jeopardy of Sales Promotions," Harvard Business Review, Sep.-Oct. 1999, pp. 145-152.
Supplementary European Search Report, Application No. 02719197.2-2221, dated Feb. 2, 2007.
Buzzell, Quelch, and Salmon, "The Costly Bargain of Trade Promotion;" Harvard Business Review, reprint 90201, Mar.-Apr. 1990, pp. 1-9.
Curry, Divakar, Mathur, and Whiteman; "BVAR as a Category Management Tool: An Illustration and Comparison with Alternative Techniques;" Journal of Forecasting, vol. 14, Issue No. 3 (1995), pp. 181-199.
"Report of Novelty Search" by Patentec, dated Jul. 25, 2001.
Stephen J. Hoch et al., "Store Brands and Category Management", The Wharton School, University of Pennsylvania, Mar. 1998, pp. 1-38.
Bruce G.S. Hardie et al., "Attribute-based Market Share Models: Methodological Development and Managerial Applications", The Wharton School, University of Pennsylvania, Working Paper 98-009, pp. 1-48, 1998.
Alan Mercer, "Non-linear Price Effects", Journal of the Market Research Society, dated Jul. 1, 1996, p. 227.
Rockney G. Walters, "Assessing the Impact of Retail Price Promotions on Product Substitution, Complementary Purchase, and Interstore Sales Displacements", Journal of Marketing, vol. 55, Apr. 1991, pp. 17-28.

(56) References Cited

OTHER PUBLICATIONS

Robert C. Blattberg et al., "How Promotions Work", Marketing Science, vol. 14. No. 3, Part 2 of 2, 1995, pp. G122-G132.

Peter M. Guadagni et al., "A Logit Model of Brand Choice Calibrated on Scanner Data", Marketing Science, vol. 2, No. 3, Summer 1983, pp. 203-238.

Lee G. Cooper et al., "Standardizing Variables in Multiplicative Choice Models", Journal of Consumer Research, vol. 10, Jun. 1983, pp. 96-108.

Richard R. Batsell, et al., "A New Class of Market Share Models", Marketing Science, vol. 4, No. 3, Summer 1985, pp. 177-198.

Jagmohan S. Raju, "The Effect of Price Promotions on Variability in Product Category Sales", Marketing Science, vol. 11, No. 3, Summer 1992, pp. 207-220.

Robert J. Dolan, "How Do You Know When the Price is Right?", Harvard Business Review, Sep.-Oct. 1995, pp. 4-11.

Fusun Gonul, "Modeling Multiple Sources of Heterogeneity in Multinomial Logit Models: Methodological and Managerial Issues", Marketing Science, vol. 12, No. 3, Summer 1993, pp. 213-229.

Robert M. Schindler et al., "Increasing Consumer Sales Response Through Use of 99-Ending Prices", Journal of Retailing, Jun. 1, 1996, p. 187.

Francis J. Mulhern et al., "The Relationship between Retail Price Promotions and Regular Price Purchases", Journal of Marketing Research, vol. XXXI, Feb. 1994, pp. 28-43.

Sunil Gupta, "Reflections on 'Impact of Sales Promotions on When, What, and How Much to Buy'", Journal of Marketing Research, vol. XXX, Nov. 1993, pp. 522-524.

Richard A. Briesch, "Does It Matter How Price Promotions Are Operationalized?", Marketing Letters 8:2 (1997), pp. 167-181.

William R. Dillon et al., "A Segment-level Model of Category Volume and Brand Choice", Marketing Science, vol. 15, No. 1, 1996, pp. 38-59.

Stephen J. Hoch et al., Determinants of Store-Level Price Elasticity, Journal of Marketing Research, vol. XXXII (Feb. 1995), pp. 17-29.

Magid M. Abraham et al., "An Implemented System for Improving Promotion Productivity Using Store Scanner Data", Marketing Science, vol. 12, No. 3, Summer 1993.

Peter S. Fader et al., "Modeling Consumer Choice Among SKUs", Journal of Marketing Research, vol. XXXIII (Nov. 1996), pp. 442-452.

PCT International Search Report & the Written Opinion of the International Searching Authority, Application No. PCT/US07/20678, dated Feb. 26, 2008.

\* cited by examiner

ANALYZING CUSTOMER SEGMENTS

CROSS REFERENCE TO RELATED APPLICATIONS

This application pertains to U.S. application Ser. No. 09/1741,956 filed on Dec. 20, 2000, and entitled "Econometric Engine", now U.S. Patent No. 7,899,691, which is hereby fully incorporated by reference.

BACKGROUND OF THE INVENTION

The present invention relates to a system and methods for a business tool for analyzing customer segments in a retail setting for the development of targeted and effective promotional activity. This business tool may be stand alone, or may be integrated into a pricing optimization system to provide more effective pricing of products. More particularly, the present customer analyzer system may identify and categorize customers into segments based upon customer attributes and behaviors. From these generated segments, promotional activity may be devised to produce a desired result, such as market share expansion, profit maximization, consumer behavior manipulation or some combination.

For a business to properly and profitably function, there must be decisions made regarding product pricing and promotional activity which, over a sustained period, effectively generates more revenue than costs incurred. In order to reach a profitable condition, the business is always striving to increase revenue while reducing costs.

One such method to increase revenue is via proper pricing of the products or services being sold. Additionally, the use of promotions may generate increased sales which aid in the generation of revenue. Likewise, costs may be decreased by ensuring that only required inventory is shipped and stored. Also, reducing promotion activity reduces costs. Thus, in many instances, there is a balancing between a business activity's costs and the additional revenue generated by said activity. The key to a successful business is choosing the best activities which maximize the profits of the business.

Choosing these profit maximizing activities is not always a clear decision. There may be no readily identifiable result to a particular activity. Other times, the profit response to a particular promotion may be counter intuitive. Thus, generating systems and methods for identifying and generating business activities which achieves a desired business result is a prized and elusive goal.

Currently, there are numerous methods of generating product pricing through demand modeling and comparison pricing. In these known systems, product demand and elasticity may be modeled to project sales at a given price. The most advanced models include cross elasticity between sales of various products. While these methods of generating prices and promotions may be of great use to a particular business, there are a number of problems with these systems. Primarily, these methods of pricing are reactive to historical transaction data. While some effort is made to increase consumer purchasing, these systems are less able to drive particular purchasing behaviors. Additionally, these systems treat the consumer as an aggregate entity. There is little granularity within the consumer base, thereby limiting the specificity of business activities to a particular group of the consumer base.

Returning to the basic principles of sound business management, that being increasing revenue while reducing costs, by introducing specificity of the consumer base in the generation of business decisions, a store may achieve more targeted (less cost) promotions which more effectively (increased revenue) influence the purchasing behaviors of the relevant consumers.

It is therefore apparent that an urgent need exists for improved analysis of customer segments. This improved customer segment analysis enables highly targeted promotions and more effective promotional activity. When coupled to a pricing optimization system, the customer segment analyzer may generate more finely tuned pricing for given products. This customer segment analyzer system provides businesses with an advanced competitive tool to greatly increase business profitability.

SUMMARY OF THE INVENTION

To achieve the foregoing and in accordance with the present invention, a system and method for customer segment analysis is provided. In particular, the system and methods segments customers using transaction history in order to aid in the optimization of prices, and further in order to aid in the generation of customer specific promotional activity.

The system for analyzing consumer segments may be useful in association with a price optimization system. The system receives customer transaction data for the generation of segments. This customer transaction data includes, at a minimum, point of sales data. These point-of-sales records may be received as historical records or in real time. In addition to point of sales records, identification information may be queried. These customer identification data may be received from the consumers directly, from third parties, collected information and public record information.

After receipt of the transaction and customer data, individual customers may be segmented by statistically relevant groups. This may begin by detecting errors in the received data. Errors in the data may be corrected for or even eliminated from the dataset. The segmentation of consumers may also be accomplished by comparing data of known customers to known segments. Unknown customers, new customers and point of sales data which is missing customer data may also be segmented via statistical similarity to known segments. The factors utilized in generation of segments may include any of the following: income, spend habits, geo-demography, recency of shopping, frequency of shopping, monetary value of shopping trips, number of product categories shopped, by index value compared to prior value of the index value for the customer, and by index value compared to average index value for all customers. The results of this statistical analysis may be meshed with known identified customer segments to generate the final sets of customer segments.

Transaction history may now be reevaluated through the lens of customer segments. Segment wide point of sale data may be generated. This data may then be aggregated by consumer groups. Consumer groups may include by household or other communal purchasing entity.

The aggregated segment data may be validated and transformed for outputting to the optimization system. The price optimization system may use the segment data for generation of preferred prices.

In some embodiments, feedback from the optimization engine may be utilized by the customer segmentation system to generate customer segment specific promotional activity.

Note that the various features of the present invention described above may be practiced alone or in combination. These and other features of the present invention will be described in more detail below in the detailed description of the invention and in conjunction with the following figures.

BRIEF DESCRIPTION OF THE DRAWINGS

In order that the present invention may be more clearly ascertained, some embodiments will now be described, by way of example, with reference to the accompanying drawings, in which.

DETAILED DESCRIPTION OF THE INVENTION

The present invention will now be described in detail with reference to several embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention. The features and advantages of the present invention may be better understood with reference to the drawings and discussions that follow.

The present invention relates to a system and methods for a business tool for generating and analyzing customer segments for generation of customer targeted promotions and customer insights for business planning. This business tool may be stand alone, or may be integrated into a pricing optimization system to provide more effective pricing of products. For example, the customer segment data may be incorporated into price optimization to modify elasticity variables to achieve a desired purchasing behavior in the target customer segment. More particularly, the present customer segment analyzer system may categorize known and unknown customers according to demographic and behavioral cues to more precisely predict future purchasing behaviors given particular pricing or promotions.

Figure 1:
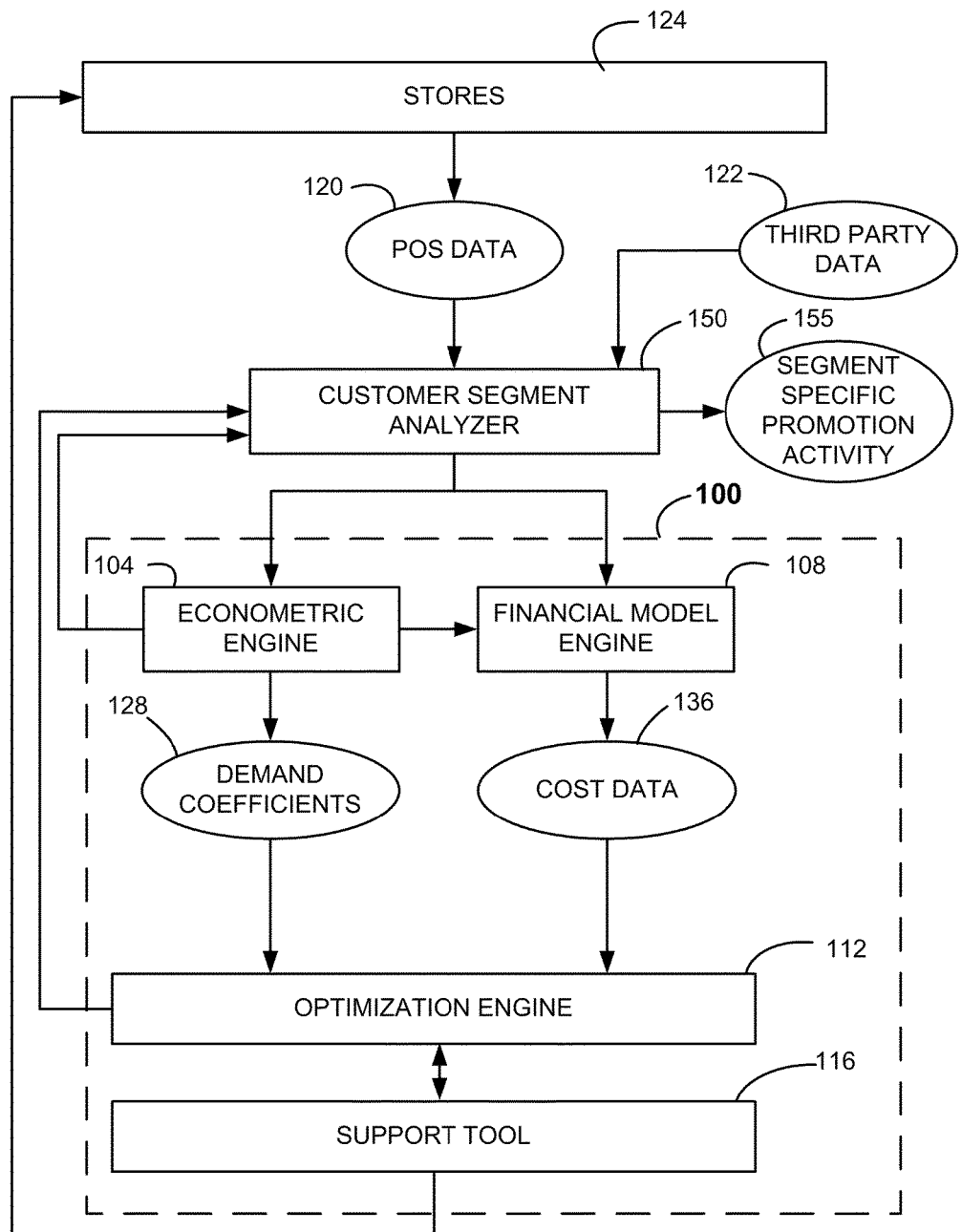
FIG. 1 is a high level schematic view of an embodiment of a price optimization system with an integrated customer segment analyzer system.
Figure 2:
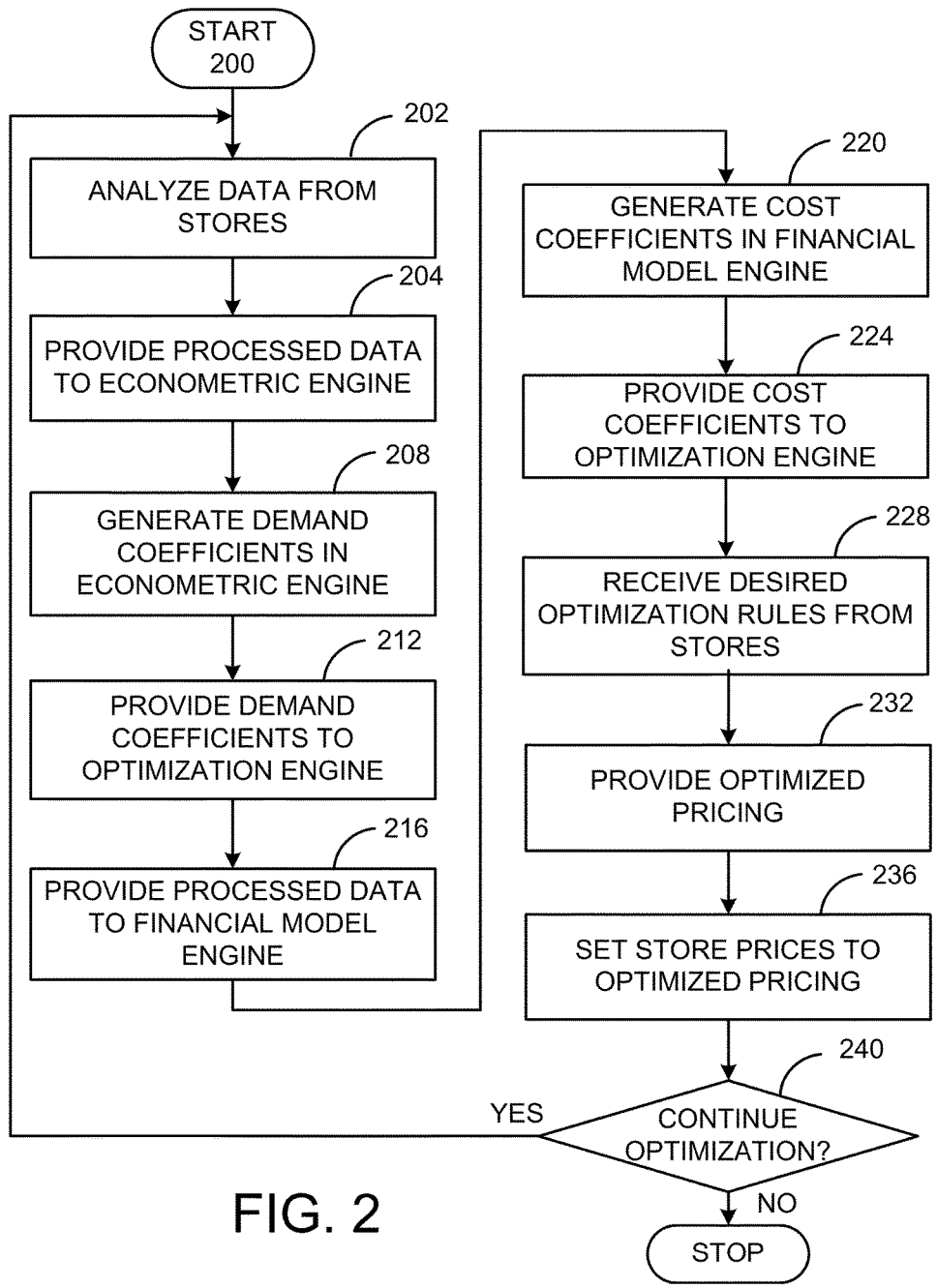
FIG. 2 is high level flow chart of an optimization process.

To facilitate discussion, FIGS. 1 and 2 show a customer segment analyzer coupled to an optimization system and methods for such a system. FIGS. 3-6 illustrate the optimization system and methods in more detail. General computer systems for the optimization system and retention system may be seen at FIGS. 7 and 8. FIGS. 9 to 12D illustrate data error correction for optimization. FIGS. 13-20 show various pricing optimization processes.

Figure 30:
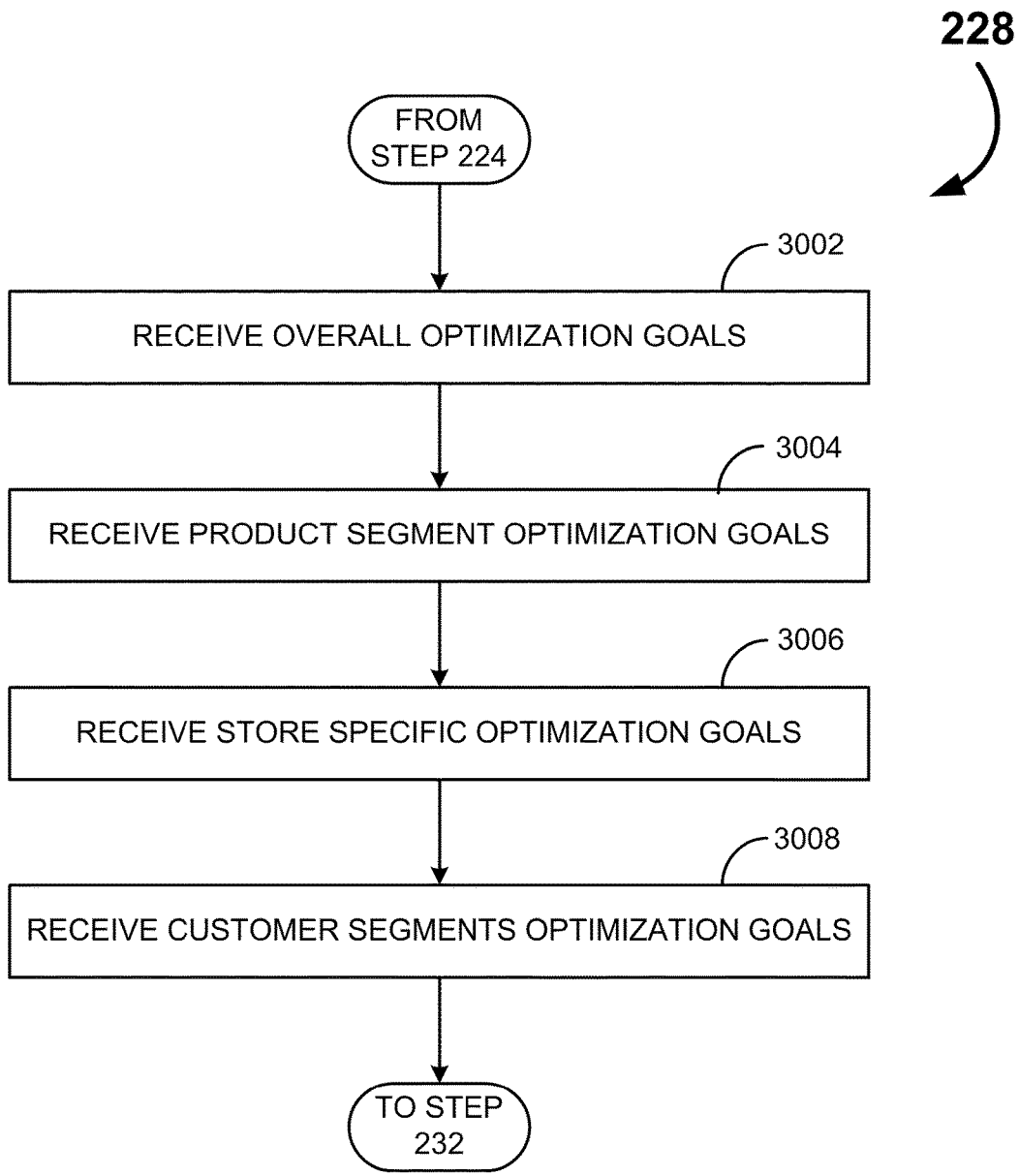
FIG. 30 is a flow chart depicting a process flow for receiving desired optimization rules from stores.
Figure 31:
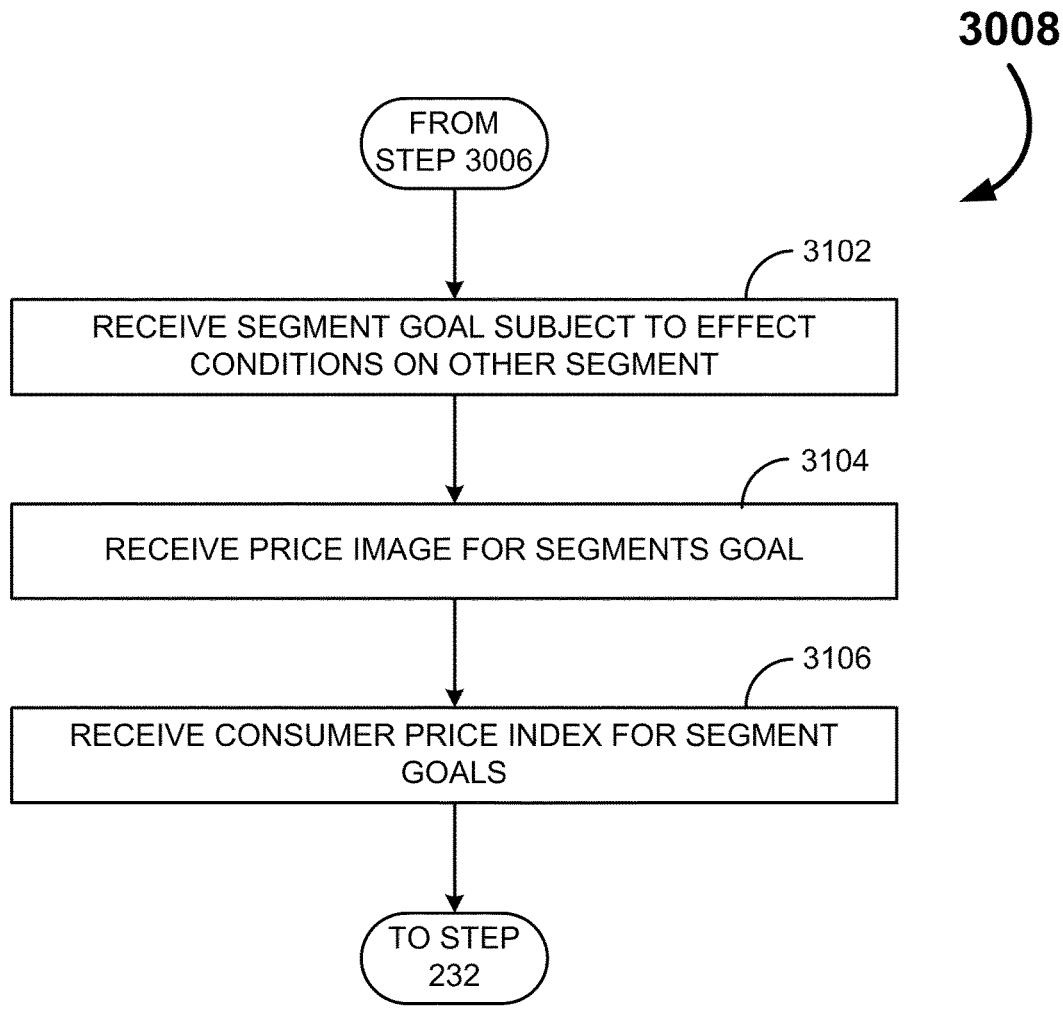
FIG. 31 is a flow chart depicting a process flow for receiving customer segment optimization goals.
Figure 32:
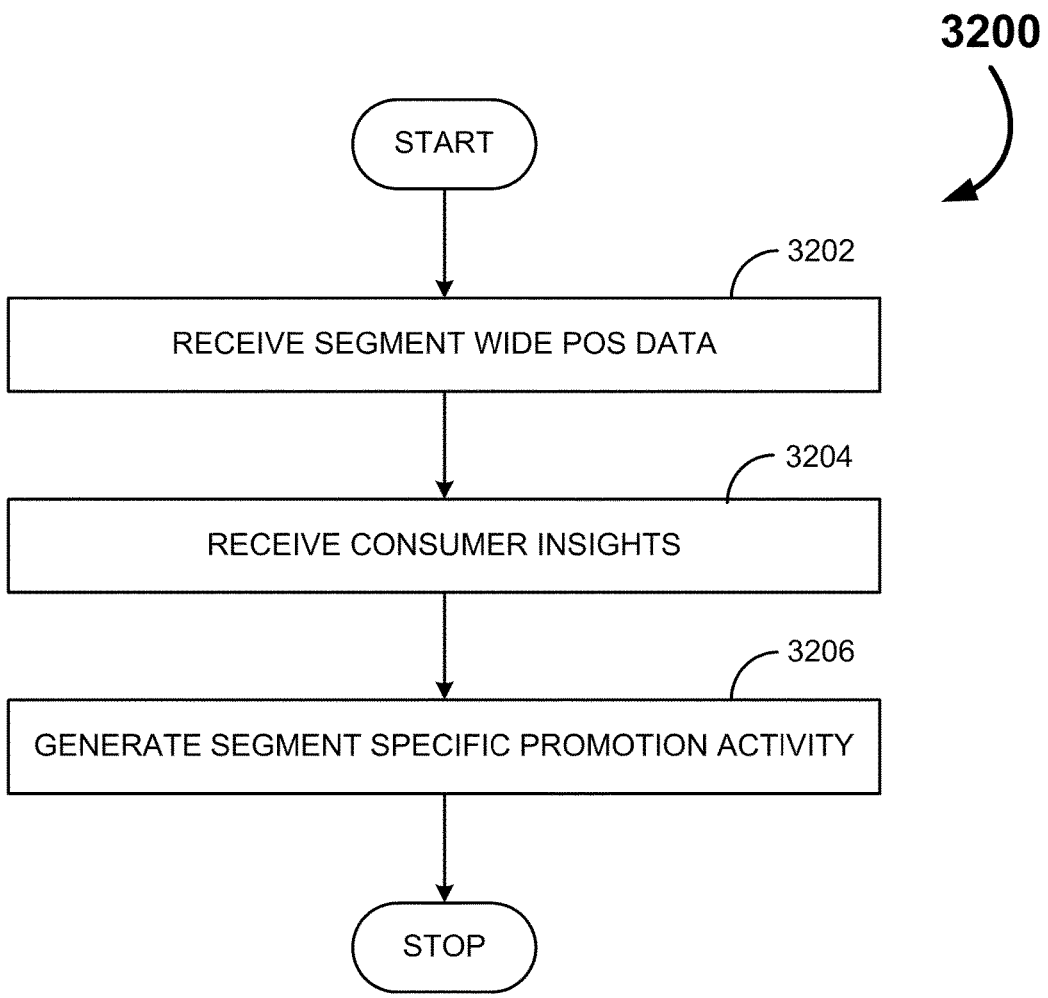
FIG. 32 is a flow chart depicting a process flow for analyzing customer segments for promotional activity.
Figure 33:
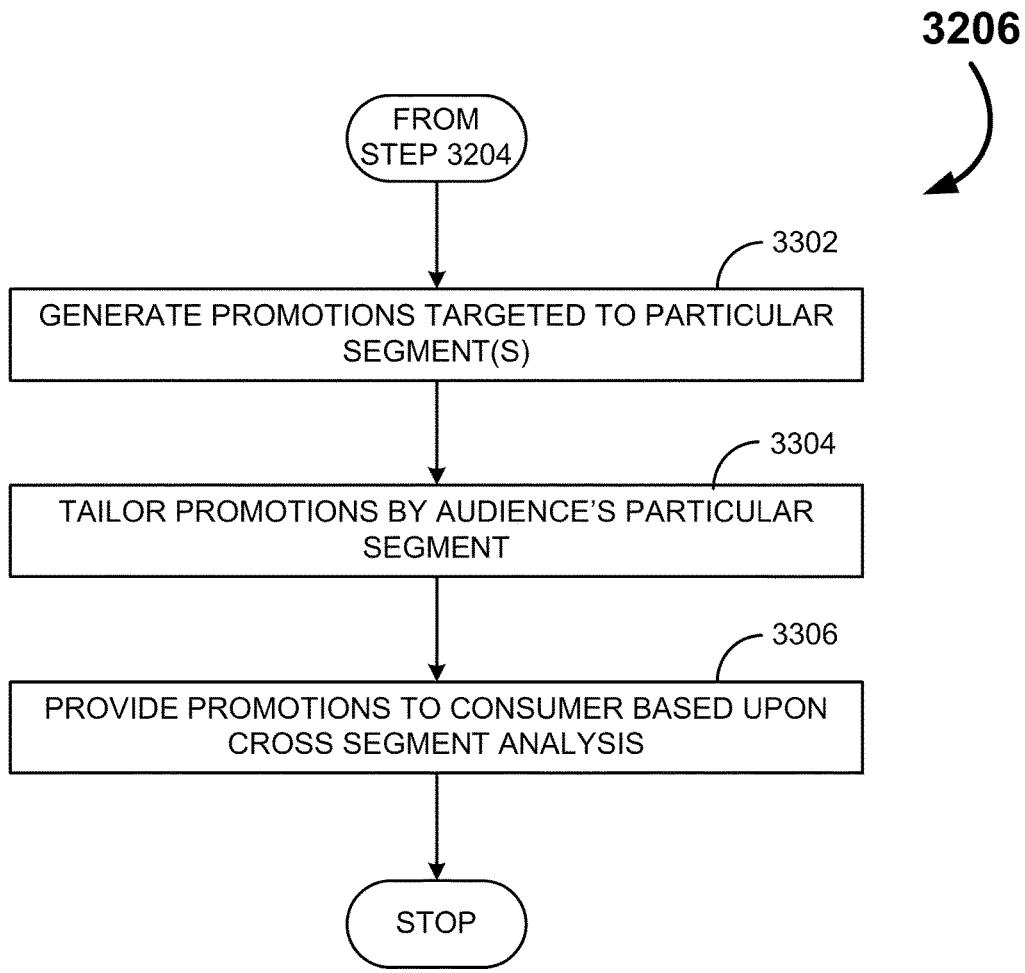
FIG. 33 is a flow chart depicting a process flow for generating customer segment specific promotional activity.

FIGS. 21 to 24 detail the customer segment analyzer. Likewise, FIGS. 25 to 29 illustrate the method of generating customer segments and analyzing the segments. FIGS. 30 and 31 illustrate the methods for receiving and organizing optimization rules. FIGS. 32 and 33 illustrate the method for generating customer segment specific promotions. Lastly, FIGS. 34 to 37 illustrate charts showing analysis of unit lift by customer segments.

Although useful for determining which grouping an individual, household or organization belongs to using external identification data and behavioral analysis the Customer Segment Analyzer 150 described below demonstrates particular utility for determining customer segments in a consumer setting. Additionally, when coupled to an optimization system as illustrated at FIG. 1, the Customer Segment Analyzer 150 may function as a particularly effective business tool.

The following description of some embodiments of the present invention will be provided in relation to numerous subsections. The use of subsections, with headings, is intended to provide greater clarity and structure to the present invention. In no way are the subsections intended to limit or constrain the disclosure contained therein. Thus, disclosures in any one section are intended to apply to all other sections, as is applicable.

I. Optimization System Overview

To facilitate discussion, FIG. 1 is a schematic view of a Price Optimizing System with Customer Segment Analysis 100. The Price Optimizing System with Customer Segment Analysis 100 comprises an Econometric Engine 104, a Financial Model Engine 108, an Optimization Engine 112, a Support Tool 116, and a Customer Segment Analyzer 150. The Econometric Engine 104 is connected to the Optimization Engine 112, so that the output of the Econometric Engine 104 is an input of the Optimization Engine 112. The Financial Model Engine 108 is connected to the Optimization Engine 112, so that the output of the Financial Model Engine 108 is an input of the Optimization Engine 112. Likewise, the Customer Segment Analyzer 150 is connected to the Financial Model Engine 108 and the Econometric Engine 104, so that the output of the Customer Segment Analyzer 150 is an input of the Financial Model Engine 108 and the Econometric Engine 104.

The Optimization Engine 112 is connected to the Support Tool 116 so that output of the Optimization Engine 112 is provided as input to the Support Tool 116 and output from the Support Tool 116 may be provided as input to the Optimization Engine 112. Likewise, both the Optimization Engine 112 and the Econometric Engine 104 are connected to the Customer Segment Analyzer 150 so that feedback from the Optimization Engine 112 and the Econometric Engine 104 is provided to the Customer Segment Analyzer 150. The Econometric Engine 104 may also exchange data with the Financial Model Engine 108.

Point of Sales (POS) Data 120 is provided from the Stores 124 to the Customer Segment Analyzer 150. Also, Third Party Data 122 may be utilized by the Customer Segment Analyzer 150 for the generation of customer insights and Segment Specific Promotion Activity 155.

FIG. 2 is a high level flow chart of a process 200 that utilizes the Price Optimizing System with Customer Segment Analysis 100. The operation of the Price Optimizing System with Customer Segment Analysis 100 will be discussed in general here and in more detail further below. Data 120 is provided from the Stores 124 to the Customer Segment Analyzer 150 for use in customer segment analysis (step 202). Generally, the data 120 provided to the Customer Segment Analyzer 150 may be point-of-sale information, product information, and store information. Additionally, the Customer Segment Analyzer 150 may receive data from third parties for generation of customer segments. Customer segment insights, generated segments and customer segment promotions may then be provided to the Econometric Engine 104 (step 204). The Econometric Engine 104 processes the analyzed data to provide demand coefficients 128 (step 208) for a set of algebraic equations that may be used to estimate demand (volume sold) given certain marketing conditions (i.e., a particular store in the chain), including a price point. The demand coefficients 128 are provided to the Optimization Engine 112 (step 212).

Additional processed data from the Econometric Engine 104 may also be provided to the Optimization Engine 112. The Financial Model Engine 108 may receive processed data from the Customer Segment Analyzer 150 (step 216) and processed data from the Econometric Engine 104. Data may also be received from the stores. This data is generally cost related data, such as average store labor rates, average distribution center labor rates, cost of capital, the average time it takes a cashier to scan an item (or unit) of product, how long it takes to stock a received unit of product and fixed cost data. The Financial Model Engine 108 may process all the received data to provide a variable cost and fixed cost for each unit of product in a store (step 220). The processing by the Econometric Engine 104 and the processing by the Financial Model Engine 108 may be done in parallel. Cost data 136 is provided from the Financial Model Engine 108 to the Optimization Engine 112 (step 224). The Optimization Engine 112 utilizes the demand coefficients 128 to create a demand equation. The optimization engine is able to forecast demand and cost for a set of prices to calculate net profit. The Stores 124 may use the Support Tool 116 to provide optimization rules to the Optimization Engine 112 (step 228).

The Optimization Engine 112 may use the demand equation, the variable and fixed costs, the rules, and retention data to compute an optimal set of prices that meet the rules (step 232). For example, if a rule specifies the maximization of profit, the optimization engine would find a set of prices that cause the largest difference between the total sales and the total cost of all products being measured. If a rule providing a promotion of one of the products by specifying a discounted price is provided, the optimization engine may provide a set of prices that allow for the promotion of the one product and the maximization of profit under that condition. In the specification and claims the phrases "optimal set of prices" or "preferred set of prices" are defined as a set of computed prices for a set of products where the prices meet all of the rules. The rules normally include an optimization, such as optimizing profit or optimizing volume of sales of a product and constraints such as a limit in the variation of prices. The optimal (or preferred) set of prices is defined as prices that define a local optimum of an econometric model which lies within constraints specified by the rules When profit is maximized, it may be maximized for a sum of all measured products.

Such a maximization, may not maximize profit for each individual product, but may instead have an ultimate objective of maximizing total profit. The optimal (preferred) set of prices may be sent from the Optimization Engine 112 to the Support Tool 116 so that the Stores 124 may use the user interface of the Support Tool 116 to obtain the optimal set of prices. Other methods may be used to provide the optimal set of prices to the Stores 124. The price of the products in the Stores 124 are set to the optimal set of prices (step 236), so that a maximization of profit or another objective is achieved. An inquiry may then be made whether to continue the optimization (step 240).

Each component of the Price Optimizing System with Customer Segment Analysis 100 will be discussed separately in more detail below.

II. Econometric Engine

Figure 3:
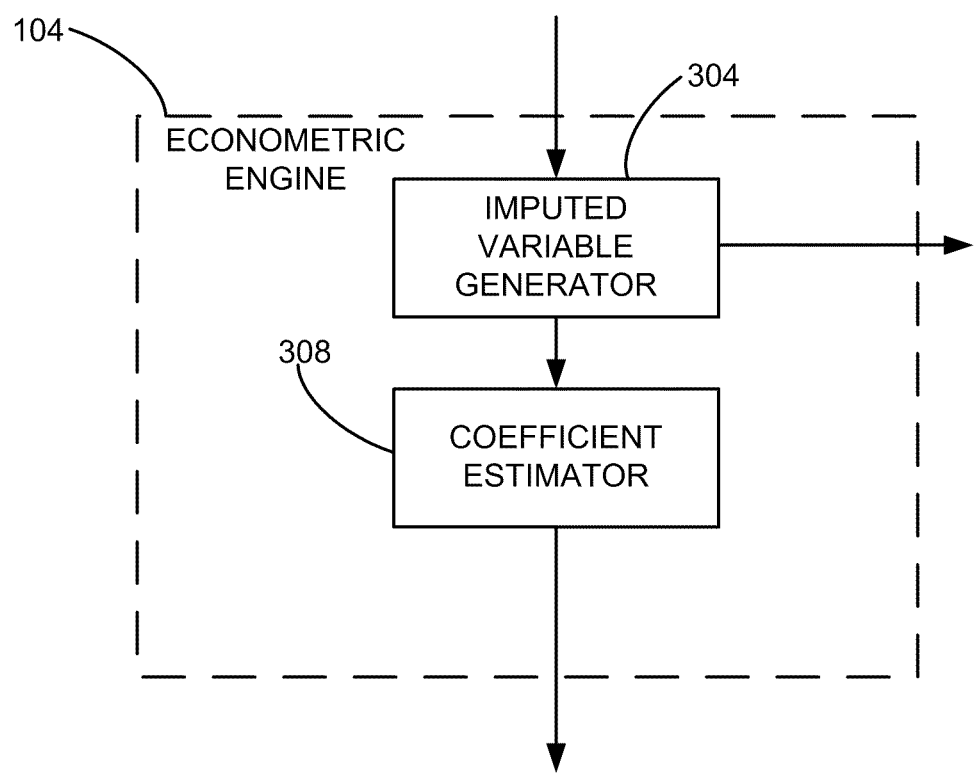
FIG. 3 is a more detailed schematic view of the econometric engine.

FIG. 3 is a more detailed view of the Econometric Engine 104. The econometric engine comprises an Imputed Variable Generator 304 and a Coefficient Estimator 308. The data 120 from the Stores 124 is provided to the Imputed Variable Generator 304. The data 120 may be raw data generated from cash register data, which may be generated by scanners used at the cash registers. Additionally, processed customer segment data may be provided to the Imputed Variable Generator 304 from the Customer Segment Analyzer 150.

A. Imputed Variable Generator

The present invention provides methods, media, and systems for generating a plurality of imputed econometric variables. Such variables are useful in that they aid businesses in determining the effectiveness of a variety of sales strategies. In particular, such variables can be used to gauge the effects of various pricing or sales volume strategies.

Figure 10:
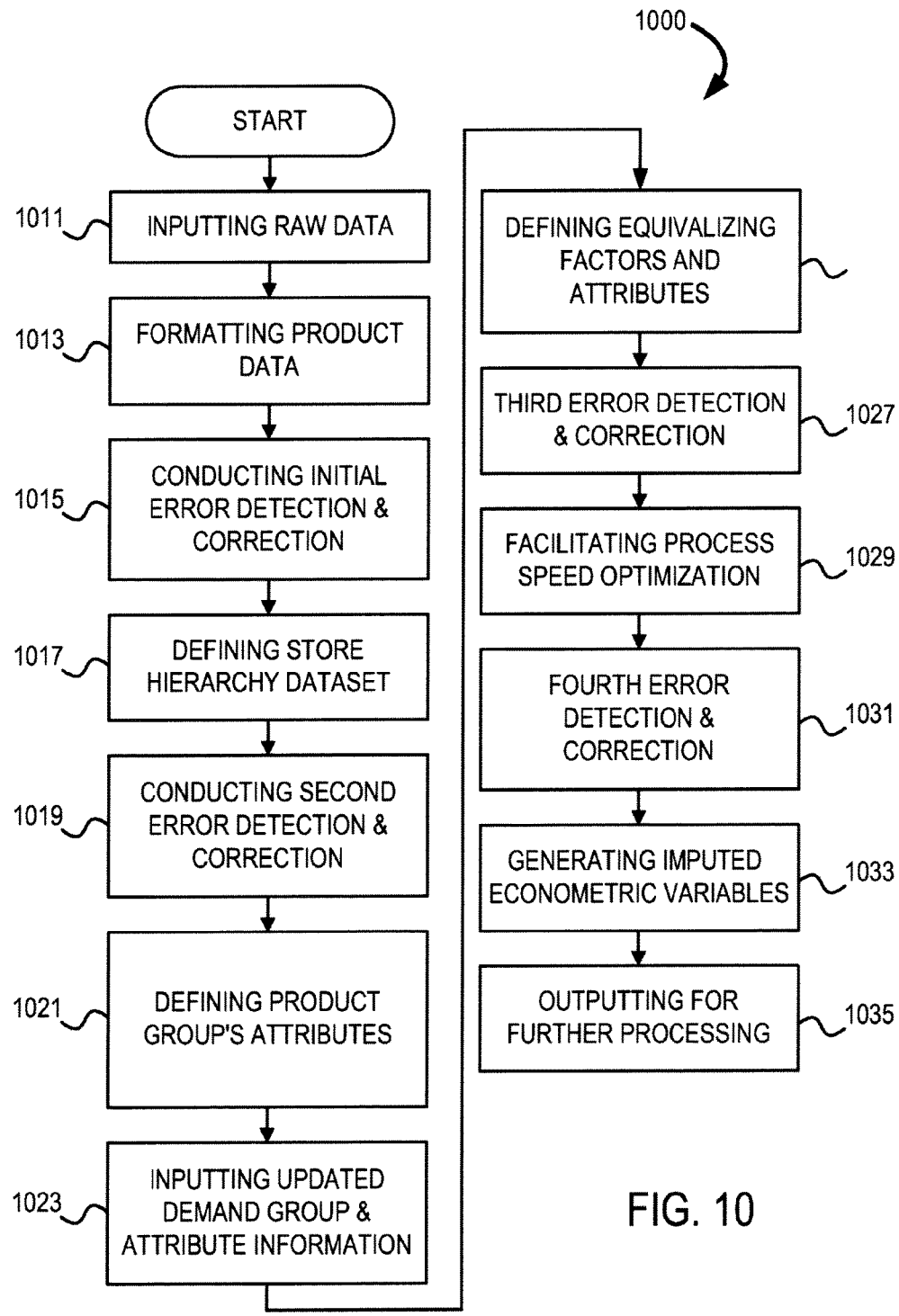
FIG. 10 is a flow chart depicting a process flow by which raw econometric data can be input, subject to "cleansing", and used to create an initial dataset which can then be used to generate imputed econometric variables in accordance with some embodiment of the present invention.

FIG. 10 illustrates a flowchart 1000 which describes steps of a method embodiment for data cleansing imputed econometric variable generation in accordance with the principles of the present invention. The process, generally described in FIG. 10, begins by initial dataset creation and data cleaning (Steps 1011-1031). This data set information is then used to generate imputed econometric variables (Step 1033) which can be output to and for other applications (Step 1035)

1. Initial Dataset Creation and Cleaning

The process of dataset creation and cleaning (that is to say the process of identifying incompatible data records and resolving the data incompatibility, also referred to herein as "error detection and correction") begins by inputting raw econometric data (Step 1011). The raw econometric data is then subject to formatting and classifying by UPC designation (Step 1013). After formatting, the data is subject an initial error detection and correction step (Step 1015). Once the econometric data has been corrected, the store information comprising part of the raw econometric data is used in defining a store data set hierarchy (Step 1017). This is followed by a second error detecting and correcting step (Step 1019). In some embodiments this is followed by defining a group of products which will comprise a demand group (i.e., a group of highly substitutable products) and be used for generating attribute information (Step 1021). Based on the defined demand group, the attribute information is updated (Step 1023). The data is equivalized and the demand group is further classified in accordance with size parameters (Step 1025). The demand group information is subjected to a third error detection and correction step (Step 1027). The demand group information is then manipulated to facilitate decreased process time (Step 1029). The data is then subjected to a fourth error detection and correction step (Step 1031), which generates an initial cleansed dataset. Using this initial cleansed dataset, imputed econometric variables are generated (Step 1033). Optionally, these imputed econometric variables may be output to other systems for further processing and analysis (Step 1035).

While this exemplary process of generating an initial dataset with cleansing is provided with some degree of detail, it is understood that the process for predicting customer loss and customer retention strategy generation may be performed with a variety of optimization systems. This includes systems where, for example, demand groups are not generated, and where alternative methods of data set generation are employed.

The process begins by inputting raw econometric data (Step 1011). The raw econometric data is provided by a client. The raw econometric data includes a variety of product information, including, but not limited to, the store from which the data is collected, the time period over which the data is collected, a UPC (Universal Product Code) for the product, and provide a UPC description of the product. Also, the raw econometric data must include product cost (e.g., the wholesale cost to the store), number of units sold, and either unit revenue or unit price. Also, the general category of product or department identification is input. A category is defined as a set of substitutable or complementary products, for example, "Italian Foods". Such categorization can be proscribed by the client, or defined by generally accepted product categories. Additionally, such categorization can be accomplished using look-up tables or computer generated product categories.

Also, a more complete product descriptor is generated using the product information described above and, for example, a UPC description of the product and/or a product description found in some other look-up table (Step 1013).

The data is then subjected to a first error detection and correction process (Step 1015). Typically, this step includes the removal of all duplicate records and the removal of all records having no match in the client supplied data (typically scanner data).

Data subsets concerning store hierarchy are defined (Step 1017). This means stores are identified and categorized into various useful subsets. These subsets can be used to provide information concerning, among other things, regional or location specific economic effects.

The data is then subjected to a second error detection and correction process (Step 1019). This step cleans out certain obviously defective records. Examples include, but are not limited to, records displaying negative prices, negative sales volume, or negative cost. Records exhibiting unusual price information, determined through standard deviation or cross store comparisons, are also removed.

This is followed by defining groups of products and their attributes and exporting this information to a supplementary file (e.g., a text file) (Step 1021). This product information can then be output into a separate process which can be used to define demand groups or product attributes. For example, this supplemental file can be input into a spreadsheet program (e.g., Excel®) which can use the product information to define "demand groups" (i.e., groups of highly substitutable products). Also, further product attribute information can be acquired and added to the supplementary file. In addition, updated demand group and attribute information can then be input as received (Step 1023). By maintaining a supplementary file containing large amounts of data, a more streamlined (abbreviated) dataset may be used in processing, thereby effectively speeding up processing time.

The data is further processed by defining an "equivalizing factor" for the products of each demand group in accordance with size and UOM parameters (Step 1025). This equivalizing factor can be provided by the client or imputed. An equivalizing factor can be imputed by using, for example, the median size for each UOM. Alternatively, some commonly used arbitrary value can be assigned. Once this information is gathered, all product prices and volume can be "equivalized". Chiefly, the purpose of determining an equivalizing factor is to facilitate comparisons between different size products in a demand group.

The data is then subjected to a third error detection and correction process, which detects the effects of closed stores and certain other erroneous records (Step 1027). In accord with the principles of the invention, stores that demonstrate no product movement (product sales equal to zero) over a predetermined time period are treated as closed. Those stores and their records are dropped from the process. The third error detection and correction also includes analysis tools for detecting the presence of erroneous duplicate records. A further correction can be made for records having the same date and causal value but have differing prices or differing number of units sold.

After all the duplicate records eliminated, the data is reconstructed. The data can be reviewed again to insure all duplicates are removed. Optionally, an output file including all discrepancies can be produced. In the event that it becomes necessary, this output file can be used as a follow-up record for consulting with the client to confirm the accuracy of the error detection and correction process.

Additionally, reduced processing times may be achieved by reformatting the data (Step 1029). For example, groups of related low sales volume products (frequently high priced items) can optionally be aggregated as a single product and processed together. Additionally, the data may be split into conveniently sized data subsets defined by a store or groups of stores which are then processed together to shorten the processing times.

Next the process includes determining the nature of missing data records in a fourth error detection and correction step (Step 1031). The missing data records are analyzed again before finally outputting a cleansed initial dataset. For example, data collected over a modeled time interval is analyzed by introducing the data into a data grid divided into a set of time periods. For the time periods having no records, a determination must be made. Is the record missing because:

a. there were no sales that product during that week (time period);

b. the product was sold out and no stock was present in the store during that time period (this situation is also referred to herein as a "stock-out");

c. the absence of data is due to a processing error.

Figure 11:
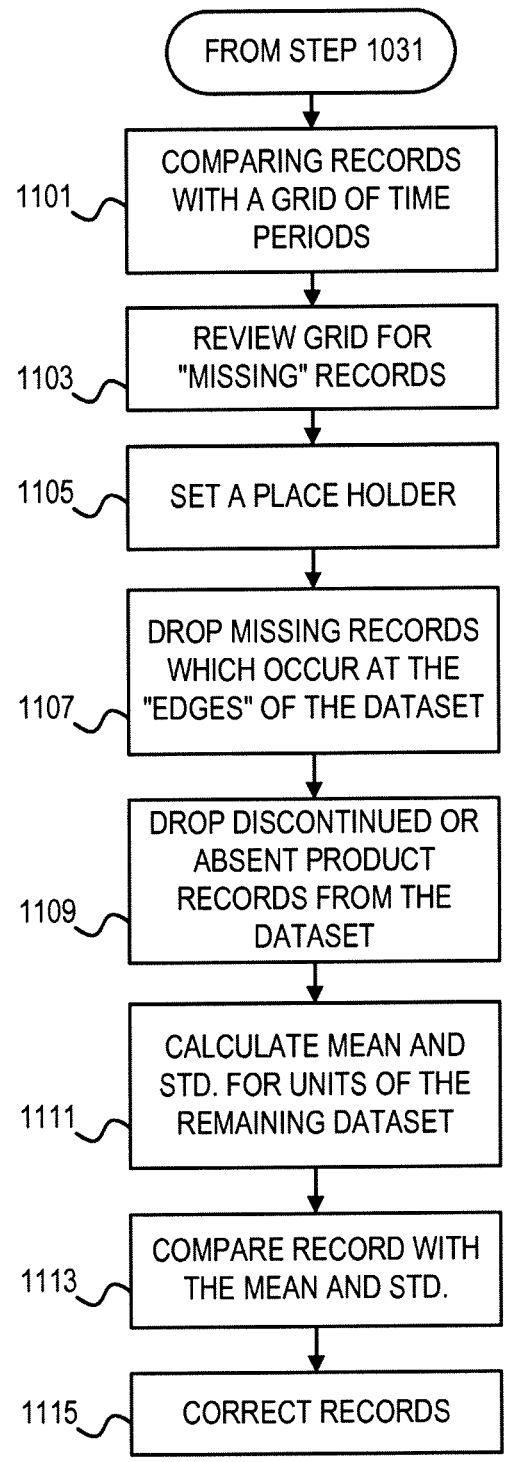
FIG. 11 is a flow chart depicting a process flow depicting a process by which partially cleansed econometric data is subject to further error detection and correction in accordance with some embodiment of the present invention.

FIG. 11 depicts an exemplary process flow embodiment for determining the nature of missing data records in a fourth error detection and correction step in accordance with the principles of the present invention. The records are compared to a grid of time periods (Step 1101). The grid is reviewed for missing records with respect to a particular store and product (Step 1103). These missing records are then marked with a placeholder (Step 1105). Missing records at the "edges" of the dataset do not significantly affect the dataset and are deleted (Step 1107). Records for discontinued products or products recently introduced are dropped for those time periods where the product was not carried in the Store (Step 1109). The remaining dataset is processed to determine an average value for units (sold) and a STD for units (Step 1111). Each missing record is compared to the average units (Step 1113) and based on this comparison, a correction can be made (Step 1115).

The net result of execution of the process Steps 1011-1031 disclosed hereinabove is the generation of a cleansed initial dataset which can be used for its own purpose or input into other econometric processes. One such process is the generation of imputed econometric variables.

Note that other methods for addressing missing records may be utilized, as is well known by those skilled in the art. For example, missing records may be simply dropped. Alternatively, such records may be incorporated with additional information such as extrapolated values form before and/or after the data point, median values or other replacement value.

2. Generation of Imputed Econometric Variables

The foregoing steps (1011-1031) concern cleansing the raw econometric data to create an error detected and error corrected ("cleansed") initial dataset. The cleansed initial dataset created in the foregoing steps can now be used to generate a variety of useful imputed econometric variables (Step 1033). These imputed econometric variables are useful in their own right and may also be output for use in further processing (Step 1035). One particularly useful application of the imputed econometric variables is that they can be input into an optimization engine which collects data input from a variety of sources and processes the data to provide very accurate economic modeling information.

A. Imputed Base Price

Figure 12:
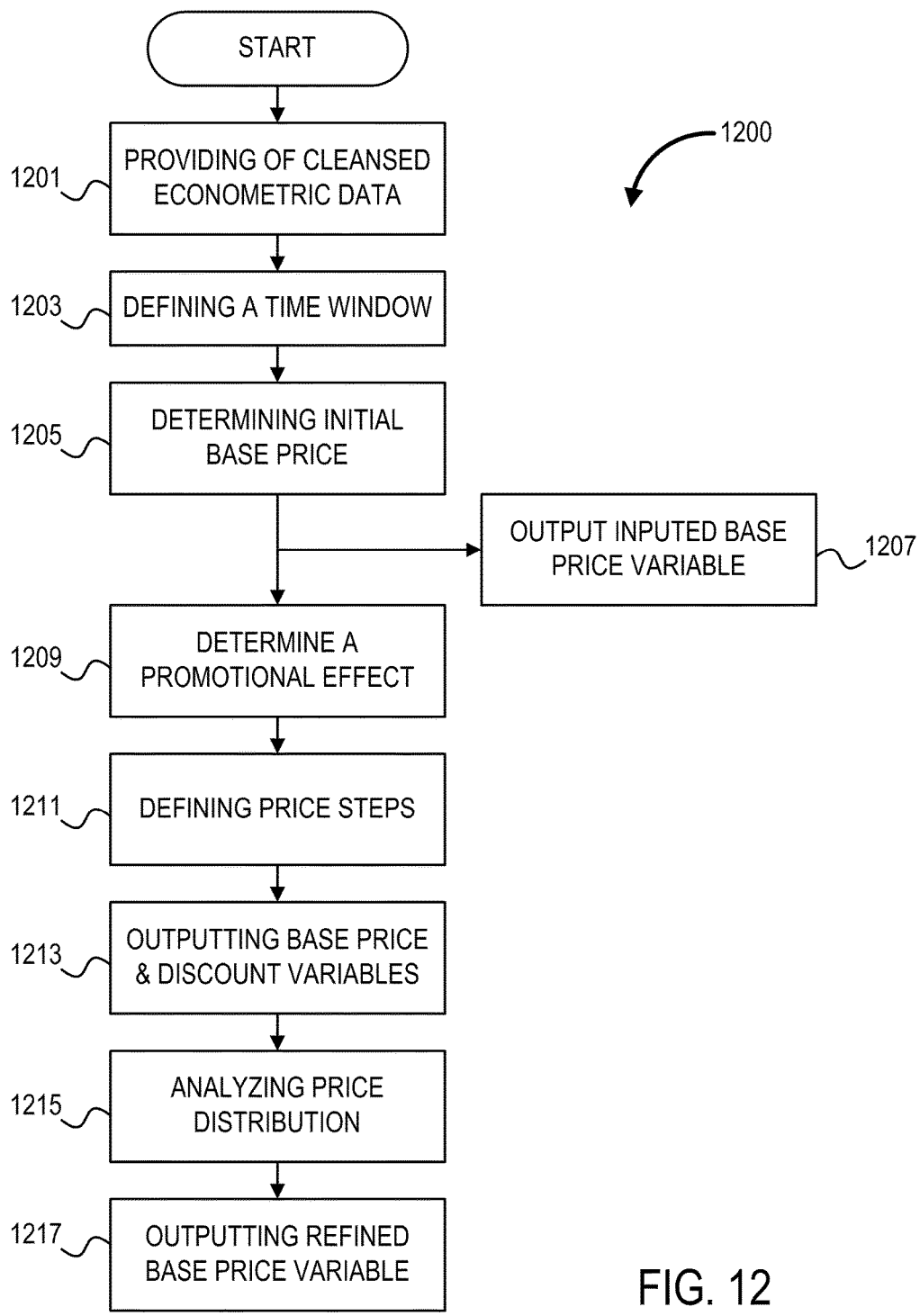
FIG. 12 is a flow chart depicting a process flow by which an imputed base price variable can be generated in accordance with one embodiment of the present invention.

One imputed econometric variable that can be determined using the initial dataset created in accordance with the forgoing, is an imputed base price variable (or base price). FIG. 12 is a flowchart 1200 outlining one embodiment for determining the imputed base price variable. The process begins by providing the process 1200 with a "cleansed" initial dataset (Step 1201), for example, the initial dataset created as described in Steps 1011-1031 of FIG. 10. The initial dataset is examined over a defined time window (Step 1203). Defining a time window (Step 1203) includes choosing an amount of time which frames a selected data point allowing one to look forward and backward in time from the selected data point which lies at the midpoint in the time window. This is done for each data point in the dataset, with the time window being defined for each selected data point. The time frame can be user selected or computer selected.

The initial base price values generated above (step 1205) provide satisfactory values for the imputed base price variable which may be output (Step 1207) and used for most purposes. However, optional Steps 1209-1217 describe an approach for generating a more refined imputed base price variable.

In generating a more refined imputed base price variable, the effect of promotional (or discount) pricing is addressed (Steps 1209-1217). This may be calculated by specifying a discount criteria (Step 1209); defining price steps (Step 1211); outputting an imputed base price variable and an imputed discount variable (Step 1213); analyzing the base price distribution (Step 1215); and outputting a refined base price variable (Step 1217).

Data records are evaluated over a series of time periods (e.g., weeks) and evaluated. The point is to identify price records which are discounted below a base price. By identifying these prices and not including them in a calculation of base price, the base price calculation will be more accurate. Therefore, a discount criterion is defined and input as a variable (Step 1209).

Further analysis is used to define base price "steps" (Step 1211). Base price data points are evaluated. Steps are roughly defined such that the base price data points lie within a small percent of distance from the step to which they are associated (e.g., 2%). This can be accomplished using, for example, a simple regression analysis such as is known to those having ordinary skill in the art. By defining the steps, the average value for base price over the step is determined. Also, price data points are averaged to determine the base price of step. Thus, the average of the base prices in a step is treated as the refined base price for that step.

Further refining includes an analysis of the first step. If the first step is short (along the time axis) and considerably lower than the next step, it is assumed that the first step is based on a discounted price point. As such, the value of the next step is treated as the base price for the time period of the first step.

At this point, absolute discount ($\Delta P$) and base price (BP) are used to calculate percent discount ($\Delta P/BP$) for each store product time period.

This base price is subjected to further analysis for accuracy using cross-store checking (Step 1215). This can be accomplished by analyzing the base price data for each product within a given store, and comparing with all other stores. Any outlier store's base price is adjusted for the analyzed product such that it lies closer to an average cross-store percentile for base price over all stores.

Thus, the forgoing process illustrates an embodiment for determining an imputed base price variable.

B. Imputed Relative Price Variable

Figure 13:
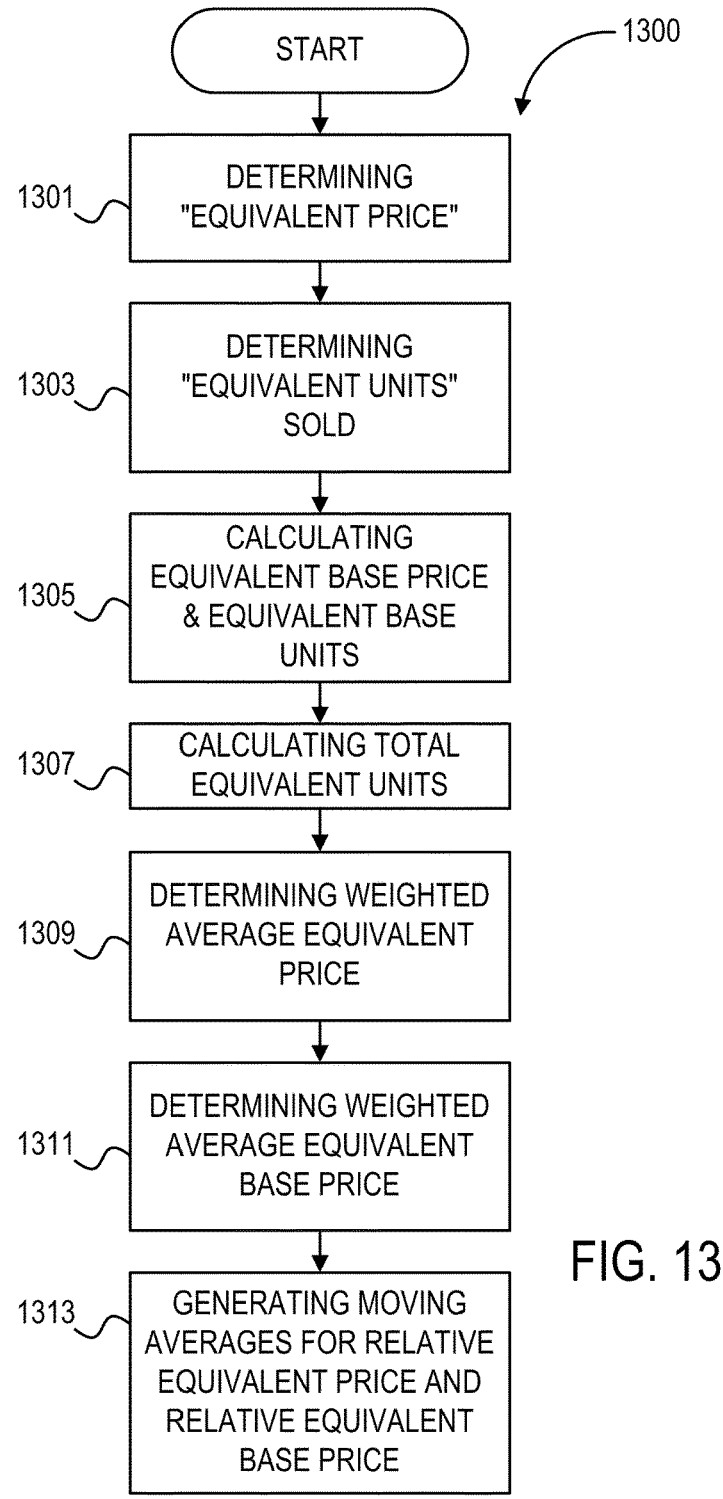
FIG. 13 is a flow chart depicting a process flow by which an imputed relative price variable can be generated in accordance with one embodiment of the present invention.

Reference is now made to the flowchart 1300 of FIG. 13 which illustrates an embodiment for generating relative price variables in accordance with the principles of the present invention. A relative price may be calculated. As disclosed earlier, an equivalizing factor is defined. Using the equivalizing factor, an equivalent price can be calculated (Step 1301). Next equivalent units sold ("units") can be calculated (Step 1303). In a similar vein, equivalent base price and equivalent base units are calculated (Step 1305) using the imputed values for base price (for example, as determined in Steps 1201-1207) and for base units (also referred to as base volume which is determined as disclosed below). For each Store, each demand group, and each date, the total equivalent units is determined (Step 1307). A weighted calculation of relative equivalent price is then made (Step 1309).

For example, such relative price value is determined as follows: equivalent price is divided by a weighted denominator, the weighted denominator is calculated by multiplying equivalent units for each product times the equivalent units sold. For each product, only the values of other products are used in the calculation. This means excluding the product being analyzed. For example, the relative price of A, given three exemplary products A, B and C, is determined as follows:

$$rel_A = \frac{equiv.priceofA}{\left[\frac{(equiv.unitsofB)(Equiv.priceofB) + (equiv.unitsofC)(equiv.priceofC)}{totalequivalentunits - equivalentunitsofA}\right]}$$

Also, a weighted average equivalent base price is calculated using the method disclosed hereinabove. The only difference being that instead of using the actual equivalent price, the calculated base price values per equivalent are used (Step 1311). Using the previously disclosed techniques, a moving average is generated for relative actual equivalent price and relative equivalent base price (Step 1313). Thus a variety of imputed relative price variables can be generated (e.g., relative equivalent price, relative equivalent base price, etc.).

C. Imputed Base Volume Variable

Figure 14A:
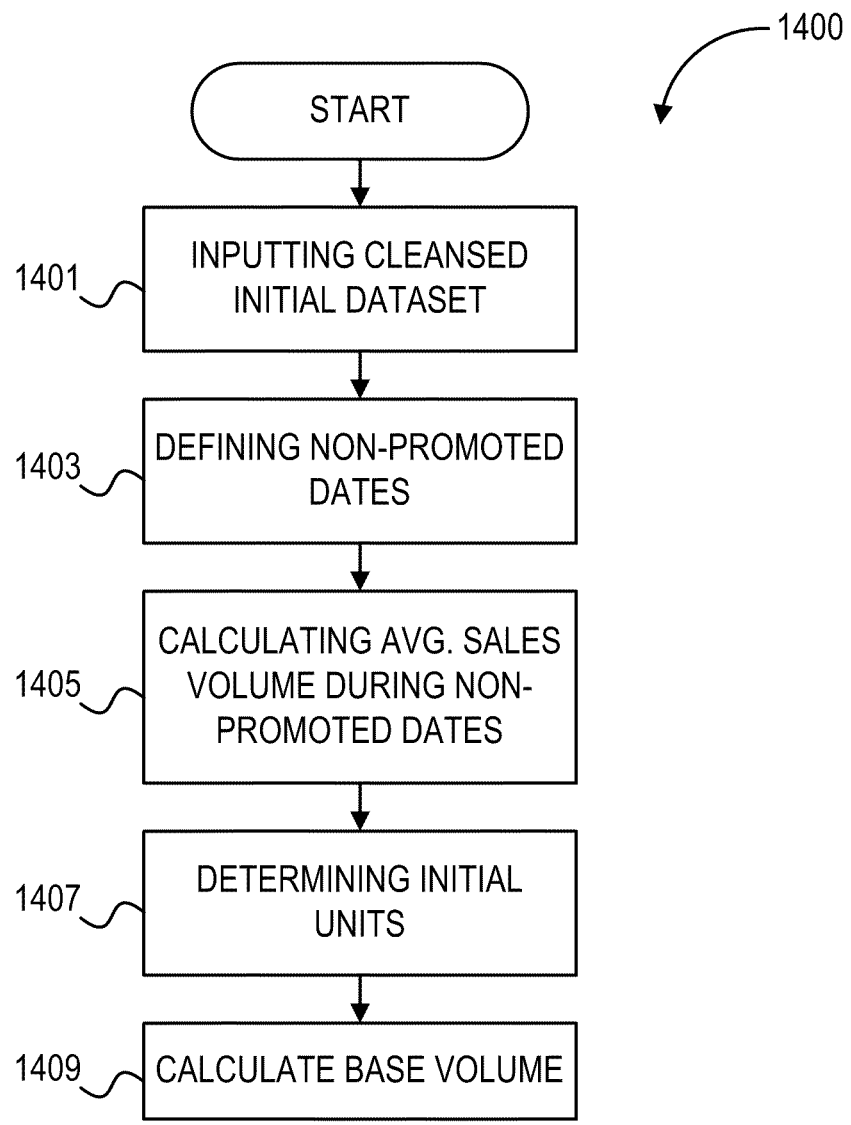
FIG. 14A is a flow chart depicting a process flow by which an imputed base unit sales volume variable can be generated in accordance with one embodiment of the present invention.

A flowchart 1400 shown in FIG. 14A illustrates one embodiment for generating an imputed base volume variable. Base volume refers to the volume of product units sold in the absence of discount pricing or other promotional effects. Base volume is also referred to herein as simply "base units". The determination of base volume begins by receiving the cleansed initial dataset information for each product and store (Step 1401). The initial dataset information is processed to determine "non-promoted dates" (Step 1403), i.e., dates where the products are not significantly price discounted. Using the non-promoted data subset, an average value for "units" and a STD is calculated (i.e., an average value for product unit sales volume for each product during the non-promoted dates is calculated) (Step 1405). This value shall be referred to as the "non-promoted average units". An initial value for base units ("initial base units") is now determined (Step 1407).

Figure 14B:
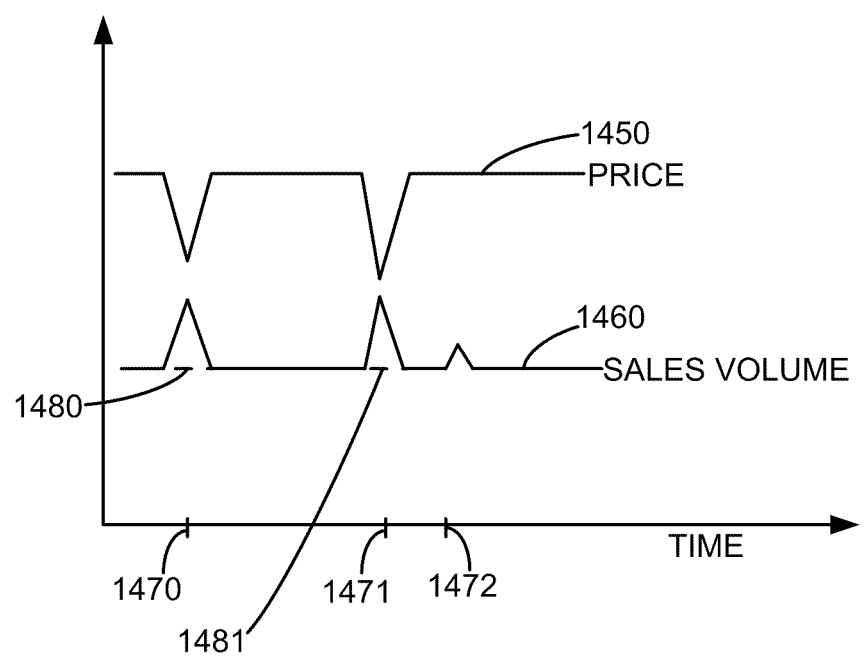
FIG. 14B is a diagram used to illustrate the comparative effects of sales volume increase and price discounts.

This principle can be more readily understood with reference to FIG. 14B. The price behavior 1450 can be compared with sales behavior 1460. Typically, when the price drops below a certain level, sales volume increases. This can be seen at time periods 1470, 1471. In such a case, the actual units sold (more than usual) are not included in a base volume determination. Rather, those records are replaced with the average volume value for the non-promoted dates (the non-promoted average unit value, shown with the dotted lines 1480, 1481). However, where a sales volume increases during a period of negligible discount (e.g., less than 2%), such as shown for time period 1472, the actual units sold (actual sales volume) are used in the calculation of base volume. However, if the records show a sales volume increase 1472 which is too large (e.g., greater than 1.5 standard deviations from the non-promoted average unit value), it is assumed that some other factor besides price is influencing unit volume and the actual unit value is not used for initial base units but is replaced by the non-promoted average unit value.

A calculated base volume value is now determined (Step 1409). This is accomplished by defining a time window. For each store and product, the average value of "initial base units" is calculated for each time window. This value is referred to as "average base units". This value is calculated for a series of time windows to generate a moving average of "average base units". This moving average of the average base units over the modeled time interval is defined as the "base volume variable".

D. Supplementary Error Detection and Correction

Figure 15A:
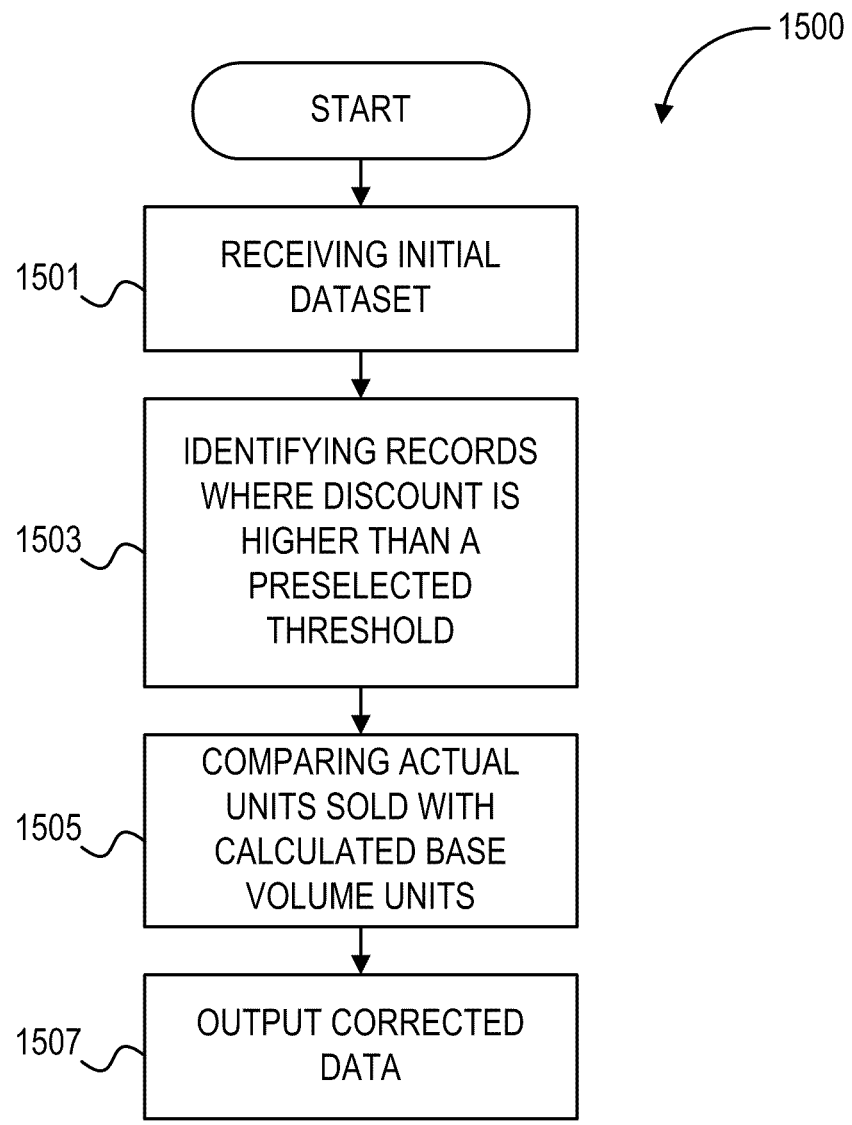
FIG. 15A is a flow chart depicting a process flow by which supplementary error detection and correction is performed in accordance with an embodiment of the present invention.

Based on previously determined discount information, supplementary error detection and correction may be used to correct price outliers. A flowchart 1500 illustrated in FIG. 15A shows one embodiment for accomplishing such supplementary error detection and correction. Such correction begins by receiving the cleaned initial dataset information for each product and store (Step 1501). In addition the previously calculated discount information is also input, or alternatively, the discount information (e.g., ΔP/BP) can be calculated as needed. The initial dataset and discount information is processed to identify discounts higher than a preselected threshold (e.g., 60% discount) (Step 1503). For those time periods (e.g., weeks) having price discounts higher than the preselected threshold (e.g., greater than 60%), a comparison of actual units sold to calculated base volume units (as calculated above) is made (Step 1505). Corrected data is output (step 1507).

Figure 15B:
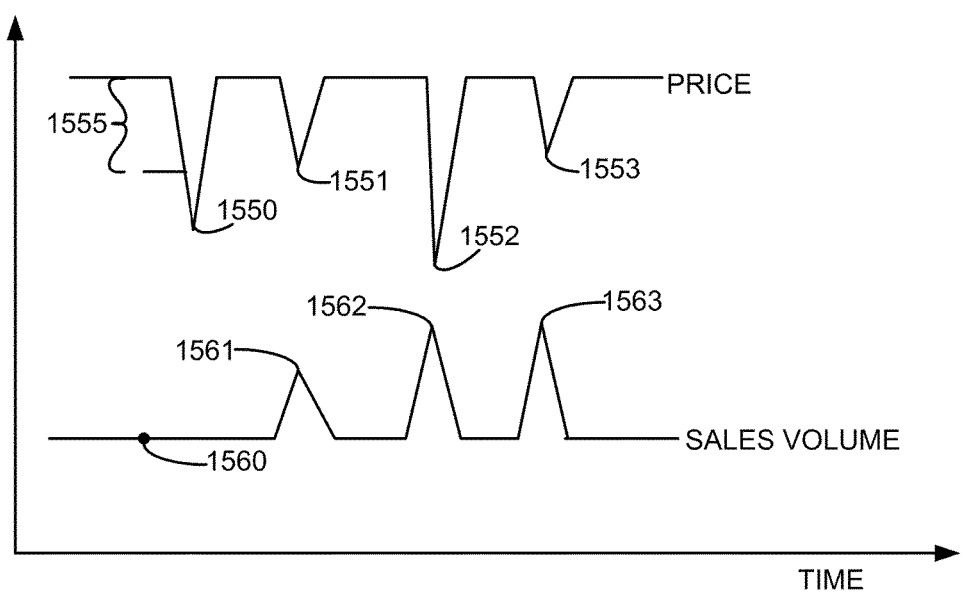
FIG. 15B is a diagram used to illustrate the comparative effects of sales volume increase and price discounts.
Figure 16:
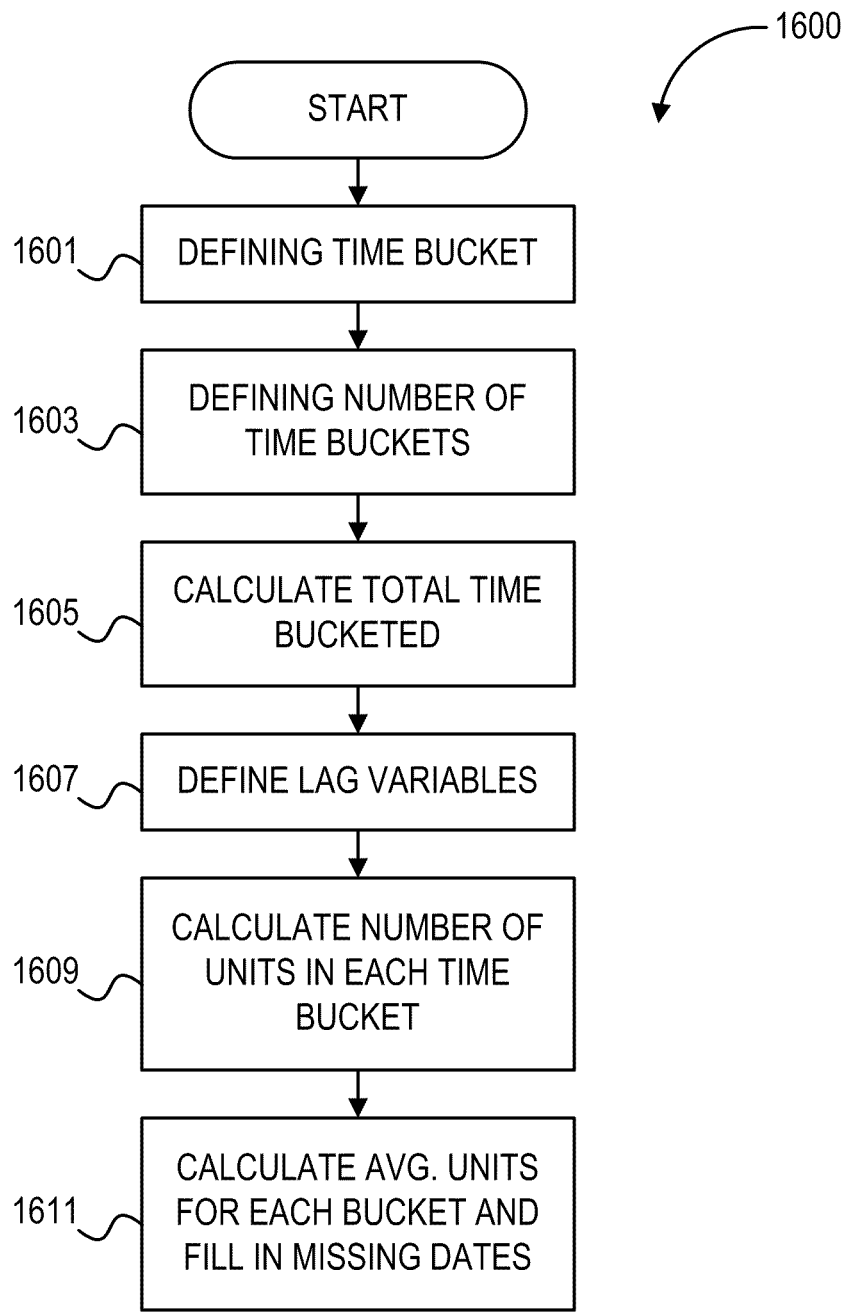
FIG. 16 is a flow chart depicting a process flow by which an imputed stockpiling variable can be generated in accordance with an embodiment of the present invention.

The concepts are similar to that illustrated in FIG. 14B and may be more easily illustrated with reference to FIG. 15B. The principles of this aspect of the present invention are directed toward finding unexplained price aberrations. For example, referring to FIG. 15B, price discounts are depicted at data points 1550, 1551, 1552, and 1553. Also, corresponding sales increases are depicted by sales volume 1560 at data points 1561, 1562, and 1563. The data point 1550 has a discount greater than the threshold 1555 (e.g., 60%). So an analysis is made of data point 1550.

E. Determining Imputed Variables which Correct for the Effect of Consumer Stockpiling With reference to FIG. 16, a flowchart 1600 illustrating a method embodiment for generating stockpiling variables is depicted. The pictured embodiment 1600 begins by defining the size of a "time bucket" (m), for example, the size (m) of the bucket can be measured in days (Step 1601). Additionally, the number (τ) of time buckets to be used is also defined (Step 1603). The total amount of time "bucketed" (m×τ) is calculated (Step 1605).

"Lag" variables which define the number of product units sold ("units") in the time leading up to the analyzed date are defined (Step 1607). Then the total number of product units sold is calculated for each defined time bucket (Step 1609). Correction can be made at the "front end" of the modeled time interval.

If working near the front end of a dataset, units from previous weeks cannot always be defined and in their place an averaged value for bucket sum can be used (Step 1611). The idea is to detect and integrate the effects of consumer stockpiling on into a predictive sales model.

F. Day of the Week Analysis

Figure 17:
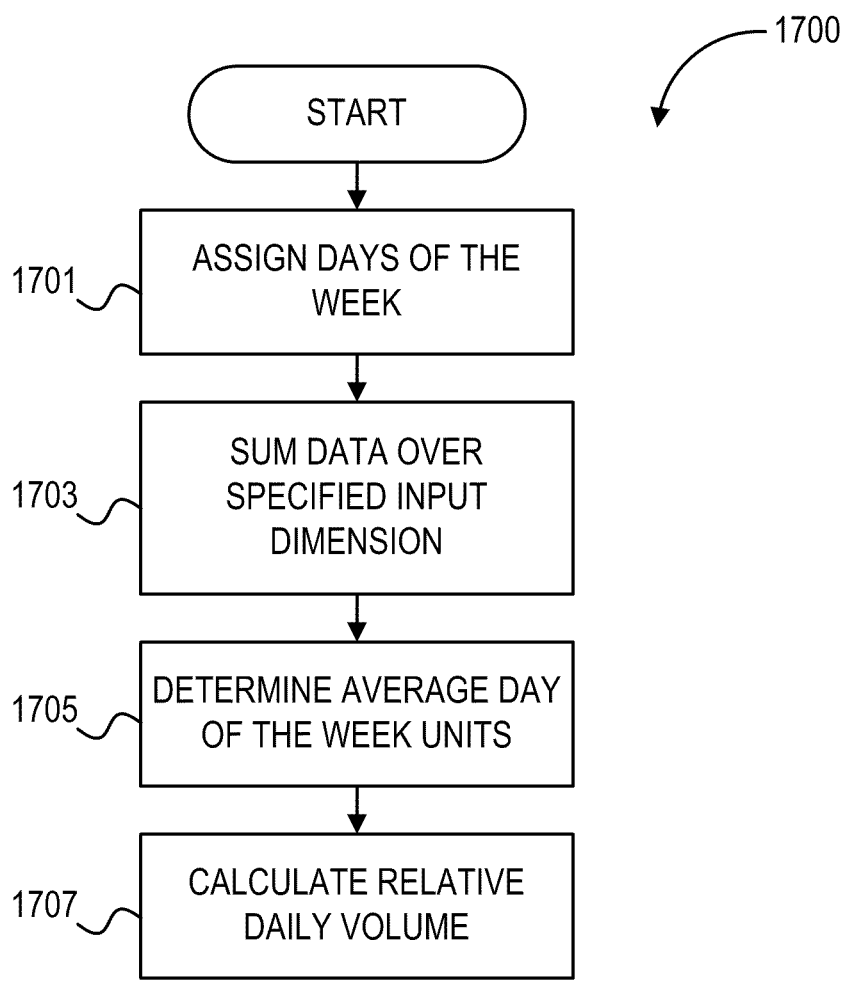
FIG. 17 is a flow chart depicting a process flow by which an imputed day-of-week variable can be generated in accordance with an embodiment of the present invention.

With reference to FIG. 17, a flowchart 1700 illustrating one embodiment for determining a Day of the Week variable is shown. It is necessary to have data on a daily basis for a determination of Day of the Week effects. In accordance with the principles of the present invention, the embodiment begins by assigning the days of the week numerical values (Step 1701). Once categorized by day of the week, the product units (sold) are summed for a specified dimension or set of dimensions. Dimension as used herein means a specified input variable including, but not limited to, Product, Brand, Demand Group, Store, Region, Store Format, and other input variable which may yield useful information (Step 1703). For each Day of Week and each dimension specified, the average units (sold) are determined (Step 1705). For each date, a "relative daily volume" variable is also determined (Step 1707). This information may prove valuable to a client merchant and can comprise an input variable for other econometric models.

G. Imputed Seasonality Variable Generation

Figure 18:
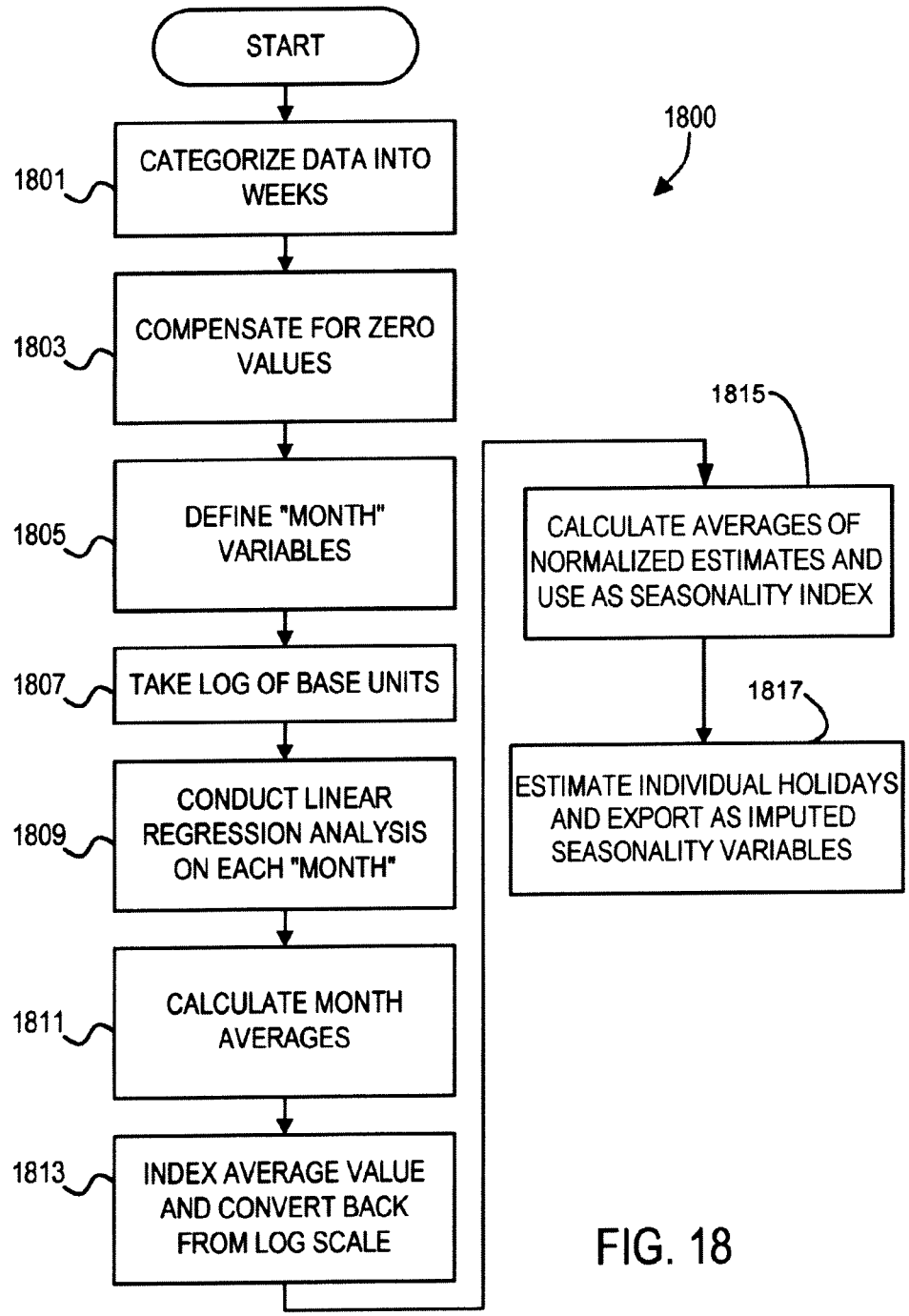
FIG. 18 is a flow chart depicting a process flow by which an imputed seasonality variable can be generated in accordance with an embodiment of the present invention.

Another useful imputed variable is an imputed seasonality variable for determining seasonal variations in sales volume. Referring to FIG. 18, a flowchart 1800 illustrating one embodiment in accordance with the present invention for determining an imputed seasonality variable is shown. The process begins with categorizing the data into weekly data records, if necessary (Step 1801). Zero values and missing records are then compensated for (Step 1803). "Month" variables are then defined (Step 1805). A logarithm of base units is then taken (Step 1807). Linear regressions are performed on each "Month" (Step 1809). "Months" are averaged over a specified dimension (Step 1811). Indexes are averaged and converted back from log scale to original scale (Step 1813). The average of normalized estimates are calculated and used as Seasonality index (Step 1815). Individual holidays are estimated and exported as imputed seasonality variables (Step 1817).

H. Imputed Promotional Variable

Figure 19:
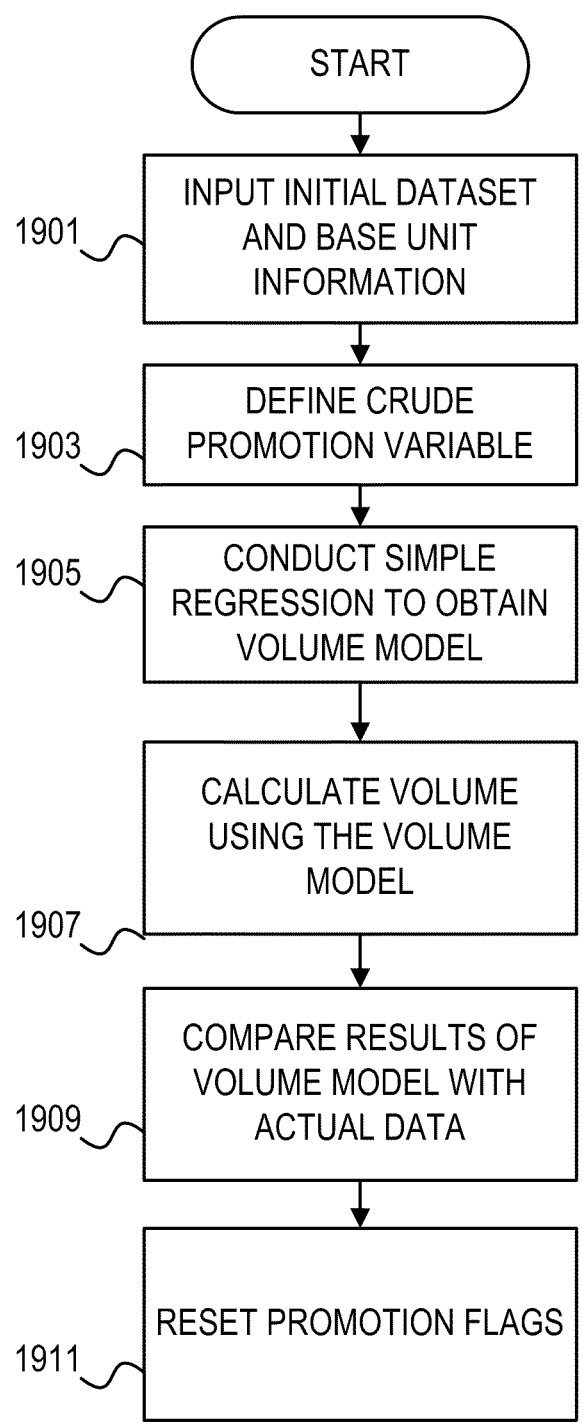
FIG. 19 is a flow chart depicting a process flow by which an imputed promotional effects variable can be generated in accordance with an embodiment of the present invention.

Another useful variable is a variable which can predict promotional effects. FIG. 19 provides a flowchart illustrating an embodiment enabling the generation of imputed promotional variables in accordance with the principles of the present invention. Such a variable can be imputed using actual pricing information, actual product unit sales data, and calculated value for average base units (as calculated above). This leads to a calculation of an imputed promotional variable which takes into consideration the entire range of promotional effects.

Referring back to FIG. 19, the process begins by inputting the cleansed initial dataset and the calculated average base units information (Step 1901). A crude promotional variable is then determined (Step 1903). Such a crude promotional variable can be defined using promotion flags. A simple regression analysis, as is known to those having ordinary skill in the art, (e.g., a mixed effects regression) is run on sales volume to obtain a model for predicting sales volume (Step 1905). Using the model a sample calculation of sales volume is performed (Step 1907). The results of the model are compared with the actual sales data to further refine the promotion flags (Step 1909). If the sales volume is underpredicted (by the model) by greater than some selected percentage (e.g., 30-50%), the promotion flag may be set to reflect the effects of a probable non-discount promotional effect. Since the remaining modeled results more closely approximate actual sales behavior, the promotion flags for those results are not reset (Step 1911). The newly defined promotion flags are incorporated into a new model for defining the imputed promotional variable.

I. Imputed Cross-Elasticity Variable

Figure 20:
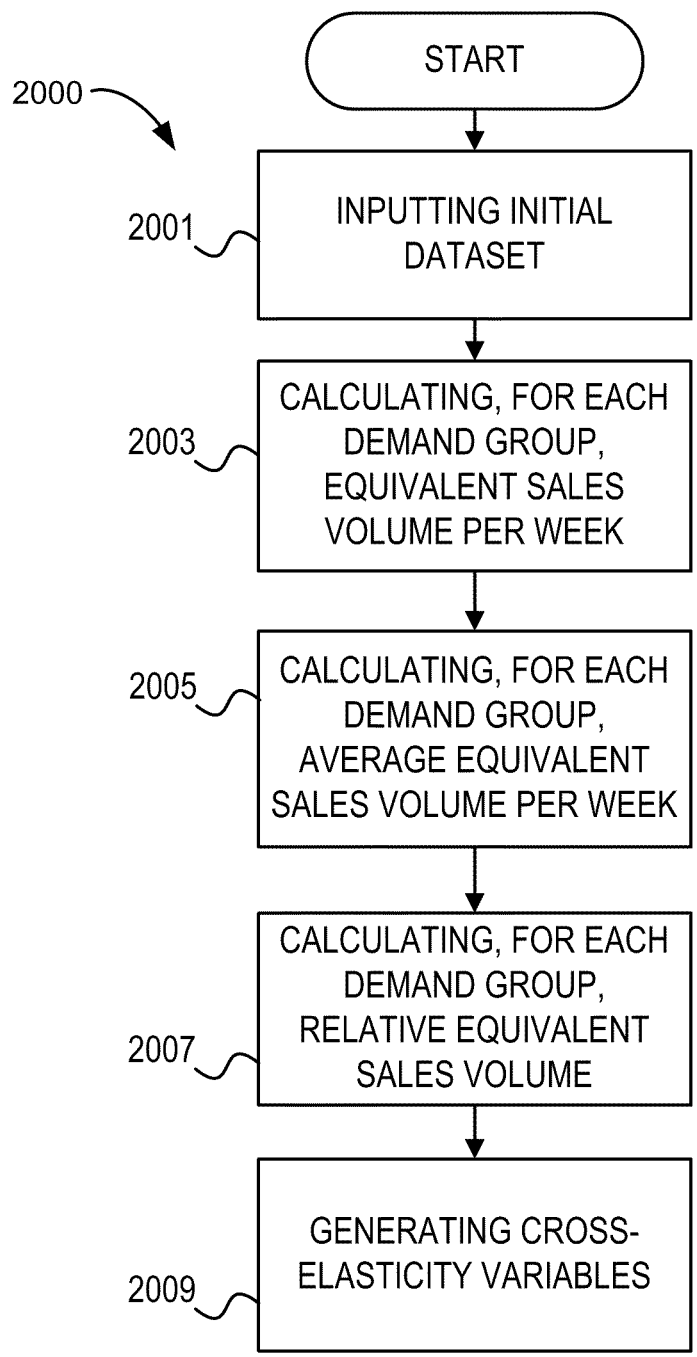
FIG. 20 is a flow chart depicting a process flow by which an imputed cross-elasticity variable can be generated in accordance with some embodiment of the present invention.

Another useful variable is a cross-elasticity variable. FIG. 20 depicts a flowchart 2000 which illustrates the generation of cross-elasticity variables in accordance with the principles of the present invention. The generation of an imputed cross-elasticity variable allows the analysis of the effects of a demand group on other demand groups within the same category. Here, a category describes a group of related demand groups which encompass highly substitutable products and complementary products. Typical examples of categories are, among many others, Italian foods, breakfast foods, or soft drinks.

The initial dataset information is input into the system (Step 2001). For each demand group the total equivalent sales volume for each store is calculated for each time period (for purposes of this illustration the time period is a week) during the modeled time interval (Step 2003). For each week and each demand group, the average total equivalent sales volume for each store is calculated for each week over the modeled time interval (Step 2005). For each demand group the relative equivalent sales volume for each store is calculated for each week (Step 2007). The relative demand group equivalent sales volume for the other demand groups is quantified and treated as a variable in the calculation of sales volume of the first demand group, thereby generating cross-elasticity variables (Step 2009).

The calculated imputed variables and data are outputted from the Imputed Variable Generator 304 to the Coefficient Estimator 308. Some of the imputed variables may also be provided to the Financial Model Engine 108.

B. Coefficient Estimator

The Coefficient Estimator 308 uses the imputed variables and data to estimate coefficients, which may be used in an equation to predict demand. In a preferred embodiment of the invention, sales for a demand group (S) is calculated and a market share (F) for a particular product is calculated, so that demand (D) for a particular product is estimated by $D=S \cdot F$. A demand group is defined as a collection of highly substitutable products. In the preferred embodiments, the imputed variables and equations for sales (S) of a demand group and market share (F) are as follows:

1. Modeling Framework

The econometric modeling engine uses one or more of statistical techniques, including, but not limited to, linear and non-linear regressions, hierarchical regressions, mixed-effect models, Bayesian techniques incorporating priors, and machine learning techniques. Mixed-effect models are more robust with regards to missing or insufficient data. Further, mixed-effect models allows for a framework of sharing information across various subjects in the model, enabling better estimates. Bayesian techniques with prior information can incorporate all the features of the mixed effect models and, in addition, also enable for guiding the allowable values of the coefficients based upon existing information.

III. Financial Model Engine

The Financial Model Engine 108 receives data from the Stores 124 and may receive imputed variables (such as baseline sales and baseline prices) and data from the Econometric Engine 104 to calculate fixed and variable costs for the sale of each item.

Figure 5:
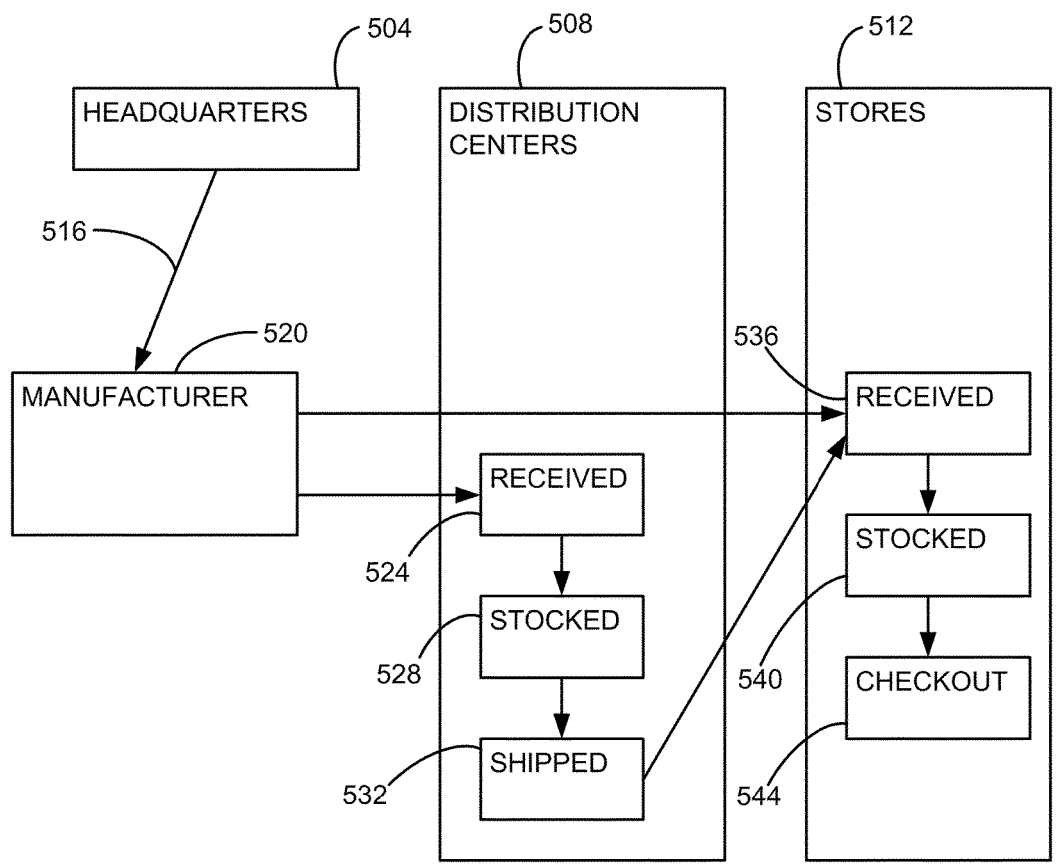
FIG. 5 is a block diagram to illustrate some of the transaction costs that occur in retail businesses of a chain of stores.
Figure 6:
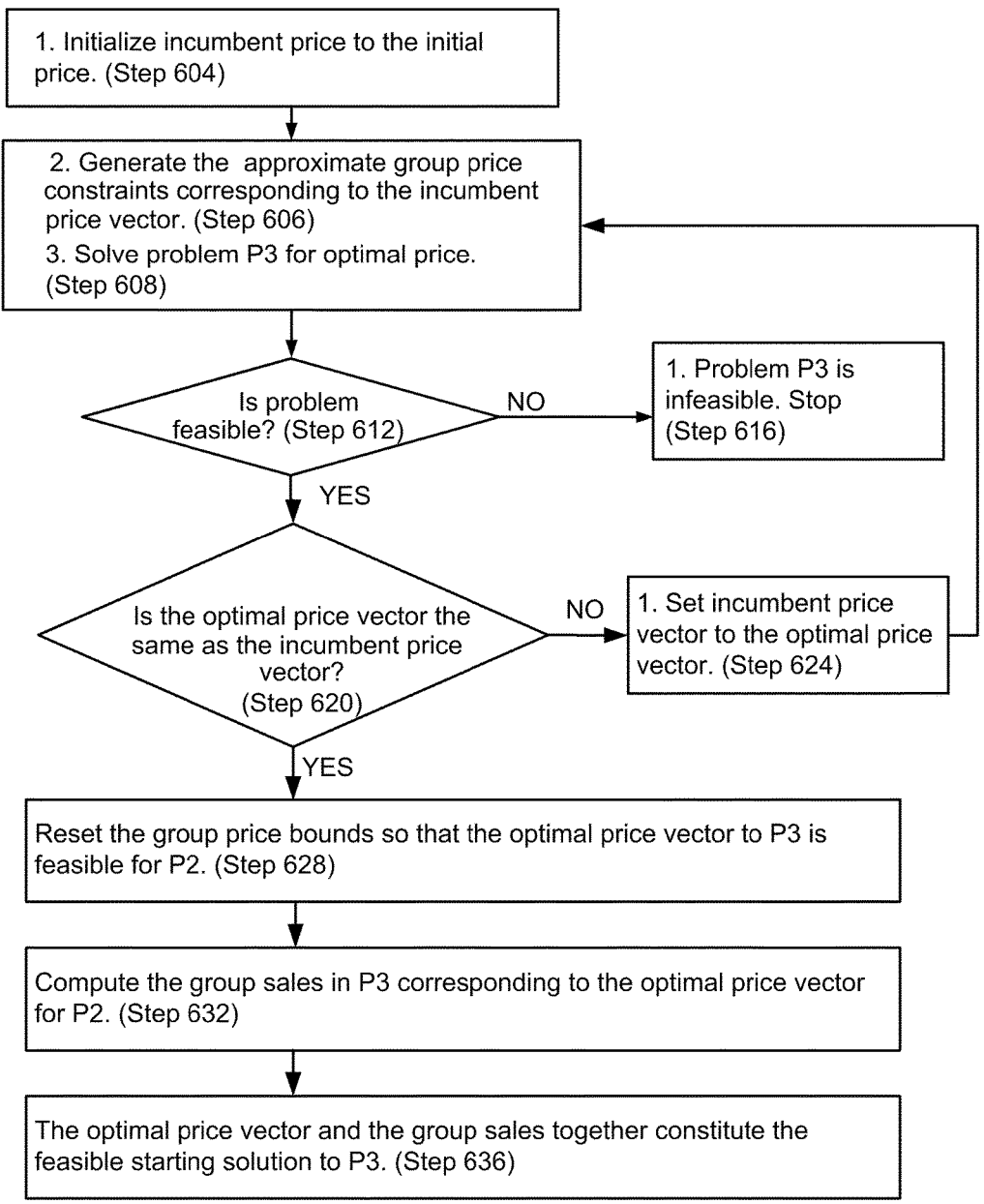
FIG. 6 is a flow chart of some embodiment of the invention for providing an initial feasible solution.

To facilitate understanding, FIG. 5 is an exemplary block diagram to illustrate some of the transaction costs that occur in retail businesses of a chain of stores. The chain of stores may have a headquarters 504, distribution centers 508, and stores 512. The headquarters 504 may place an order 516 to a manufacturer 520 for goods supplied by the manufacturer 520, which generates an order placement cost. The manufacturer 520 may ship the goods to one of the distribution centers 508. The receiving of the goods by the distribution center 508 generates a receiving cost 524, a cost for stocking the goods 528, and a cost for shipping the goods 532 to one of the stores 512. The store 512 receives the goods from one of the distribution centers 508 or from the manufacturer 520, which generates a receiving cost 536 and a cost for stocking the goods 540. When a customer purchases the item, the stores 512 incur a check-out cost 544.

The Financial Model Engine 108 should be flexible enough to provide a cost model for these different procedures. These different costs may have variable cost components where the cost of an item is a function of the amount of sales of the item and fixed cost components where the cost of an item is not a function of the amount of sales of the item. Financial Model Engine 108, thus, may generate a model that accounts for procurement costs in addition to the various costs associated with conducting business.

IV. Optimization Engine and Support Tool

Figure 4:
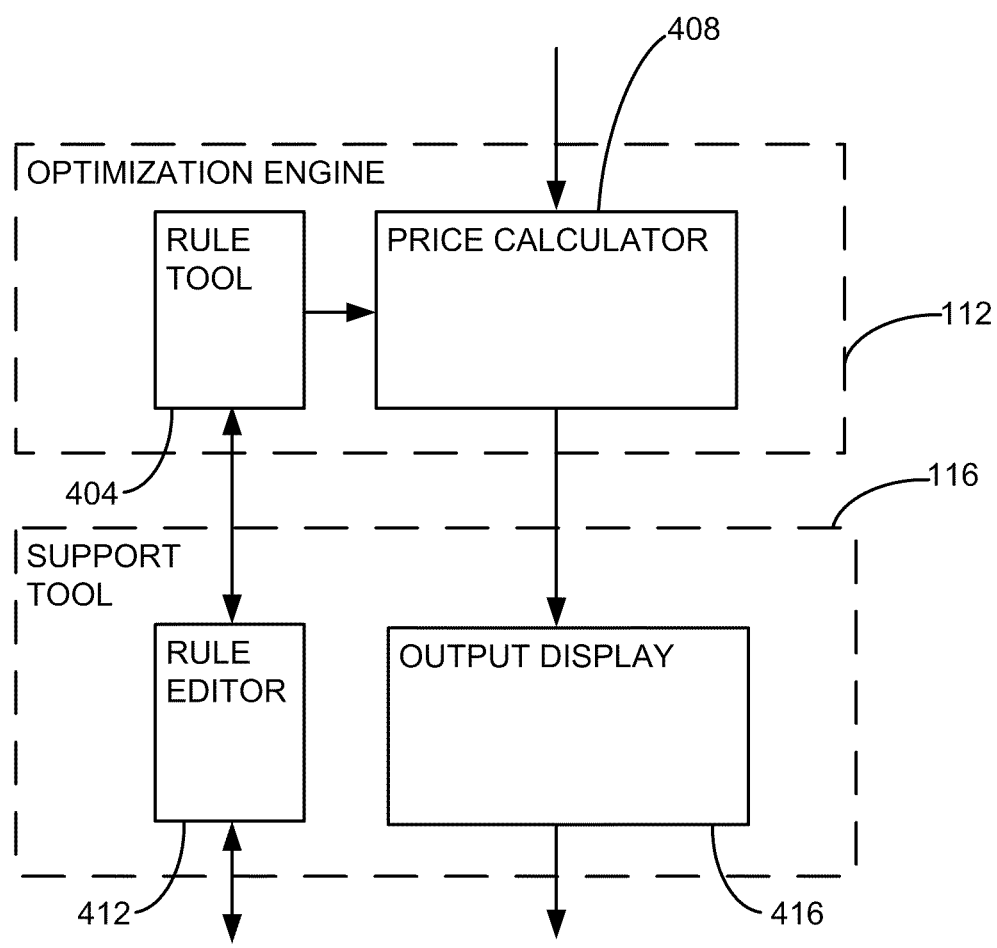
FIG. 4 is a more detailed schematic view of the optimization engine and support tool.

FIG. 4 is a more detailed schematic view of the Optimization Engine 112 and the Support Tool 116. The Optimization Engine 112 comprises a rule tool 404 and a price calculator 408. The Support Tool 116 comprises a rule editor 412 and an output display 416.

In operation, the client (stores 124) may access the rule editor 412 of the Support Tool 116 and provides client defined rule parameters (step 228). If a client does not set a parameter for a particular rule, a default value is used. Some of the rule parameters set by the client may be constraints to the overall weighted price advance or decline, branding price rules, size pricing rules, unit pricing rules, line pricing rules, and cluster pricing rules. The client defined parameters for these rules are provided to the rule tool 404 of the Optimization Engine 112 from the rule editor 412 of the Support Tool 116. Within the rule tool 404, there may be other rules, which are not client defined, such as a group sales equation rule. The rule parameters are outputted from the rule tool 404 to the price calculator 408. The demand coefficients 128 and cost data 136 are also inputted into the price calculator 408. The client may also provide to the price calculator 408 through the Support Tool 116 a desired optimization scenario rules. Some examples of scenarios may be to optimize prices to provide the optimum profit, set one promotional price and the optimization of all remaining prices to optimize profit, or optimized prices to provide a specified volume of sales for a designated product and to optimize price. The price calculator 408 then calculates optimized prices. The price calculator 408 outputs the optimized prices to the output display 416 of the Support Tool 116, which allows the Stores 124 to receive the optimized pricing (step 232).

V. Customer Segment Analyzer

A. System Overview

Figure 21:
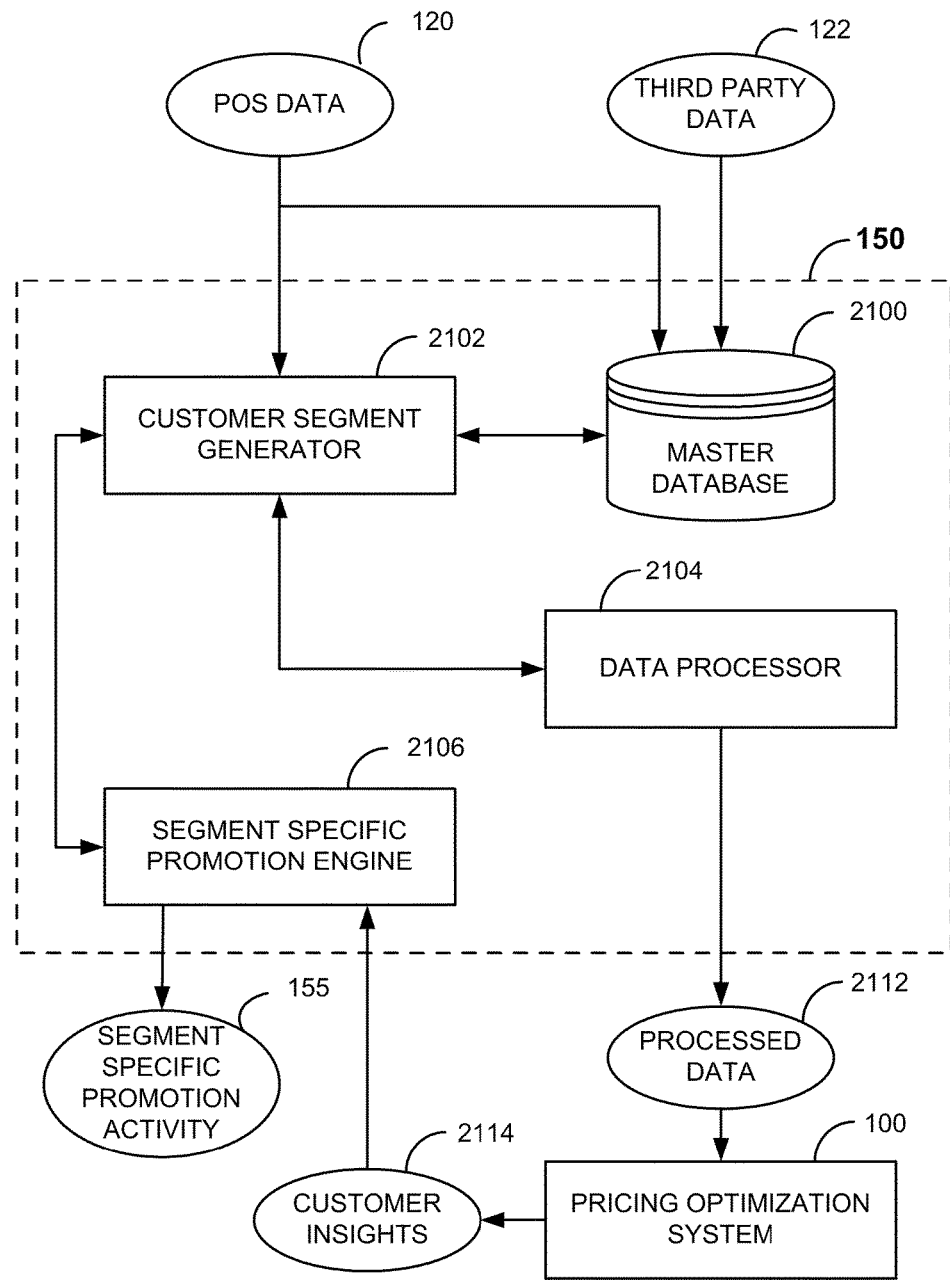
FIG. 21 is a more detailed schematic view of the customer segment analyzer.

FIG. 21 is a more detailed schematic view of the Customer Segment Analyzer 150. The Customer Segment Analyzer 150 may include a Master Database 2100 coupled to a Customer Segment Generator 2102. The Customer Segment Generator 2102 may likewise couple to a Data Processor 2104 and a Segment Specific Promotion Engine 2106. The Master Database 2100 may be populated with transaction history via POS Data 120. Likewise, the Master Database 2100 may include identity indexes for the transaction data. These identity indicators may be collected from various third parties such as credit card company identifiers, banking data, public registries and marketing databases. This identifier information may be received in the form of Third Party Data 122.

The POS data 120 may also be collected by the Customer Segment Generator 2102. The Customer Segment Generator 2102 may compare POS data 120 to historical data in the Master Database 2100. The Customer Segment Generator 2102 may then determine the identity of the household (or individual or organization) to which the POS data belongs. If the identity is able to be determined, the customers are grouped by demographic data and purchasing behaviors into customer segments. POS data, where the identity of the customer is not readily identifiable, may be segmented by purchasing behaviors alone.

The Customer Segment Generator 2102 may provide generated customer segments to the Data Processor 2104 for processing. The Data Processor 2104 may aggregate segmented POS data by household, validate the segment data and perform one or more data transformations on the segment data. Processed Data 2112 from the Data Processor 2104 may then be output to the Pricing Optimization System 100.

The Pricing Optimization System 100 may generate one or more Customer Segment Insights 2114 via the econometric engine and the optimization engine. The Customer Segment Insights 2114 may include information such as total spend by each customer segment, segment spend by product category and unit lift by segment. These Customer Segment Insights 2114 may then be provided to the Segment Specific Promotion Engine 2106.

The Segment Specific Promotion Engine 2106 may also receive the segment data from the Customer Segment Generator 2102. Segment data, along with Customer Segment Insights 2114 may be used to generate Segment Specific Promotion Activity 155.

Segment Specific Promotion Activity 155 may include targeted promotional mailers to particular segments, radio and television commercials on channels frequented by particular customer segments, promotions on particular products to appeal to particular customer segments, and other such promotional activity.

Figure 22:
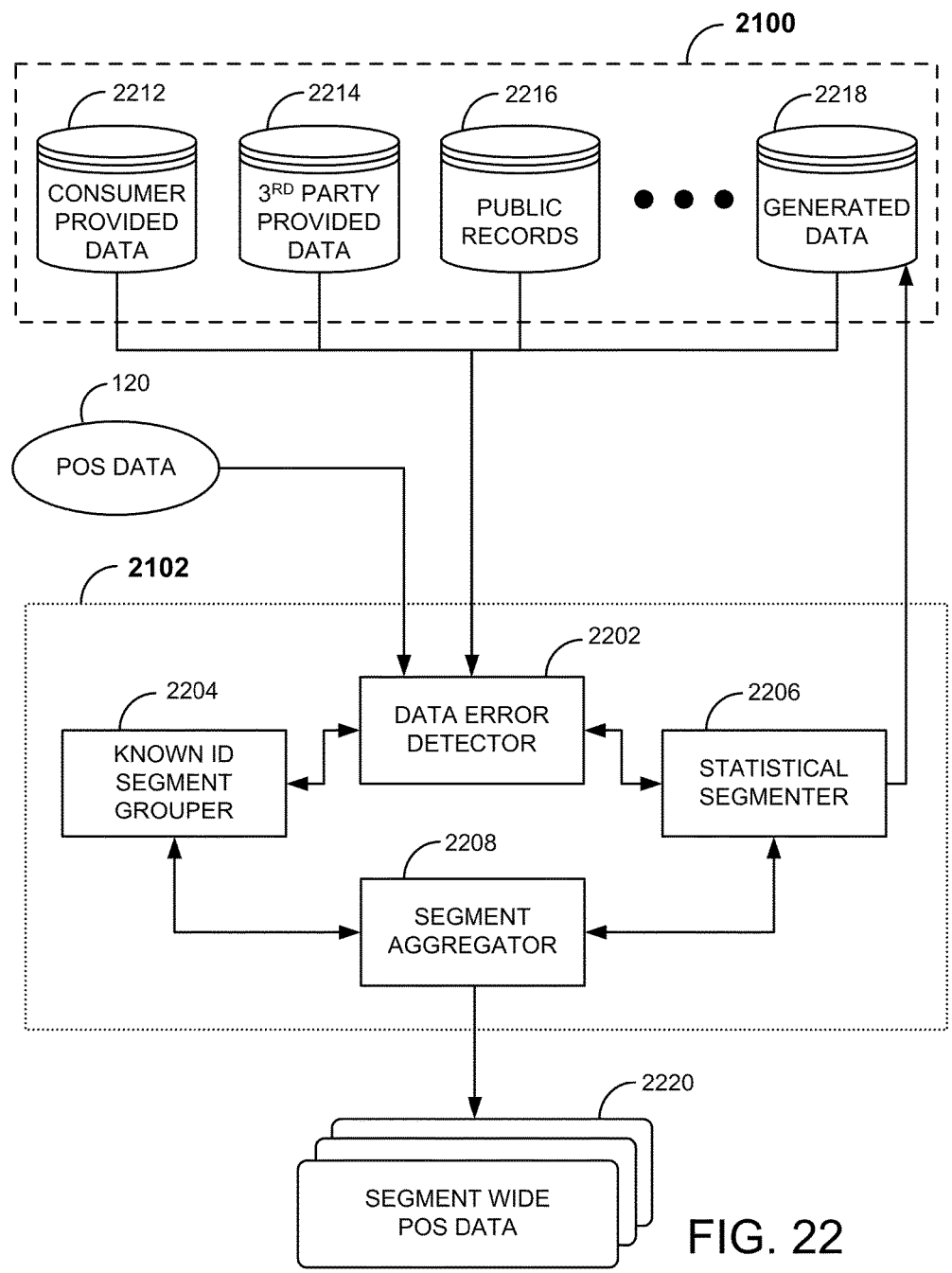
FIG. 22 is a more detailed schematic view of the customer segment generator of the customer segment analyzer.

FIG. 22 is a more detailed schematic view of the Customer Segment Generator 2102 of the customer segment analyzer. The Customer Segment Generator 2102 is shown receiving POS Data 120. Also, the Customer Segment Generator 2102 couples to the Master Database 2100. The Master Database 2100 includes a plurality of datasets including Consumer Provided Data 2212, Third Party Provided Data 2214, Public Records 2216 and Generated Data 2218. Thus, the Master Database 2100 may be a series of separate databases, or may be a singular database with multiple logical datasets. All of the data included in the Master Database 2100 may be provided to a Data Error Detector 2202.

The Data Error Detector 2202, which is part of the Customer Segment Generator 2102, may undergo a data cleansing process, which includes identifying missing POS data, duplicate records and statistically unusual data. For example, in some embodiments, data which is beyond two standard deviations from the average measure for the particular data point may be flagged as an incorrect data. Also, identical data entries within a sufficiently short time period may be flagged as a duplicate record. Duplicate records may be deleted, while missing or erroneous records may be replaced by a prototypical record or deleted altogether. In yet other embodiments, POS data and database records may be cleansed in a manner similar to that of the process detailed in FIGS. 10 and 11. The cleansed data may then be provided to a Known ID Segment Grouper 2204 and a Statistical Segmenter 2206.

The Known ID Segment Grouper 2204 identifies and segments transaction data which has identity indicators. If identity is known, the Known ID Segment Grouper 2204 may look up the identity to determine if that customer has previously been assigned to a segment. If the customer has already been placed within a segment, the new transaction data may update the consumer's purchasing history. If the customer has not previously been assigned to a segment, the Known ID Segment Grouper 2204 may look up demographic, financial, geographic and additional data to determine appropriate customer segment. Also, purchasing behavior for the customer may be used to assign the customer to a segment.

On the other hand, if the transaction data does not include identity data a Statistical Segmenter 2206 may statistically determine the customer that the particular transaction data belongs to. If the identity of the customer is not able to be statistically determined, then the transaction data may be treated as an unknown record. Unknown records may be grouped together in a segment comprised of only unknown records. In some other embodiments, the purchasing behavior of the unknown transaction record may be statistically analyzed for cues as to which segment the transaction record belongs.

A Segment Aggregator 2208 may receive each transaction record with a segment identifier from each of the Known ID Segment Grouper 2204 and the Statistical Segmenter 2206. The Segment Aggregator 2208 may then group these transaction records to generate discrete customer segments. This results in the generation of Segment Wide POS Data records 2220.

Figure 23:
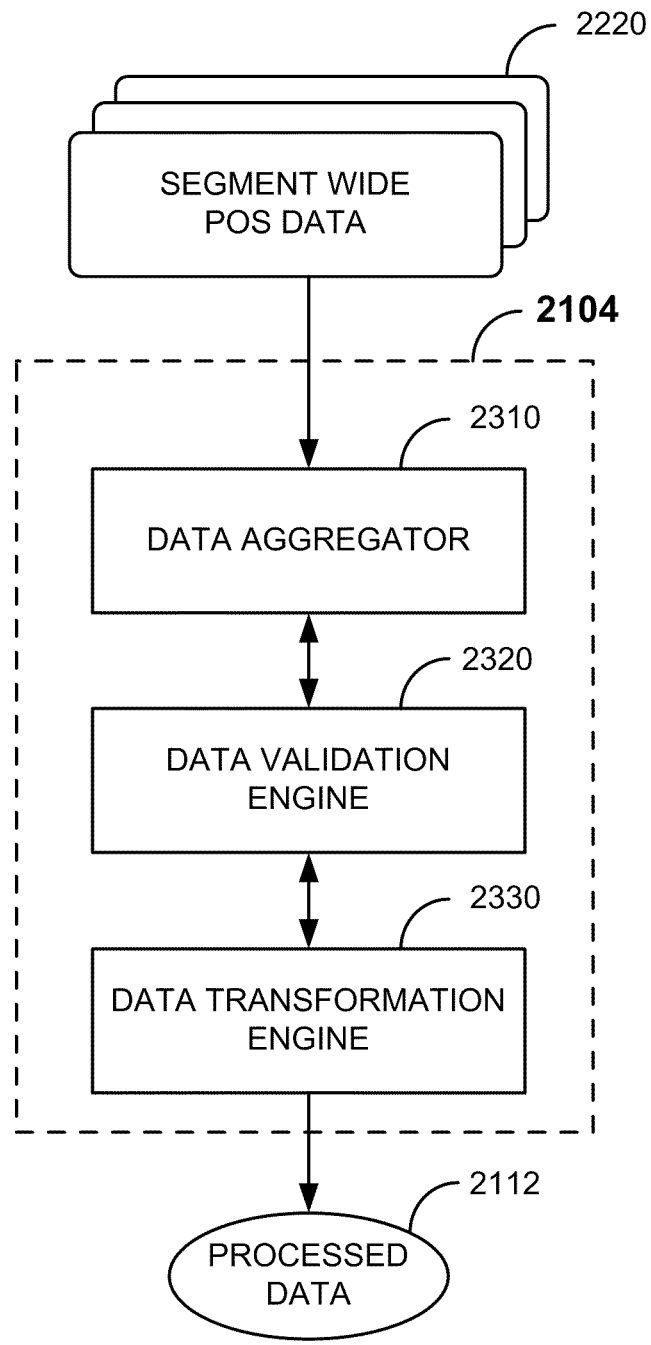
FIG. 23 is a more detailed schematic view of the data processor of the customer segment analyzer.

FIG. 23 is a more detailed schematic view of the Data Processor 2104 of the customer segment analyzer. The Data Processor 2104 may receive the Segment Wide POS Data records 2220. A Data Aggregator 2310 may then aggregate these records by household or other metric. Household, for the purposes of this disclosure, includes a grouping of individuals which purchase goods for common use or consumption. The aggregate records may then be validated by the Data Valuation Engine 2320. The validated records may then be processed by the Data Transformation Engine 2330 where the records are transformed. The resulting transformed records may then be output as Processed Data 2112 to the Pricing Optimization System 100.

Figure 24:
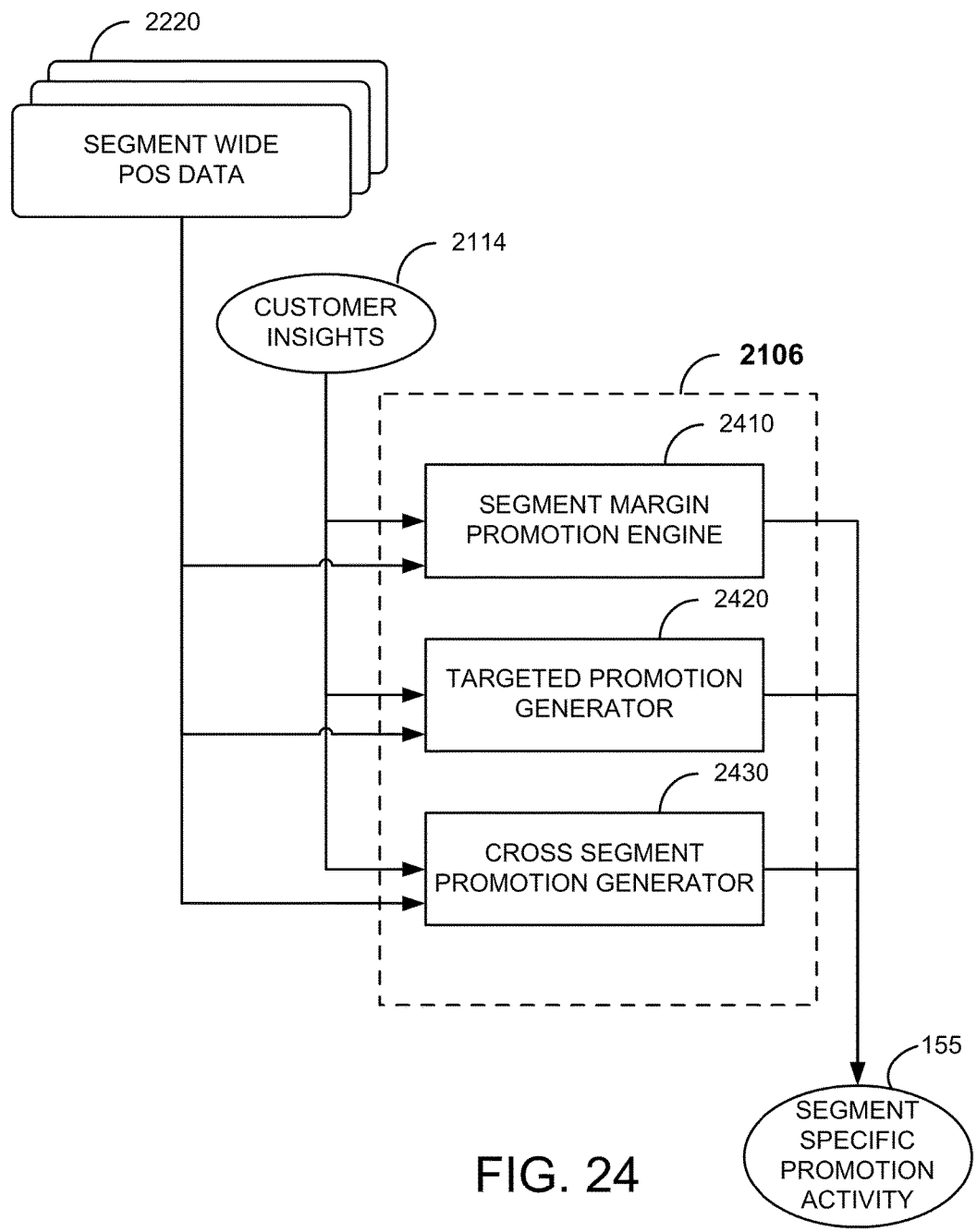
FIG. 24 is a more detailed schematic view of the segment specific promotion engine of the customer segment analyzer.

FIG. 24 is a more detailed schematic view of the Segment Specific Promotion Engine 2106 of the customer segment analyzer. Customer Insights 2114 and Segment Wide POS Data records 2220 may be received by the Segment Specific Promotion Engine 2106 for processing. The Segment Specific Promotion Engine 2106 may include a Segment Margin Promotion Engine 2410, a Targeted Promotion Generator 2420 and a Cross Segment Promotion Generator 2430. The Segment Margin Promotion Engine 2410 may generate promotions which are aimed at the expansion of a target customer segment.

The Targeted Promotion Generator 2420 may generate targeted promotions suitable to optimize sales or profits for a given customer segment. Thus, the Targeted Promotion Generator 2420 may determine a sale on juice may maximize profits in a given segment. It may also be known that the given segment enjoys listening to light rock. Thus, advertisements for the juice sale may be played on radio stations which cater to the light rock genre. In this example, the targeted promotion costs less that a blanket commercial across all radio stations and still has a maximal impact upon sales. In some embodiments, multiple promotions may be generated simultaneously for different customer segments.

The Cross Segment Promotion Generator 2430 may generate promotions which stimulate cross segment purchases. Thus, consumers from a particular segment, which purchase a particular good, may be predicted to purchase other goods. Promotions, such as check out coupons, may be generated for these goods to incentivize further purchases and return shopping.

All of the outputs from the Segment Margin Promotion Engine 2410, the Targeted Promotion Generator 2420 and the Cross Segment Promotion Generator 2430 may be provided as Segment Specific Promotion Activity 155.

B. Customer Segment Analysis i. Segment Generation

Figure 25:
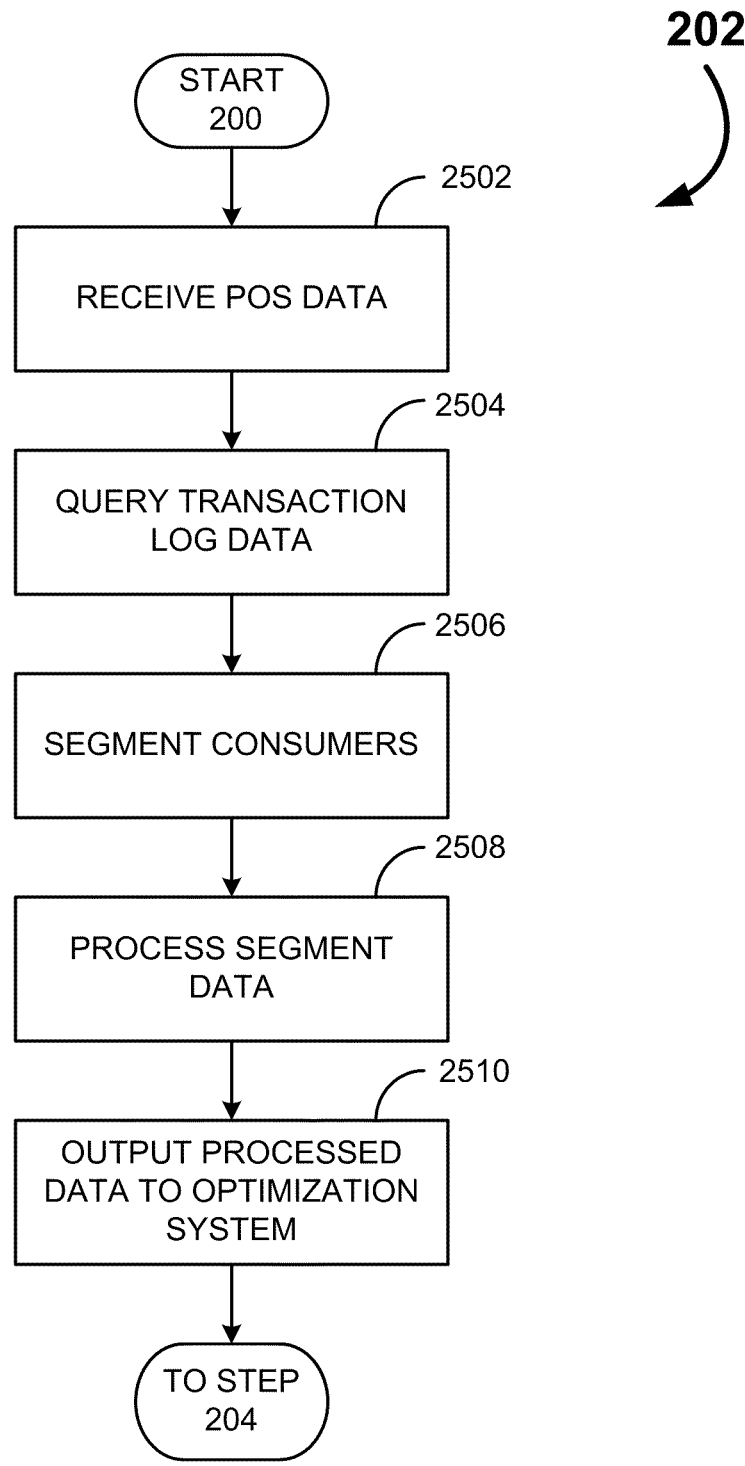
FIG. 25 is a flow chart depicting a process flow by which transaction data from the store(s) are analyzed for customer segments.

FIG. 25 is a flow chart depicting a process flow by which transaction data from the store(s) are analyzed for customer segments, shown generally at 202. The process begins from step 200 of FIG. 2. The process then progresses to step 2502 where Point of Sales (POS) data is received from one or more stores. POS data may be sent in real time over a network or may be received in batch files. The transaction log data found in the Master Database 2100 may then be queried for other segment or purchasing data associated with the customer the POS data is associated with, at step 2504. Additionally, segment behaviors may be queried at this step. The consumers associated with the POS data may then be segmented at step 2506.

Segment wide POS data may then be processed, at step 2508. Processing of the customer segmented POS data may include aggregation of data by household, validation of the data and transformation of the data.

Then, at step 2510, the processed data may be outputted to the optimization system for enhanced product pricing and the generation of customer segment insights. The process then concludes by progressing to step 204 of FIG. 2.

Figure 26:
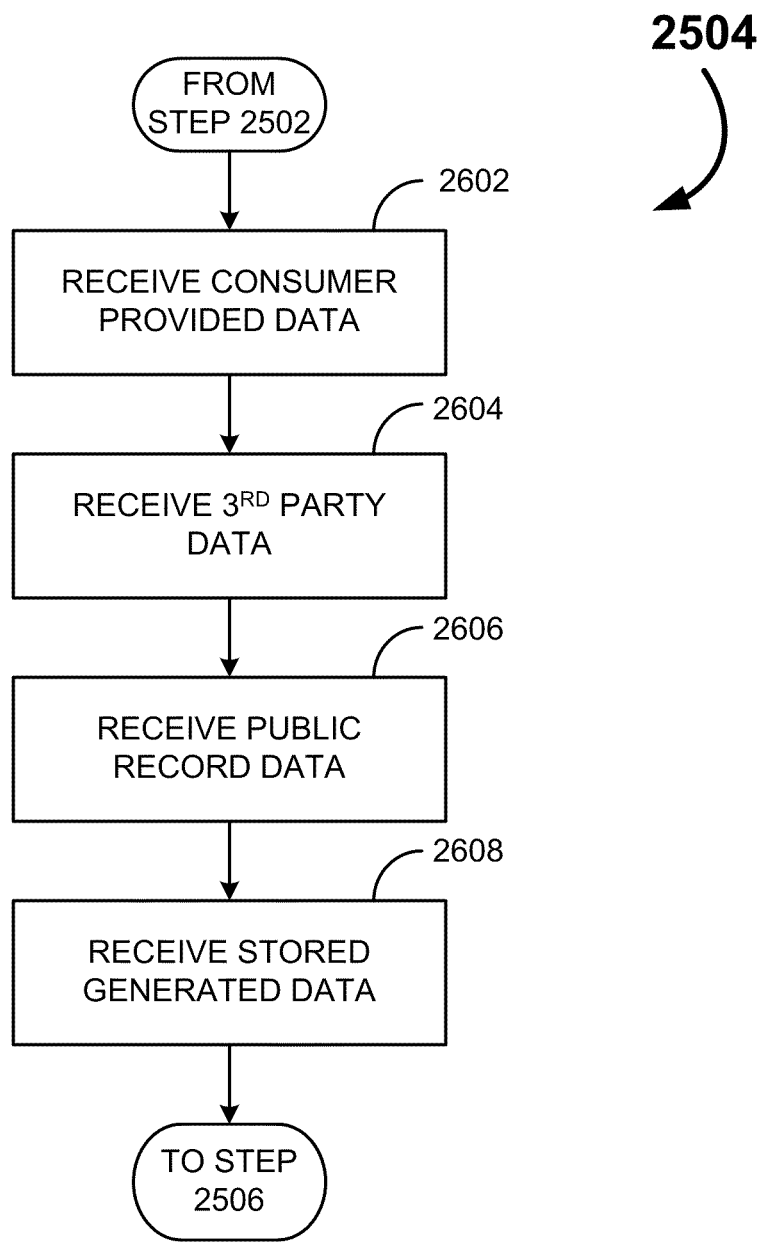
FIG. 26 is a flow chart depicting a process flow by which transaction log data is queried for customer segment analysis.

FIG. 26 is a flow chart depicting a process flow by which transaction log data is queried for customer segment analysis, shown generally at 2504. The process begins from step 2502 of FIG. 25. The process then progresses to step 2602 where consumer provided data is received. Consumer provided data may include membership information such as that collected for loyalty program registration. Additionally, survey, or other customer supplies information, may populate the received consumer provided data.

Then, at step 2604, third party data may be received. Third party data may include data from banks and other financial institutions, credit card information, public registries, mailing lists and other such data sources. Additionally, public records, such as governmental records, may be received at step 2606. Lastly, previously generated segment data that had been stored may be received at step 2608. All of the foregoing data may be utilized to tie an individual's identity to the transaction POS data. Additionally, socioeconomic, geographic and demographic data may be garnered for the individuals. The process then concludes by progressing to step 2506 of FIG. 25.

Figure 27:
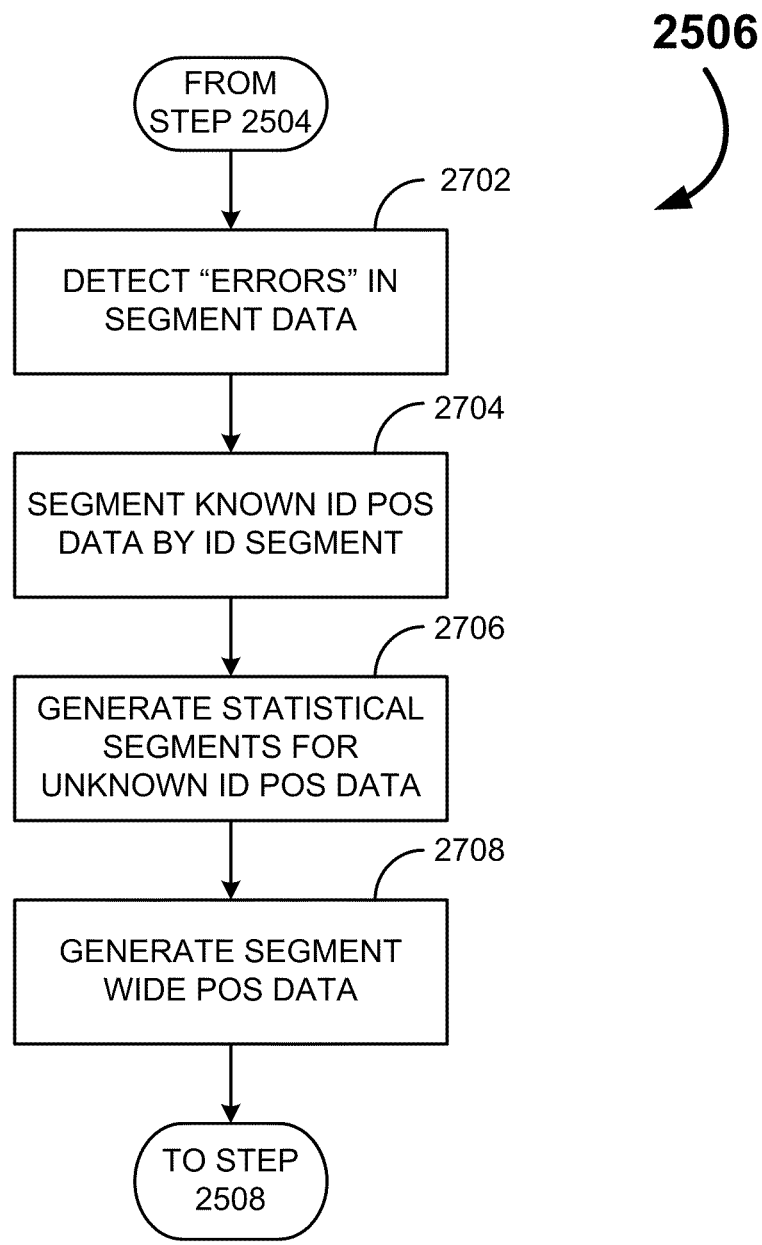
FIG. 27 is a flow chart depicting a process flow by which customers are grouped into customer segments.

FIG. 27 is a flow chart depicting a process flow by which customers are grouped into customer segments, shown generally at 2506. The process begins from step 2504 of FIG. 25. The process then progresses to step 2702 where errors in the segment data are detected. Errors include duplicate records, missing records and records that are statistically improbable. Various known methods for dealing with said "erroneous" records may be employed, including deletion of the offending records, correction via statistical means, or replacement of records with prototypical data.

At step 2704, POS data belonging to known individuals may be assigned to the segment that the individual belongs to. This step may only be performed for individuals who have previously been placed within a segment. Effectively, all additional transaction data for that individual may then be added to the segment. Periodic checks for changing demographic or purchasing behavior may be made for these "known" individuals to ensure that they remain in the proper customer segment over time.

POS data which has identification data, but where the individual identified has not been previously placed within a customer segment, may be analyzed for a segment via demographic, socio economic and geographic indices. Additionally, purchasing behavior may be statistically related to a customer segment.

At step 2706, POS data for which there is no known identification may also be segmented. This segmentation may simply be assigning all POS data to an "unknown" segment comprised of only not identified transaction records. Alternatively, all these records may be simply ignored. In some other embodiments, however, the purchasing behavior may be compared to that of the individual segments via a figure of merit function or other statistical analysis. Thus, the POS data may be included in the segment which best mirrors the purchasing activity of the POS transaction.

At step 2708 the segmentation data for the known ID POS data and the unknown ID POS data may be aggregated by assigned segments to generate segment wide POS data. The process then concludes by progressing to step 2508 of FIG. 25.

Figure 28:
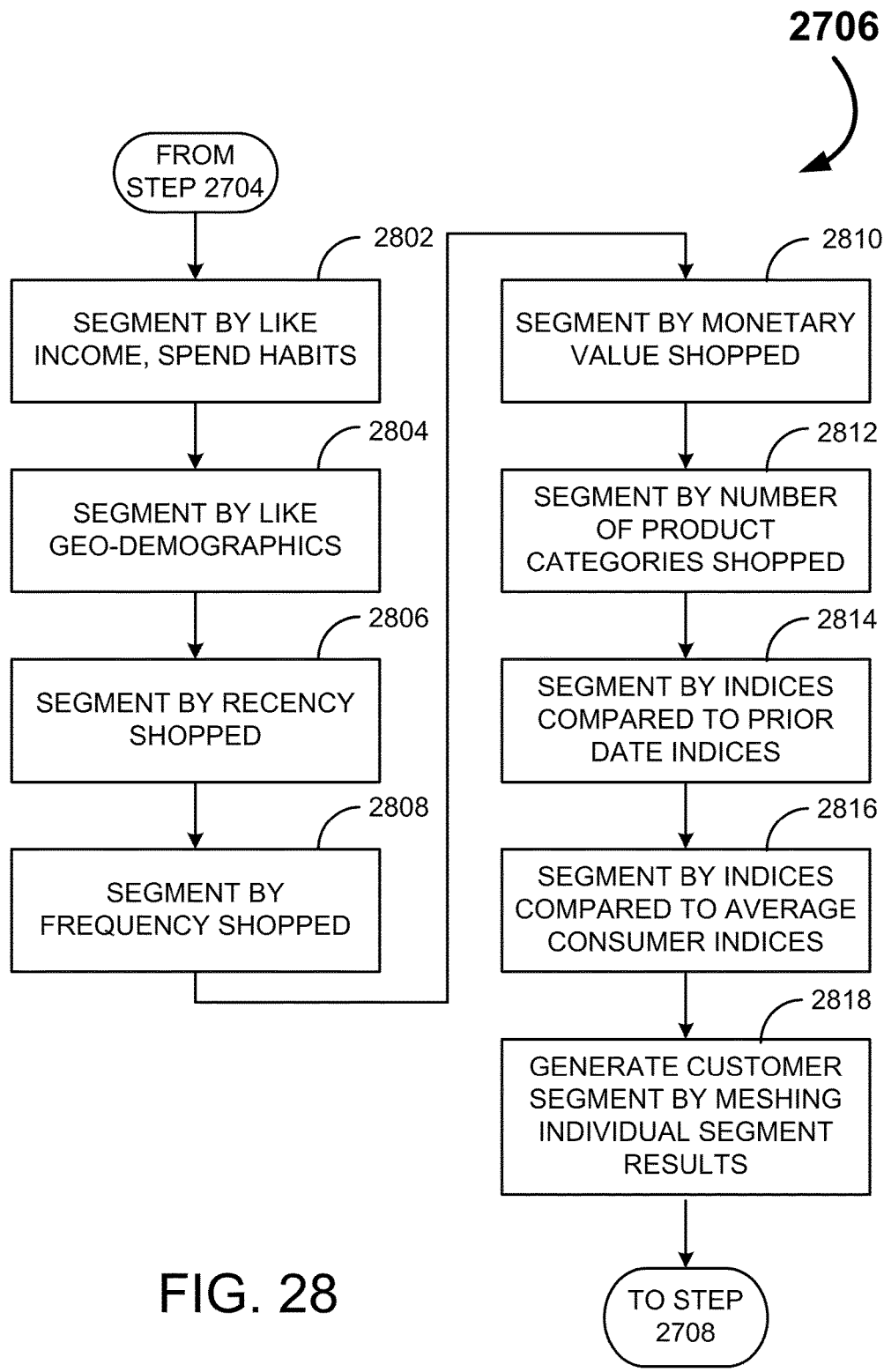
FIG. 28 is a flow chart depicting a process flow for generating statistical segments for point of sales data for unknown parties.

FIG. 28 is a flow chart depicting the process flow for generating statistical segments for point of sales data for unknown parties, shown generally at 2706. The process begins from step 2704 of FIG. 27. The process then progresses to step 2802 where customers are segmented by like income and spend habits. At step 2804 customers may likewise be segmented by geo-demographics. Recency of shopping may be used to segment the customers as well, at step 2806. At step 2808, customers may be segmented by frequency of shopping. Also, at step 2810, customers may be segmented by the monetary value spent while shopping in the aggregate or on some particular reference goods. At step 2812, customers may be segmented by the number of product categories they shopped within. At step 2814, the customers may be segmented by an index as compared to prior date indices and, at step 2816, as compared to the average consumer index, such as customer credit ratings or amount of money donated to charity annually.

Lastly, at step 2818, the system generates final customer segments by meshing the aforementioned generated segments. During this mesh, some of the generated segments may be ignored. Others may be combined into a single segment. Inconsistency in segments may be resolved by prioritizing the generated segments.

Also, during segment formation, the degree of customer "fit" to the given segment may be quantified (i.e., percentage value). This customer "fit" score to the given segment may be used during the mesh step to resolve inconsistent segment results. Additionally, in some embodiments, the consumer relevance of particular segments may be weighted, therefore further impacting the meshing step.

After all is said and done, a number of customer segments are generated. In some embodiments a given customer may only be assigned to a given segment. In another embodiment, segments are not mutually exclusive, thus a given consumer may fit in any number of consumer segments (i.e., both "health conscious segment" and "new parent segment"). After the generation of consumer segments, the process then concludes by progressing to step 2708 of FIG. 27.

Figure 29:
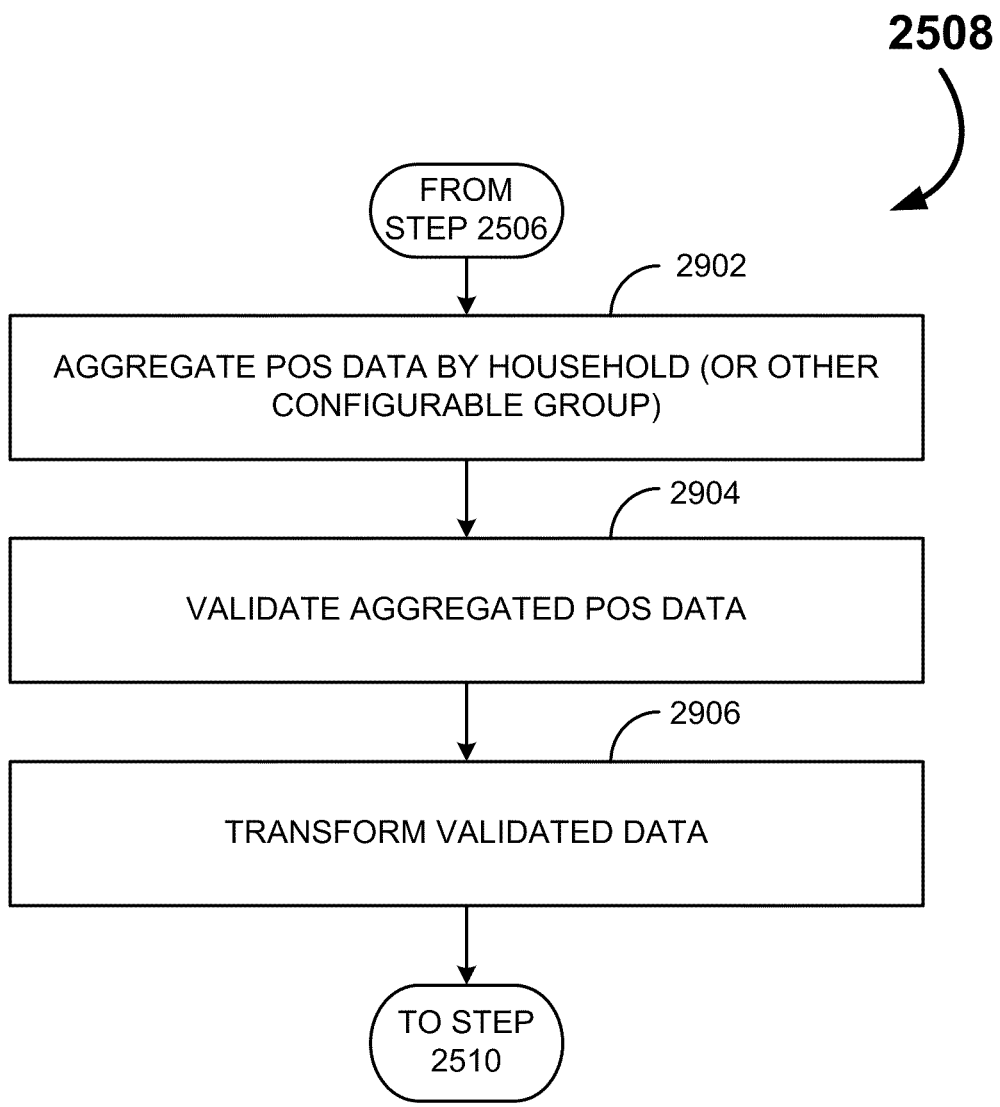
FIG. 29 is a flow chart depicting a process flow for processing customer segment data.

FIG. 29 is a flow chart depicting a process flow for processing customer segment data, shown generally at 2508. The process begins from step 2506 of FIG. 25. The process then progresses to step 2902 where the generated segment wide POS data is aggregated by household or other group (such as company, institution, club, or organization). This aggregation may be determined by cross referencing bank account information, loyalty card use, public records, commonality of shipment address, or other viable metric.

Then, at step 2904 the aggregated data may be validated, and lastly, at step 2906 the validated data may be transformed. After final data transformation the process then concludes by progressing to step 2510 of FIG. 25.

ii. Optimization Rule Application

FIG. 30 is a flow chart depicting a process flow for receiving desired optimization rules from stores, shown generally at 228. The process begins from step 224 of FIG. 2. The process then progresses to step 3002 where overall optimization goals are received. An overall optimization goal may include the maximization of profit, maximization of sales while maintaining positive revenue above a particular level, and/or achieving a particular market share of one or more products. Additionally, more than one of these goals may be received. For example, one such combination of optimization goals could include a goal of gaining a 12% market share in electronics sales may be combined with a goal of otherwise maximizing profits.

Then, at step 3004 product segment optimization goals may be received. Product segment optimization goals may be similar to the overall optimization goals but affect a more granular level of product activity. Thus, an example of a product segment goal may include the sale of 1000 widgets a month, or setting the price of widgets below that of a particular competitor.

At step 3006, store specific optimization goals may be received. Store specific goals may come into play when particular circumstances warrant special treatment of a particular store or branch. For example, if a competitor is opening a new outlet near a particular store, an example store specific goal may be to reduce the price of nonessential goods in that specific store by 10% in order to retain business in light of the competitor.

Lastly, at step 3008, customer segment optimization goals may be received. An example of a customer segment goal may include optimizing sales within a given customer segment conditioned upon a measured effect on another segment. Another example of a customer segment goal would be the affect of a Consumer Price Index (CPI) for the customer segment. Another exemplary goal may include effecting profit/sales for a particular customer segment. And yet another example is impacting the price image perceived by a particular segment. Thus, through the careful setting of particular customer segment goals, consumer purchasing behavior may be manipulated on a relatively granular level.

After goals have been set, the process then concludes by progressing to step 232 of FIG. 2.

FIG. 31 is a flow chart depicting a process flow for receiving customer segment optimization goals, shown generally at 3008. The process begins from step 3006 of FIG. 30. As previously mentioned, customer segment goals may be received to guide price setting and promotional activity for particular products. Some examples of these goals were provided. In this exemplary flow process, particular goals are selected for the generation of customer specific optimization rules. At step 3102, for example, segment goals as to the profit or sales of a given consumer segment may be received. These segment goals may be subject to conditions of the effects upon one or more other segments. Thus, for example, price of product X may be increased to improve profits from Segment A but only to the extent that profits from Segments B and C are not reduced due to decreased sales.

At step 3104 price image, by customer segment, goals may be set. These goals may specify the customer segment for which product price image is to be improved. Again, like in segment goals subject to the effect on other consumer segments, the price image goals as perceived by some customer segment group may also be subject to effect conditions upon other segments.

Lastly, at step 3106, goals are received for achieving a Consumer Price Index (CPI) value for a particular consumer segment. The process then concludes by progressing to step 232 of FIG. 2.

iii. Segment Promotions

FIG. 32 is a flow chart depicting a process flow for analyzing customer segments for promotional activity, shown generally at 3200. The process begins at step 3202 where segment wide POS data is received. This consumer segment wide POS data was generated earlier, as previously discussed. Additionally, consumer insights generated by the econometric engine and optimization engine may be received at step 3204. Consumer insights may include unit volume lift data for products by customer segment. Together the consumer insights, along with segment wide POS data, may be used to generate segment specific promotion data at step 3206. The process then concludes.

FIG. 33 is a flow chart depicting a process flow for generating customer segment specific promotional activity, shown generally at 3206. The process begins from step 3204 of FIG. 32. As previously discussed, customer segment specific promotion data includes a wide range of activity. For example, ads may be tailored to appeal to particular customer segments (step 3302). Mailings to known individuals may be tailored to be of use to that customer dependent upon the segment they are identified as belonging to (step 3304). Ads directed to particular customer segments may be placed within media most likely to be consumed by individuals within that segment. Additionally, coupons at checkout may be provided to the customer. These coupons may provide discounts or other incentives for products that a consumer in that segment, with her recent purchase history, would be likely to use. Such activity may be referred to as cross segment analysis promotions (step 3306). Of course additional promotions which depend upon customer segments may be generated and implemented.

C. Example Segment Insights

Figure 34:
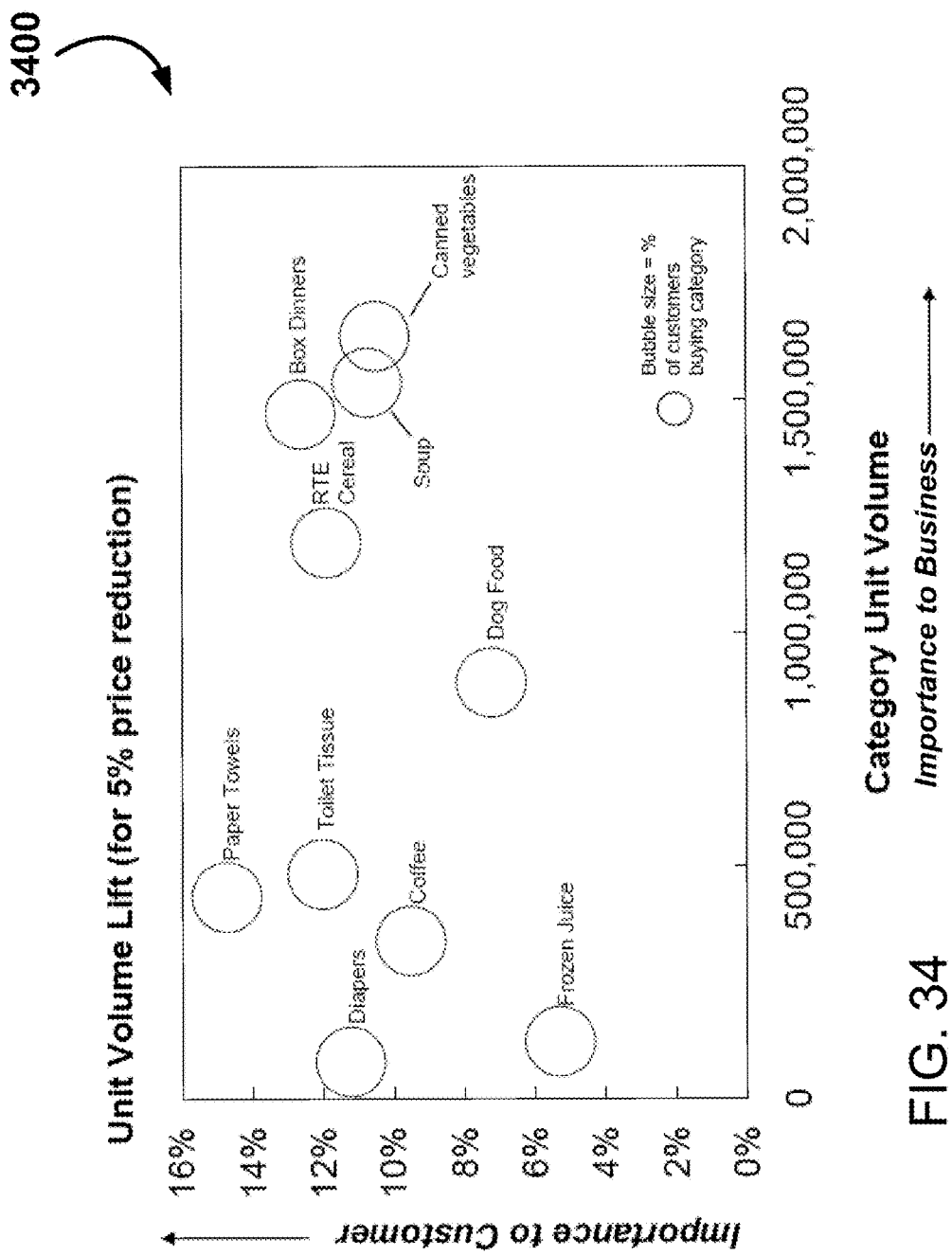
FIG. 34 illustrates an example of a unit volume lift scatter plot chart for exemplary customer segments.

FIG. 34 illustrates an example of a unit volume lift scatter plot chart for exemplary customer segments, shown generally at 3400. In this scatter plot the unit volume of categories of the products is illustrated on the X-axis. The percent volume lift in purchases by a given customer segment, given a 5% price reduction, is provided on the Y axis. Thus, the Y-axis is a rough equivalent to the price sensitivity of that customer segment to a price change for the particular product category. Alternatively, this may be framed as illustrating the "importance" of the product to the consumer.

Likewise, total units sold, as illustrated by the X-axis directly effects revenue of the business. Thus these values are the "importance" of the product to the business. Of course other matrices of "importance" may be utilized, such as profit produced by the product category.

This scatter plot enables a business to derive promotional activity. For example, product categories which are important to customers but less important to the business may be a good candidate for a promotion. Thus, for the given exemplary chart, the business may find discounting paper towels, tissue paper and diapers to be an effective strategy. However, reduction of dog food may be less of a desired activity since dog food promotions does not result in a large unit volume lift, and the reduction of revenues due to a lower price will be experienced on a large number of sales since regular unit volume is already very large.

Figure 35:
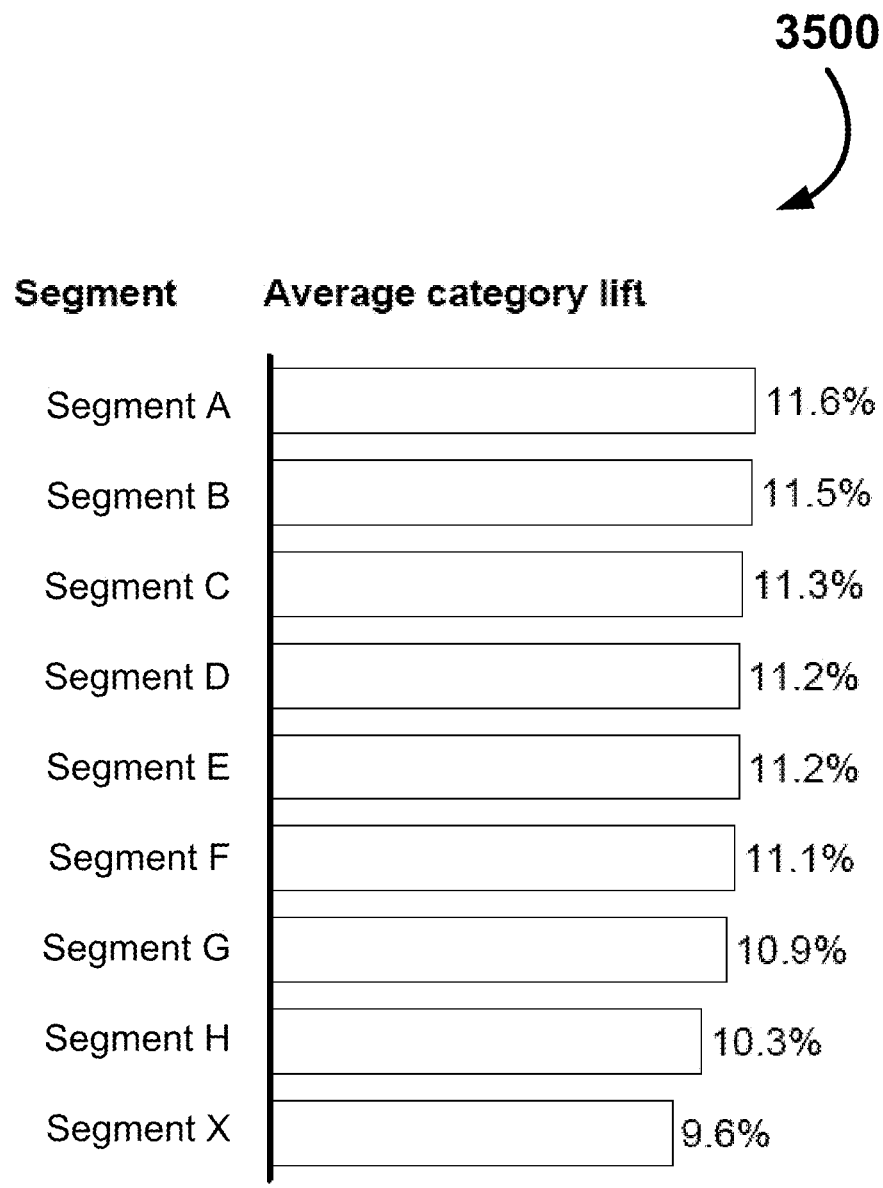
FIG. 35 illustrates an example of an average category lift bar chart for exemplary customer segments.

FIG. 35 illustrates an example of an average category lift bar chart for exemplary customer segments, shown generally at 3500. This chart provides the consumer segments on the Y-axis and average category lift values along the X-axis for a given discount (here a 5% product discount). A percentage of category lift may also be provided. This type of chart may be generated for one or more categories of products. The presented example is for an average lift across all product categories. Thus, in this example, customer segment A has the most lift in shopping (11.6%) given a set discount. On the other hand, Segment X here has a marginal (9.6%) purchase volume lift given the set discount.

Using this plot, it may be determined that discounts and promotions which target customer Segment A may, in fact, result in greater returns than discounts targeting other segments. Additionally, by cross referencing the level of responsiveness to discounts by size of the customer segment (in total dollars spent), very effective business goals and promotions may be generated. For example, further assume that Segment A spends $1.5M per month on average, but segment C spends $4M per month on average. Although segment A appears more susceptible to promotional activity, a fixed advertisement cost, such as a billboard, may be better used as targeting individuals in Segment C as there is such a large difference in total spend. Thus, promotional algorithms may be devised which determines the optimal promotions. These promotional algorithms may include many variables, including: susceptibility to promotion, customer segment worth (by total spend, profit, volume, etc.) and promotion type.

Figure 36:
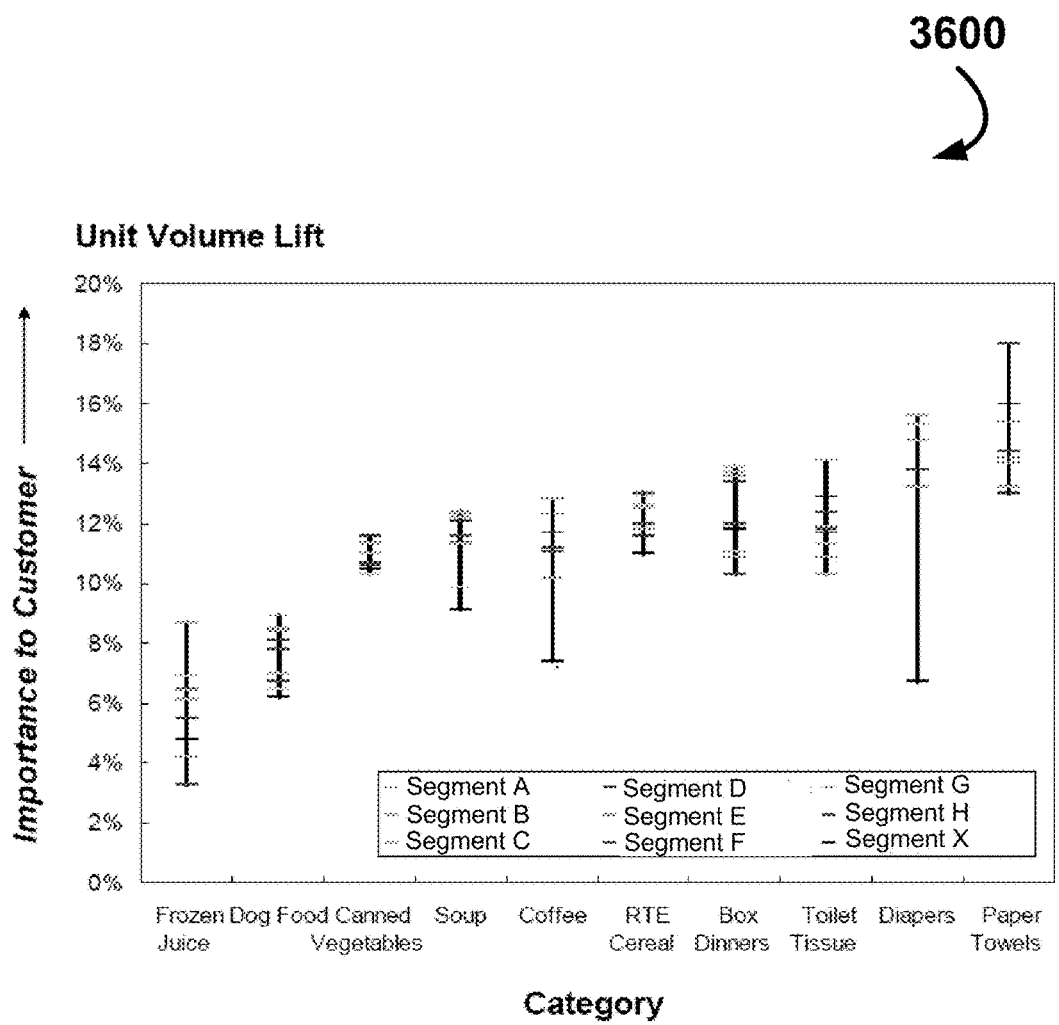
FIG. 36 illustrates an example of a unit volume lift chart for exemplary customer segments and multiple product categories.

FIG. 36 illustrates an example of a unit volume lift chart for exemplary customer segments and multiple product categories, shown generally at 3600. This chart provides more detail than the previous customer segment insight charts. Here the product categories are listed along the X-axis. Percent unit volume lift, given a set discount, is provided on the Y-axis. The segments are then illustrated by the lift in sales that occur for each product category.

Some product categories have very small lift spreads, such as canned vegetables on the present example. Thus, it may be deduced that an advertisement on canned vegetables is best placed in a medium where all consumers see the promotion. Other product categories, such as diapers and coffee, have much larger spreads in unit lifts. Thus, more targeted ads on these products may be desirable.

Figure 37:
FIG. 37 illustrates an example of a spend chart for exemplary customer segments and multiple product categories.

FIG. 37 illustrates an example of a spend chart for exemplary customer segments and multiple product categories, shown generally at 3700. In this example, spend per product category (Y-axis) is illustrated on a prototypical shopping trip by the consumer segment (X-axis). Total spend, as a percentage, is seen below the segment labels. Thus, in this example, Segment X is responsible for over 30% of total spend. But as seen in the previous examples, Segment X is also less susceptible to promotions than other segments. Thus, segment C, with a mere 13% of total spend, may be a better candidate for promotions than other segments given its relatively large susceptibility to promotions and somewhat larger contribution to total spend (as compared to Segments A, B, D and E at roughly 7% total spend).

Additionally, other useful information may be gained from this chart. For example, Segment X purchases significantly more dog food than any other customer segment. Thus, if a promotion is targeted at segment X it may be prudent to include dog food in the promotion. Likewise, as only Segment A and Segment X purchase any significant amount of diapers, if there is a promotion on diapers, these promotions should be directed at these two customer segments to be effective.

VI. System Platform

Figure 7A:
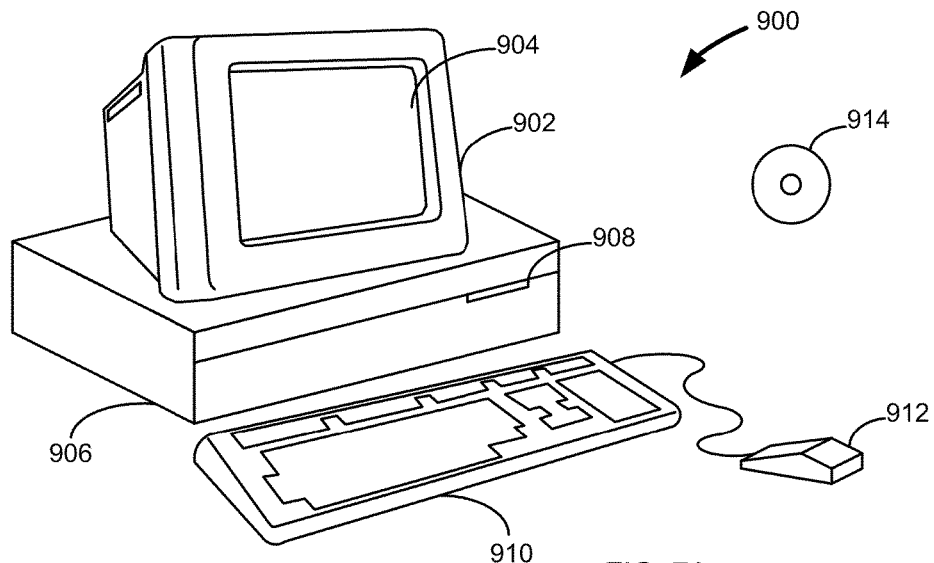
FIGS. 7A and 7B illustrate a computer system, which forms part of a network and is suitable for implementing embodiments of the present invention.
Figure 7B:
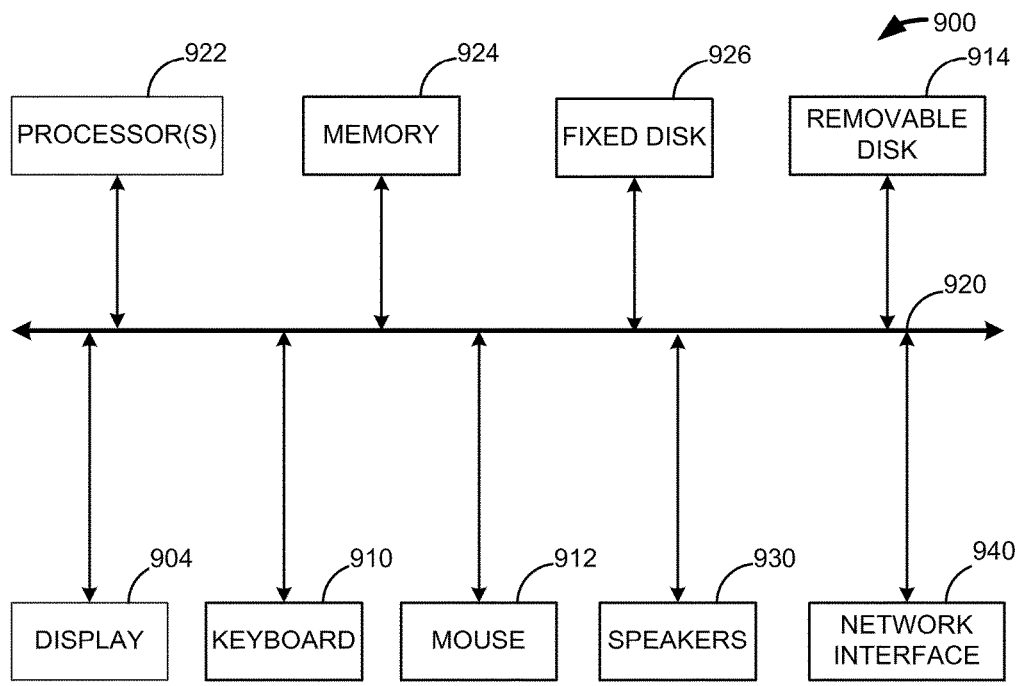

FIGS. 7A and 7B illustrate a computer system 900, which forms part of a network and is suitable for implementing embodiments of the present invention. FIG. 7A shows one possible physical form of the computer system. Of course, the computer system may have many physical forms ranging from an integrated circuit, a printed circuit board, and a small handheld device up to a huge super computer. Computer system 900 includes a monitor 902, a display 904, a housing 906, a disk drive 908, a keyboard 910, and a mouse 912. Disk 914 is a computer-readable medium used to transfer data to and from computer system 900.

FIG. 7B is an example of a block diagram for computer system 900. Attached to system bus 920 are a wide variety of subsystems. Processor(s) 922 (also referred to as central processing units, or CPUs) are coupled to storage devices, including memory 924. Memory 924 includes random access memory (RAM) and read-only memory (ROM). As is well known in the art, ROM acts to transfer data and instructions uni-directionally to the CPU and RAM is used typically to transfer data and instructions in a bi-directional manner. Both of these types of memories may include any suitable of the computer-readable media described below. A fixed disk 926 is also coupled bi-directionally to CPU 922; it provides additional data storage capacity and may also include any of the computer-readable media described below. Fixed disk 926 may be used to store programs, data, and the like and is typically a secondary storage medium (such as a hard disk) that is slower than primary storage. It will be appreciated that the information retained within fixed disk 926 may, in appropriate cases, be incorporated in standard fashion as virtual memory in memory 924. Removable disk 914 may take the form of any of the computer-readable media described below.

CPU 922 is also coupled to a variety of input/output devices, such as display 904, keyboard 910, mouse 912 and speakers 930. In general, an input/output device may be any of: video displays, track balls, mice, keyboards, microphones, touch-sensitive displays, transducer card readers, magnetic or paper tape readers, tablets, styluses, voice or handwriting recognizers, biometrics readers, or other computers. CPU 922 optionally may be coupled to another computer or telecommunications network using network interface 940. With such a network interface, it is contemplated that the CPU might receive information from the network, or might output information to the network in the course of performing the above-described method steps. Furthermore, method embodiments of the present invention may execute solely upon CPU 922 or may execute over a network such as the Internet in conjunction with a remote CPU that shares a portion of the processing.

In addition, embodiments of the present invention further relate to computer storage products with a computer-readable medium that have computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs and holographic devices; magneto-optical media such as optical disks; and hardware devices that are specially configured to store and execute program code, such as application-specific integrated circuits (ASICs), programmable logic devices (PLDs) and ROM and RAM devices. Examples of computer code include machine code, such as produced by a compiler, and files containing higher level code that are executed by a computer using an interpreter.

Figure 8:
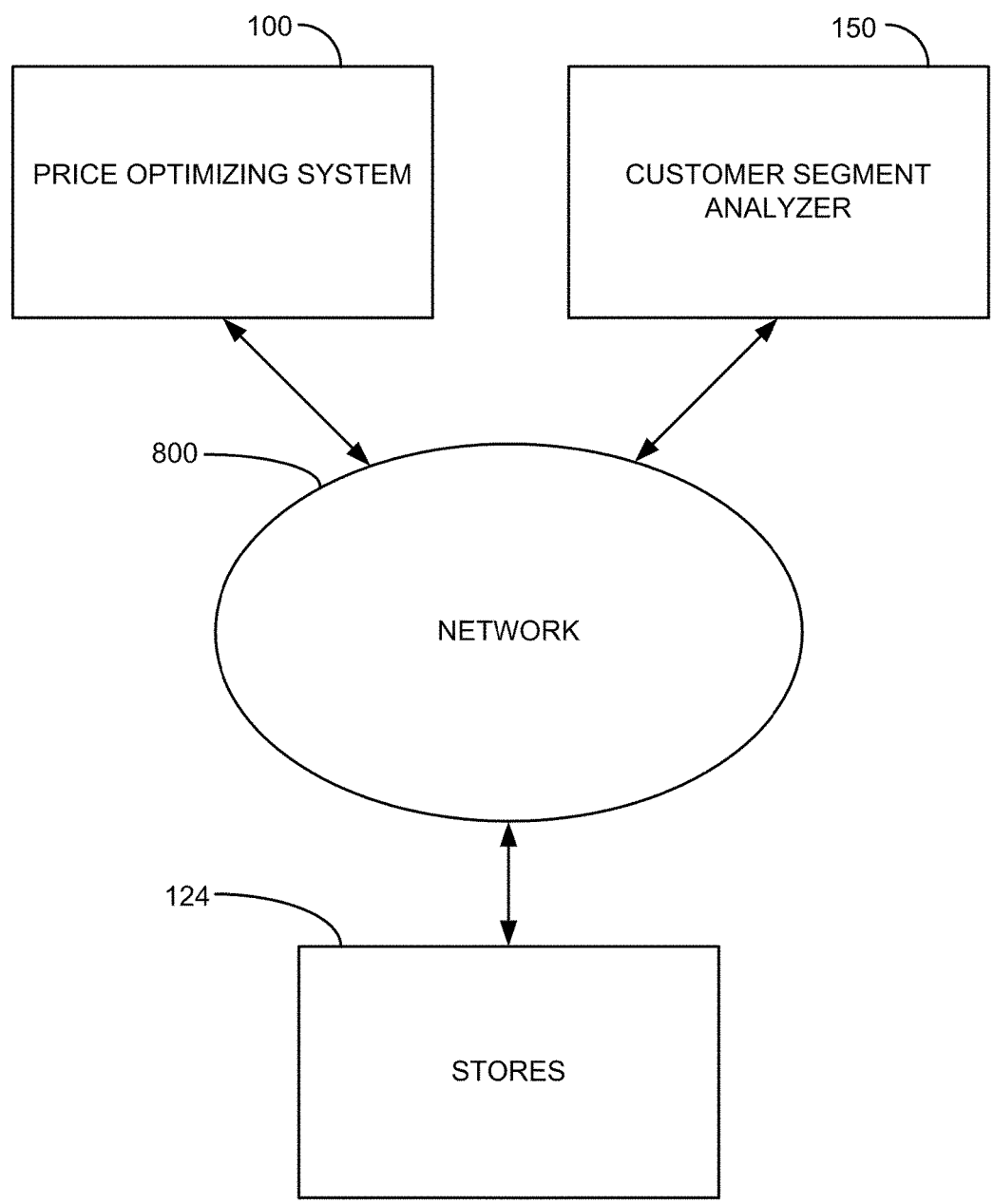
FIG. 8 is a schematic illustration of an embodiment of the invention that functions over a network.
Figure 9A:
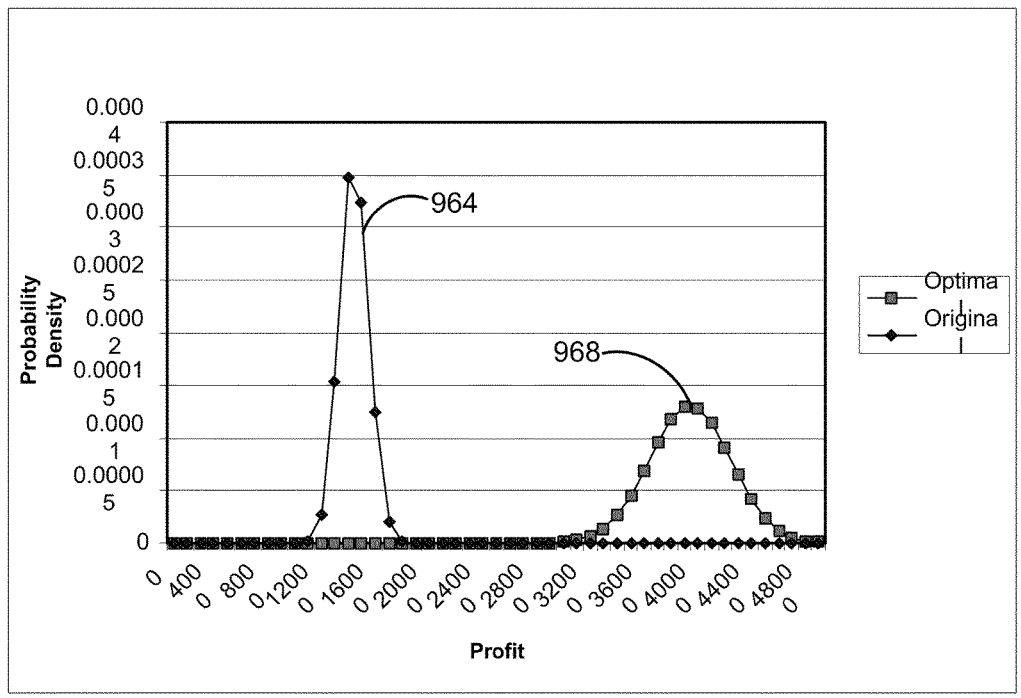
FIG. 9A is a graph of original profit from actual sales of the store using actual prices and optimal profit from optimized sales resulting from the calculated optimized prices bounded by its probability.
Figure 9B:
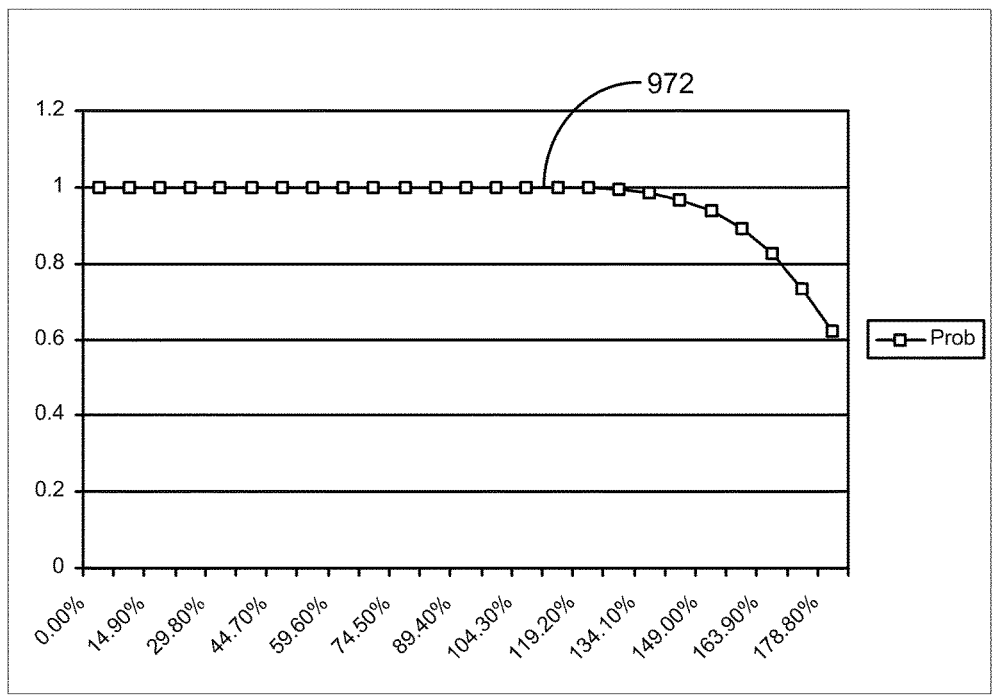
FIG. 9B is a graph of percentage increase in profit and the probability of obtaining at least that percentage increase in profit.

FIG. 8 is a schematic illustration of an embodiment of the invention that functions over a computer network 800. The network 800 may be a local area network (LAN) or a wide area network (WAN). An example of a LAN is a private network used by a mid-sized company with a building complex. Publicly accessible WANs include the Internet, cellular telephone network, satellite systems and plain-old-telephone systems (POTS). Examples of private WANs include those used by multi-national corporations for their internal information system needs. The network 800 may also be a combination of private and/or public LANs and/or WANs. In such an embodiment the Price Optimizing System with Customer Segment Analysis 100 is connected to the network 800. The Stores 124 are also connected to the network 800. The Stores 124 are able to bi-directionally communicate with the Price Optimizing System with Customer Segment Analysis 100 over the network 800. Additionally, in embodiments where the Customer Segment Analyzer 150 is not integrated within the pricing optimization system, the Stores 124 are likewise able to bi-directionally communicate with the Customer Segment Analyzer 150 over the network 800.

Additionally, in some embodiments, the system may be hosted on a web platform. A browser or similar web component may be used to access the Likelihood of loss engine. By utilizing internet based services, retailers may be able to access the system from any location.

In the specification, examples of product are not intended to limit products covered by the claims. Products may for example include food, hardware, software, real estate, financial devices, intellectual property, raw material, and services. The products may be sold wholesale or retail, in a brick and mortar store or over the Internet, or through other sales methods.

In sum, the present invention provides a system and methods for analyzing customer segments. The advantages of such a system include cost efficient customer segment specific promotion activity, customer segment insights and possible downstream efficiency increases of a pricing optimization.

While this invention has been described in terms of several embodiments, there are alterations, modifications, permutations, and substitute equivalents, which fall within the scope of this invention. Although sub-section titles have been provided to aid in the description of the invention, these titles are merely illustrative and are not intended to limit the scope of the present invention.

It should also be noted that there are many alternative ways of implementing the methods and apparatuses of the present invention. It is therefore intended that the following appended claims be interpreted as including all such alterations, modifications, permutations, and substitute equivalents as fall within the true spirit and scope of the present invention.

What is claimed is:

1. A method for analyzing consumer segments, useful in association with a price optimization system, the method comprising:
   receiving customer transaction data and reformatting the customer transaction data by aggregating elements of the customer transaction data pertaining to groups of low sales volume products into a single product;
   processing, using a processor, the aggregated elements together as a single product to reduce a processing time of that processor and exporting defined groups of products and attributes within the customer transaction data to a file and processing the file by separate processing to enhance a processing speed of the processor;
   segmenting consumers into a plurality of statistical segments based on one or more consumer attributes, wherein the segmenting consumers includes:
      segmenting point of sale records with a known consumer identification identifying a consumer to a segment which the consumer already belongs to;
      segmenting point of sale records with a known consumer identification identifying a consumer not placed in a segment to a segment statistically related to a known segment based on consumer attribute data and purchasing behavior; and
      segmenting point of sale records without a consumer identification and for an unidentified consumer to a segment by:
         statistically determining an identity of the consumer for the point of sale records without a consumer identification and segmenting the point of sale records without a consumer identification to one of the segment to which the determined consumer already belongs and the segment statistically related to the known segment; and
         in response to failing to statistically determine the identity of the consumer for the point of sale records without a consumer identification:
            statistically analyzing purchasing activity of the point of sale records without a consumer identification and identifying a segment by comparing the analyzed purchasing activity to purchasing behavior of segments via statistical analysis;
            segmenting the point of sale records without a consumer identification to one of the identified segment and a segment comprising only point of sale records with unidentified consumers;
   determining a percentage fit score for consumers indicating a degree of relevance of the consumers to corresponding statistical segments, wherein each statistical segment is associated with a different set of consumer attributes;
   meshing the plurality of statistical segments to produce consumer segments, wherein the meshing includes:
      applying the percentage fit score to provide consistent associations of the consumers with corresponding statistical segments;
      consolidating the plurality of the statistical segments to produce the consumer segments, wherein the consolidating includes selectively combining a plurality of the statistical segments to form one of the consumer segments; and resolving inconsistent associations of the consumers with corresponding statistical segments by prioritizing the consumer segments and assigning the consumers to the consumer segments based on priorities of the consumer segments;

generating segment wide point of sales data;

aggregating, using a processor, segment wide point of sales data by at least one consumer group;

transforming, using a processor, aggregated segment wide point of sales data;

outputting transformed segment wide point of sales data to the price optimization system for generation of preferred prices and customer insight information; and altering transactions for consumers by implementing different promotional activities based on the customer insight information, wherein each different promotional activity is specific to consumers of a corresponding consumer segment, and the implementing different promotional activities includes:

determining communication channels utilized by consumers for each consumer segment and communicating each promotional activity to the consumers of the corresponding consumer segment through the determined communication channels for that consumer segment.

2. The method as recited in claim 1, wherein the customer transaction data includes point of sales transaction records.

3. The method as recited in claim 2, wherein the customer transaction data further includes at least one of consumer provided data, received third party data, public records and received store data.

4. The method as recited in claim 1, wherein the segmenting consumers includes detecting errors in segment data.

5. The method as recited in claim 1, wherein the segmenting consumers further includes generating statistical segments for point of sale records.

6. The method as recited in claim 5, wherein the generating statistical segments includes dividing point of sale records by at least one of like income, spend habits, geo-demography, recency of shopping, frequency of shopping, monetary value of shopping trips, number of product categories shopped, index value compared to prior value of the index value for a customer, and index value compared to average index value for all customers.

7. The method as recited in claim 1, further comprising generating consumer segment specific promotional activity.

8. An apparatus for analyzing consumer segments, useful in association with a price optimization system, the apparatus comprising:

a customer segment generator including a processor and configured to:

receive customer transaction data and reformat the customer transaction data by aggregating elements of the customer transaction data pertaining to groups of low sales volume products into a single product;

process the aggregated elements together as a single product to reduce a processing time of the processor and export defined groups of products and attributes within the customer transaction data to a file and processing the file by separate processing to enhance a processing speed of the processor;

segment consumers into a plurality of statistical segments based on one or more consumer attributes, wherein the segmenting consumers includes:

segmenting point of sale records with a known consumer identification identifying a consumer to a segment which the consumer already belongs to;

segmenting point of sale records with a known consumer identification identifying a consumer not placed in a segment to a segment statistically related to a known segment based on consumer attribute data and purchasing behavior; and segmenting point of sale records without a consumer identification and for an unidentified consumer to a segment by:

statistically determining an identity of the consumer for the point of sale records without a consumer identification and segmenting the point of sale records without a consumer identification to one of the segment to which the determined consumer already belongs and the segment statistically related to the known segment; and in response to failing to statistically determine the identity of the consumer for the point of sale records without a consumer identification:

statistically analyzing purchasing activity of the point of sale records without a consumer identification and identifying a segment by comparing the analyzed purchasing activity to purchasing behavior of segments via statistical analysis;

segmenting the point of sale records without a consumer identification to one of the identified segment and a segment comprising only point of sale records with unidentified consumers;

determine a percentage fit score for consumers indicating a degree of relevance of the consumers to corresponding statistical segments, wherein each statistical segment is associated with a different set of consumer attributes;

mesh the plurality of statistical segments to produce consumer segments, wherein the meshing includes:

applying the percentage fit score to provide consistent associations of the consumers with corresponding statistical segments;

consolidating the plurality of the statistical segments to produce the consumer segments, wherein the consolidating includes selectively combining a plurality of the statistical segments to form one of the consumer segments; and resolving inconsistent associations of the consumers with corresponding statistical segments by prioritizing the consumer segments and assigning the consumers to the consumer segments based on priorities of the consumer segments; and generate segment wide point of sales data; and a data processor configured to:

aggregate segment wide point of sales data by at least one consumer group;

transform aggregated segment wide point of sales data;

output the transformed segment wide point of sales data to the price optimization system for generation of preferred prices and customer insight information; and alter transactions for consumers by implementing different promotional activities based on the customer insight information, wherein each different promotional activity is specific to consumers of a corresponding consumer segment, and the implementing different promotional activities includes:
   determining communication channels utilized by consumers for each consumer segment and communicating each promotional activity to the consumers of the corresponding consumer segment through the determined communication channels for that consumer segment.

9. The apparatus as recited in claim 8, wherein the customer transaction data includes point of sales transaction records.

10. The apparatus as recited in claim 9, wherein the customer transaction data further includes at least one of consumer provided data, received third party data, public records and received store data.

11. The apparatus as recited in claim 8, wherein the customer segment generator is further configured to detect errors in segment data.

12. The apparatus as recited in claim 8, wherein the customer segment generator is further configured to generate statistical segments for point of sale records.

13. The apparatus as recited in claim 12, wherein the generating statistical segments includes dividing point of sale records by at least one of like income, spend habits, geo-demography, recency of shopping, frequency of shopping, monetary value of shopping trips, number of product categories shopped, index value compared to prior value of the index value for a customer, and index value compared to average index value for all customers.

14. The apparatus as recited in claim 8, wherein the data processor comprises a segment specific promotion engine configured to generate consumer segment specific promotional activity.

15. A computer storage product for analyzing consumer segments comprising:
   a non-transitory computer readable medium having computer readable program code embodied therewith, the computer readable program code comprising computer readable program code that when executed by a processor is configured to:
   receive customer transaction data and reformat the customer transaction data by aggregating elements of the customer transaction data pertaining to groups of low sales volume products into a single product;
   process the aggregated elements together as a single product to reduce a processing time of the processor and export defined groups of products and attributes within the customer transaction data to a file and processing the file by separate processing to enhance a processing speed of the processor;
   segment consumers into a plurality of statistical segments based on one or more consumer attributes, wherein the segmenting consumers includes:
      segmenting point of sale records with a known consumer identification identifying a consumer to a segment which the consumer already belongs to;
      segmenting point of sale records with a known consumer identification identifying a consumer not placed in a segment to a segment statistically related to a known segment based on consumer attribute data and purchasing behavior; and
      segmenting point of sale records without a consumer identification and for an unidentified consumer to a segment by:
         statistically determining an identity of the consumer for the point of sale records without a consumer identification and segmenting the point of sale records without a consumer identification to one of the segment to which the determined consumer already belongs and the segment statistically related to the known segment; and
      in response to failing to statistically determine the identity of the consumer for the point of sale records without a consumer identification:
         statistically analyzing purchasing activity of the point of sale records without a consumer identification and identifying a segment by comparing the analyzed purchasing activity to purchasing behavior of segments via statistical analysis;
         segmenting the point of sale records without a consumer identification to one of the identified segment and a segment comprising only point of sale records with unidentified consumers;
   determine a percentage fit score for consumers indicating a degree of relevance of the consumers to corresponding statistical segments, wherein each statistical segment is associated with a different set of consumer attributes;
   mesh the plurality of statistical segments to produce consumer segments, wherein the meshing includes:
      applying the percentage fit score to provide consistent associations of the consumers with corresponding statistical segments;
      consolidating the plurality of the statistical segments to produce the consumer segments, wherein the consolidating includes selectively combining a plurality of the statistical segments to form one of the consumer segments; and
      resolving inconsistent associations of the consumers with corresponding statistical segments by prioritizing the consumer segments and assigning the consumers to the consumer segments based on priorities of the consumer segments;
   generate segment wide point of sales data;
   aggregate segment wide point of sales data by at least one consumer group;
   transform aggregated segment wide point of sales data;
   output transformed segment wide point of sales data to a price optimization system for generation of preferred prices and customer insight information; and
   alter transactions for consumers by implementing different promotional activities based on the customer insight information, wherein each different promotional activity is specific to consumers of a corresponding consumer segment, and the implementing different promotional activities includes:
      determining communication channels utilized by consumers for each consumer segment and communicating each promotional activity to the consumers of the corresponding consumer segment through the determined communication channels for that consumer segment.

16. The computer storage product as recited in claim 15, wherein the customer transaction data includes point of sales transaction records.

17. The computer storage product as recited in claim 16, wherein the customer transaction data further includes at least one of consumer provided data, received third party data, public records and received store data.

18. The computer storage product as recited in claim 15, wherein the segmenting consumers includes detecting errors in segment data.

19. The computer storage product as recited in claim 15, wherein the segmenting consumers further includes generating statistical segments for point of sale records.

20. The computer storage product as recited in claim 19, wherein the generating statistical segments includes dividing point of sale records by at least one of like income, spend habits, geo-demography, recency of shopping, frequency of shopping, monetary value of shopping trips, number of product categories shopped, index value compared to prior value of the index value for a customer, and index value compared to average index value for all customers.

21. The computer storage product as recited in claim 15, wherein the computer readable program code further comprises computer readable program code configured to:
   generate consumer segment specific promotional activity.

* * * * *